US00RE48417E

(19) United States
(12) Reissued Patent
Marks et al.

(10) Patent Number: US RE48,417 E
(45) Date of Reissued Patent: Feb. 2, 2021

(54) OBJECT DIRECTION USING VIDEO INPUT COMBINED WITH TILT ANGLE INFORMATION

(71) Applicant: Sony Interactive Entertainment Inc., Tokyo (JP)

(72) Inventors: Richard Marks, Pleasanton, CA (US); Gary M. Zalewski, Piedmont, CA (US)

(73) Assignee: Sony Interactive Entertainment Inc., Tokyo (JP)

(21) Appl. No.: 15/210,816

(22) Filed: Jul. 14, 2016

Related U.S. Patent Documents

Reissue of:
(64) Patent No.: 8,781,151
Issued: Jul. 15, 2014
Appl. No.: 11/840,170
Filed: Aug. 16, 2007

U.S. Applications:
(63) Continuation-in-part of application No. 11/536,559, filed on Sep. 28, 2006, now Pat. No. 8,310,656.

(51) Int. Cl.
*A63F 13/42* (2014.01)
*A63F 13/211* (2014.01)
(Continued)

(52) U.S. Cl.
CPC ..... *A63F 13/42* (2014.09); *A63F 13/211* (2014.09); *A63F 13/213* (2014.09);
(Continued)

(58) Field of Classification Search
CPC ..... A63F 13/06; A63F 13/10; A63F 13/211; A63F 13/42; A63F 2300/1006;
(Continued)

(56) References Cited

U.S. PATENT DOCUMENTS 3,270,564 A 9/1966 Evans
3,561,272 A 2/1971 Davis
(Continued)

FOREIGN PATENT DOCUMENTS

EP 0353200 1/1990
EP 0652686 5/1995 ..... H04R 1/40
(Continued)

OTHER PUBLICATIONS

ADXL202/ADXL210 Datasheet, Rev. B, Analog Devices, Inc., 1999.*

(Continued)

*Primary Examiner* — Eric B. Kiss
(74) *Attorney, Agent, or Firm* — Penilla IP, APC

(57) ABSTRACT

A method for use in obtaining input data from an object includes capturing a live image of the object with an image capture device, receiving information related to a tilt angle of the object from one or more sensors other than the image capture device, using the information related to a tilt angle of the object to obtain at least one rotated reference image of the object, comparing the live image of the object with the rotated reference image of the object, and generating an indication in response to the live image matching the rotated reference image. An apparatus and a storage medium storing a computer program executable by a processor based system are also disclosed

43 Claims, 19 Drawing Sheets

(51) Int. Cl.
*A63F 13/213* (2014.01)
*G06F 3/0346* (2013.01)
*G06K 9/00* (2006.01)

(52) U.S. Cl.
CPC ..... *G06F 3/0346* (2013.01); *G06K 9/00335* (2013.01); *A63F 2300/105* (2013.01); *A63F 2300/1006* (2013.01); *A63F 2300/1087* (2013.01); *A63F 2300/6045* (2013.01); *G08C 2201/32* (2013.01)

(58) Field of Classification Search
CPC ..... A63F 2300/105; A63F 2300/1087; A63F 2300/6045; G06F 3/0346; G08C 2201/32
See application file for complete search history.

(56) References Cited

U.S. PATENT DOCUMENTS 3,943,277 A 3/1976 Everly et al.
4,263,504 A 4/1981 Thomas
4,274,631 A 6/1981 Hayazaki
4,313,227 A 1/1982 Eder
4,363,484 A 12/1982 Breslow et al.
4,469,330 A 9/1984 Asher
4,558,864 A 12/1985 Medwedeff
4,565,999 A 1/1986 King et al. ..... G06F 3/012 340/4.11
4,683,891 A 8/1987 Cornellier et al.
4,718,663 A 1/1988 Shepherd
4,739,128 A 4/1988 Grisham
4,787,051 A 11/1988 Olson
4,796,019 A 1/1989 Auerbach
4,802,227 A 1/1989 Elko et al.
4,823,001 A 4/1989 Kobayashi et al.
4,843,568 A 6/1989 Krueger
4,963,858 A 10/1990 Chien
4,977,404 A 12/1990 Durst et al.
5,034,986 A 7/1991 Karmann et al.
5,046,739 A 9/1991 Reichow
5,055,840 A 10/1991 Bartlett
5,111,401 A 5/1992 Everett et al.
5,128,671 A 7/1992 Thomas, Jr.
5,144,594 A 9/1992 Gilchrist
5,195,179 A 3/1993 Tokunaga
5,214,615 A 5/1993 Bauer
5,227,985 A 7/1993 DeMenthon ..... G01S 5/163 345/158
5,233,544 A 8/1993 Kobayashi
5,260,556 A 11/1993 Lake et al.
5,262,777 A 11/1993 Low et al.
5,296,871 A 3/1994 Paley
5,297,061 A 3/1994 Dementhon et al.
D345,994 S 4/1994 Shian
5,331,583 A 7/1994 Hara et al.
5,528,265 A 7/1994 Harrison
5,335,011 A 8/1994 Addeo et al.
5,388,059 A 2/1995 DeMenthon
5,394,168 A 2/1995 Smith, III et al.
5,404,305 A 4/1995 Stiles, Jr.
5,412,619 A 5/1995 Bauer
5,426,450 A 6/1995 Drumm
5,435,554 A 7/1995 Lipson
5,440,326 A 8/1995 Quinn
5,453,758 A 9/1995 Sato
5,454,043 A 9/1995 Freeman
5,455,685 A 10/1995 Mori
5,473,701 A 12/1995 Cezanne et al.
5,485,273 A 1/1996 Mark et al.
5,497,158 A * 3/1996 Schmid ..... G01S 7/411 342/25 F
5,517,333 A 5/1996 Tamura et al.
5,534,917 A 7/1996 MacDougall
5,543,818 A 8/1996 Scott
5,551,693 A 9/1996 Goto et al.
5,554,033 A 9/1996 Bizzi et al.
5,554,980 A 9/1996 Hashimoto et al.
5,557,684 A 9/1996 Wang et al.
5,563,988 A 10/1996 Maes et al.
5,568,928 A 10/1996 Munson et al.
5,570,113 A 10/1996 Zetts
5,581,276 A 12/1996 Cipolla et al.
5,583,478 A 12/1996 Renzi
5,586,231 A 12/1996 Florent et al.
5,611,000 A 3/1997 Szeliski et al.
5,611,731 A 3/1997 Bouton et al.
5,616,078 A 4/1997 Oh
5,626,140 A 5/1997 Feldman et al.
D380,238 S 6/1997 Tyler
5,638,228 A 6/1997 Thomas et al.
5,643,087 A 7/1997 Marcus et al.
5,645,277 A 7/1997 Cheng
5,649,021 A 7/1997 Matey et al.
5,659,335 A 8/1997 Partridge
5,675,825 A 10/1997 Dreyer et al.
5,675,828 A 10/1997 Stoel et al.
5,677,710 A 10/1997 Thompson-Rohrlich
5,703,623 A 12/1997 Hall et al.
5,706,364 A 1/1998 Kopec et al.
5,706,419 A * 1/1998 Matsugu ..... G06T 17/00 345/420
5,724,106 A 3/1998 Autry et al.
5,768,415 A 6/1998 Jagadish et al.
5,796,354 A 8/1998 Cartabiano et al.
5,818,424 A 10/1998 Korth
5,846,086 A 12/1998 Bizzi et al.
5,850,222 A 12/1998 Cone
5,850,473 A 12/1998 Andersson
5,861,910 A 1/1999 McGarry et al.
5,870,100 A 2/1999 DeFreitas
5,883,616 A 3/1999 Koizumi et al.
5,889,505 A 3/1999 Toyama et al.
5,889,672 A 3/1999 Schuler et al.
5,900,863 A 5/1999 Numazaki
5,903,257 A 5/1999 Nishiumi et al.
5,913,727 A 6/1999 Ahdoot
5,914,723 A 6/1999 Gajewska
5,917,493 A 6/1999 Tan et al.
5,917,936 A 6/1999 Katto
5,923,306 A 7/1999 Smith et al.
5,923,318 A 7/1999 Zhai et al.
5,929,444 A 7/1999 Leichner
5,930,383 A 7/1999 Netzer
5,930,741 A 7/1999 Kramer
5,937,081 A 8/1999 O'Brill et al.
5,959,596 A 9/1999 McCarten et al.
5,963,145 A 10/1999 Escobosa
5,963,250 A 10/1999 Parker et al.
5,978,722 A 11/1999 Takasuka et al.
5,991,693 A 11/1999 Zalewski
5,993,314 A 11/1999 Dannenberg et al.
6,009,210 A 12/1999 Kang
6,014,167 A 1/2000 Suito et al.
6,021,219 A 2/2000 Andersson et al.
6,022,274 A 2/2000 Takeda et al.
6,031,545 A 2/2000 Ellenby et al.
6,031,934 A 2/2000 Ahmad et al.
6,037,942 A 3/2000 Millington
6,044,181 A 3/2000 Szeliski et al.
6,049,619 A 4/2000 Anandan et al.
6,055,330 A 4/2000 Eleftheriadis et al.
6,056,640 A 5/2000 Schaaij
6,057,909 A 5/2000 Yahav et al.
6,061,055 A 5/2000 Marks
6,067,468 A 5/2000 Korenman et al.
6,069,594 A 5/2000 Barnes et al.
6,072,494 A 6/2000 Nguyen
6,075,895 A 6/2000 Qiao et al.
6,078,789 A 6/2000 Bodenmann et al.
6,091,905 A 7/2000 Yahav et al.
6,094,625 A 7/2000 Ralston
6,097,369 A 8/2000 Wambach
6,100,517 A 8/2000 Yahav et al.
6,100,895 A 8/2000 Miura et al.

(56) References Cited

U.S. PATENT DOCUMENTS 6,101,289 A 8/2000 Kellner
6,102,803 A 8/2000 Takeda et al.
6,115,052 A 9/2000 Freeman et al.
6,134,346 A 10/2000 Berman et al.
6,144,367 A 11/2000 Berstis
6,146,278 A 11/2000 Kobayashi
6,151,009 A 11/2000 Kanade et al.
6,157,368 A 12/2000 Fager
6,160,540 A 12/2000 Fishkin et al.
6,166,744 A 12/2000 Jaszlics et al.
6,173,059 B1 1/2001 Huang et al.
6,173,610 B1 1/2001 Pace
6,175,343 B1 1/2001 Mitchell et al.
6,184,863 B1 2/2001 Sibert et al.
6,191,773 B1 2/2001 Maruno et al.
6,195,104 B1 2/2001 Lyons
6,203,432 B1 3/2001 Roberts et al.
6,215,898 B1 4/2001 Woodfill et al.
6,243,054 B1 6/2001 DeLuca
6,243,074 B1 6/2001 Fishkin et al.
6,243,491 B1 6/2001 Andersson
6,259,431 B1 7/2001 Futatsugi et al.
6,275,213 B1 8/2001 Tremblay et al.
6,281,930 B1 8/2001 Parker et al.
6,282,362 B1 8/2001 Murphy et al.
6,295,064 B1 9/2001 Yamaguchi
6,297,838 B1 10/2001 Chang et al.
6,304,267 B1 10/2001 Sata
6,307,549 B1 10/2001 King et al.
6,307,568 B1 10/2001 Rom
6,323,839 B1 11/2001 Fukuda et al.
6,323,942 B1 11/2001 Bamji
6,324,296 B1 11/2001 McSheery
6,326,901 B1 12/2001 Gonzales
6,327,073 B1 12/2001 Yahav et al.
6,331,911 B1 12/2001 Manassen et al.
6,338,485 B1 1/2002 Huettlinger
6,346,929 B1 2/2002 Fukushima et al.
6,351,661 B1 2/2002 Cosman
6,352,516 B1 3/2002 Pozos et al.
6,371,849 B1 4/2002 Togami
6,375,572 B1 4/2002 Masuyama
6,392,644 B1 5/2002 Miyata et al.
6,393,142 B1 5/2002 Swain et al.
6,394,897 B1 5/2002 Togami
6,400,374 B2 6/2002 Lanier
6,409,602 B1 6/2002 Wiltshire et al.
6,411,392 B1 6/2002 Bender et al.
6,411,744 B1 6/2002 Edwards
6,417,836 B1 7/2002 Kumar et al.
6,441,745 B1 8/2002 Gates
6,441,825 B1 8/2002 Peters
6,450,820 B1 9/2002 Palsson et al.
6,473,516 B1 10/2002 Kawaguchi et al.
6,489,946 B1 12/2002 Takeda et al.
6,489,948 B1 12/2002 Lau
6,498,628 B2 * 12/2002 Iwamura ..... 348/734
6,498,860 B1 12/2002 Sasaki et al.
6,501,258 B1 12/2002 Levitt et al.
6,504,535 B1 1/2003 Edmark
6,513,160 B2 1/2003 Dureau
6,515,669 B1 2/2003 Mohri
6,516,466 B1 2/2003 Jackson
6,519,359 B1 2/2003 Nafis et al.
6,533,420 B1 3/2003 Eichenlaub
6,542,927 B2 4/2003 Rhoads
6,544,124 B2 4/2003 Ireland et al.
6,545,661 B1 4/2003 Goschy et al.
6,545,706 B1 4/2003 Edwards et al.
6,546,153 B1 4/2003 Hoydal
6,556,704 B1 4/2003 Chen
6,559,813 B1 5/2003 DeLuca
6,567,071 B1 5/2003 Curran et al.
6,573,883 B1 6/2003 Bartlett
6,577,748 B2 6/2003 Chang
6,580,414 B1 6/2003 Wergen et al.
6,580,415 B1 6/2003 Kato et al.
6,587,573 B1 7/2003 Stam et al.
6,587,835 B1 7/2003 Treyz et al.
6,593,956 B1 7/2003 Potts et al.
6,595,642 B2 7/2003 Wirth
6,597,342 B1 7/2003 Haruta
6,611,141 B1 8/2003 Schulz et al. ..... G01C 21/165 324/207.12
6,621,938 B1 9/2003 Tanaka et al.
6,628,265 B2 9/2003 Hwang
6,661,914 B2 12/2003 Dufour
6,668,244 B1 12/2003 Rourke et al.
6,674,415 B2 1/2004 Nakamura et al.
6,676,522 B2 1/2004 Rowe et al.
6,677,967 B2 1/2004 Swano et al.
6,677,987 B1 1/2004 Girod
6,692,359 B1 2/2004 Williams et al.
6,699,123 B2 3/2004 Matsuura et al.
6,709,108 B2 3/2004 Levine et al.
6,712,703 B2 3/2004 Miyamoto et al.
6,720,949 B1 4/2004 Pryor et al.
6,727,988 B2 4/2004 Kim et al.
6,741,741 B2 5/2004 Farrell
6,746,124 B2 6/2004 Fischer et al.
6,747,632 B2 6/2004 Howard
6,749,510 B2 6/2004 Giobbi
6,751,338 B1 6/2004 Wallack
6,753,849 B1 6/2004 Curran et al.
6,766,036 B1 7/2004 Pryor
6,767,282 B2 7/2004 Matsuyama et al.
6,769,769 B2 8/2004 Podoleanu et al.
6,772,057 B2 8/2004 Breed et al.
6,774,939 B1 8/2004 Peng
6,785,329 B1 8/2004 Pan et al.
6,789,967 B1 9/2004 Forester
6,791,531 B1 9/2004 Johnston et al.
6,795,068 B1 9/2004 Marks
6,809,776 B1 10/2004 Simpson et al.
6,811,491 B1 11/2004 Levenberg et al.
6,819,318 B1 11/2004 Geng
6,846,238 B2 1/2005 Wells
6,847,311 B2 1/2005 Li
6,850,221 B1 2/2005 Tickle
6,863,609 B2 3/2005 Okuda et al.
6,870,526 B2 3/2005 Zngfet et al.
6,873,747 B2 3/2005 Askary
6,881,147 B2 4/2005 Naghi et al.
6,884,171 B2 4/2005 Eck et al.
6,890,262 B2 5/2005 Oishi et al.
6,912,464 B1 * 6/2005 Parker ..... G01C 21/005 701/500
6,917,688 B2 7/2005 Yu et al.
6,919,824 B2 7/2005 Lee
6,924,787 B2 8/2005 Kramer et al.
6,928,180 B2 8/2005 Stam et al.
6,930,725 B1 8/2005 Hayashi
6,931,125 B2 8/2005 Smallwood
6,931,596 B2 8/2005 Gutta et al.
6,943,776 B2 9/2005 Ehrenburg
6,945,653 B2 9/2005 Kobori et al.
6,947,576 B2 9/2005 Stam et al.
6,951,515 B2 10/2005 Ohshima et al.
6,952,198 B2 10/2005 Hansen
6,965,362 B1 11/2005 Ishizuka
6,970,183 B1 11/2005 Monroe
6,990,639 B2 1/2006 Wilson
7,006,009 B2 2/2006 Newman
7,016,411 B2 3/2006 Azuma et al.
7,016,532 B2 3/2006 Boncyk et al.
7,023,475 B2 4/2006 Bean et al.
7,030,856 B2 4/2006 Dawson et al.
7,039,199 B2 5/2006 Rui
7,039,253 B2 5/2006 Matsuoka et al.
7,042,440 B2 5/2006 Pryor et al.
7,043,056 B2 5/2006 Edwards et al.
7,054,452 B2 5/2006 Ukita
7,059,962 B2 6/2006 Watashiba
7,061,507 B1 6/2006 Tuomi et al.

(56) References Cited

U.S. PATENT DOCUMENTS 7,071,914 B1 7/2006 Marks
7,084,887 B1 8/2006 Sato et al.
7,090,352 B2 8/2006 Kobor et al.
7,098,891 B1 8/2006 Pryor
7,102,615 B2 9/2006 Marks
7,106,366 B2 9/2006 Parker et al.
7,113,635 B2 9/2006 Robert et al.
7,116,330 B2 10/2006 Marshall et al.
7,116,342 B2 10/2006 Dengler et al.
7,121,946 B2 10/2006 Paul et al.
7,139,767 B1 11/2006 Taylor et al.
7,148,922 B2 12/2006 Shimada
7,156,311 B2 1/2007 Attia et al.
7,158,118 B2 1/2007 Liberty
7,161,634 B2 1/2007 Long
7,164,413 B2 1/2007 Davis et al.
7,168,042 B2 1/2007 Braun et al.
7,174,312 B2 2/2007 Harper et al.
7,182,691 B1 2/2007 Schena
7,183,929 B1 2/2007 Antebi et al.
7,193,607 B2 3/2007 Moore et al.
7,212,308 B2 5/2007 Morgan
7,223,173 B2 5/2007 Masuyama et al.
7,224,384 B1 5/2007 Iddan et al.
7,227,526 B2 6/2007 Hildreth et al.
7,227,976 B1 6/2007 Jung et al.
7,233,316 B2 6/2007 Smith et al.
7,239,301 B2 7/2007 Liberty et al.
7,245,273 B2 7/2007 Eberl et al.
7,259,375 B2 8/2007 Tichit et al.
7,260,221 B1 8/2007 Atsmon
7,262,760 B2 8/2007 Liberty
7,263,462 B2 8/2007 Funge et al.
7,274,305 B1 9/2007 Lutrell
7,283,679 B2 10/2007 Okada et al.
7,296,007 B1 11/2007 Funge et al.
7,301,530 B2 11/2007 Lee et al.
7,301,547 B2 11/2007 Martins et al.
7,305,114 B2 12/2007 Wolff et al.
7,339,580 B2 3/2008 Westerman et al.
7,346,387 B1 3/2008 Wachter et al.
7,352,358 B2 4/2008 Zalewski et al.
7,352,359 B2 4/2008 Zalewski et al.
7,364,297 B2 4/2008 Goldfain et al.
7,379,559 B2 5/2008 Wallace et al.
7,391,409 B2 6/2008 Zalewski et al.
7,414,611 B2 8/2008 Liberty
7,432,910 B2 10/2008 Shahoian
7,436,887 B2 10/2008 Yeredor et al.
7,446,650 B2 11/2008 Scholfield et al.
7,489,298 B2 2/2009 Liberty et al.
7,489,299 B2 2/2009 Liberty et al.
7,545,926 B2 6/2009 Mao
7,555,157 B2 6/2009 Davidson et al.
7,558,432 B2 7/2009 Zaharia et al.
7,558,698 B2 7/2009 Funge et al.
7,565,295 B1 7/2009 Hernandez-Rebollar
7,613,610 B1 11/2009 Zimmerman et al.
7,623,115 B2 11/2009 Marks
7,627,139 B2 12/2009 Marks et al.
7,636,645 B1 12/2009 Yen et al.
7,636,697 B1 12/2009 Dobson et al.
7,636,701 B2 12/2009 Funge et al.
7,646,372 B2 1/2010 Marks et al.
7,665,041 B2 2/2010 Wilson et al.
7,697,700 B2 4/2010 Mao
7,721,231 B2 5/2010 Wilson
7,737,944 B2 6/2010 Harrison et al.
7,774,155 B2 * 8/2010 Sato ..... A63F 13/06 345/156
7,782,297 B2 * 8/2010 Zalewski et al. ..... 345/156
7,826,641 B2 11/2010 Mandella et al.
7,843,429 B2 11/2010 Pryor
7,850,526 B2 * 12/2010 Zalewski et al. ..... 463/36
7,918,733 B2 4/2011 Zalewski et al.
8,072,424 B2 12/2011 Liberty
8,096,880 B2 1/2012 Jawad et al.
8,179,366 B2 5/2012 Richardson et al.
8,310,656 B2 11/2012 Zalewski
8,313,380 B2 11/2012 Zalewski et al.
8,570,378 B2 10/2013 Zalewski et al.
2001/0011995 A1 3/2001 Hinckley et al.
2001/0024973 A1 9/2001 Meredith
2001/0056477 A1 12/2001 McTernan et al.
2002/0010655 A1 1/2002 Kjallstrom
2002/0022519 A1 2/2002 Ogino
2002/0023027 A1 2/2002 Simonds
2002/0024500 A1 2/2002 Howard
2002/0036617 A1 3/2002 Pryor
2002/0041327 A1 4/2002 Hildreth et al.
2002/0056114 A1 5/2002 Fillebrown et al.
2002/0061739 A1 5/2002 Nakamura et al.
2002/0071036 A1 6/2002 Gonzales et al.
2002/0072414 A1 6/2002 Stylinski et al.
2002/0075286 A1 6/2002 Yonezawa et al.
2002/0083461 A1 6/2002 Hutcheson et al.
2002/0085097 A1 7/2002 Colmenarez et al.
2002/0089412 A1 7/2002 Heger et al.
2002/0094189 A1 7/2002 Navab et al.
2002/0110273 A1 8/2002 Dufour
2002/0126899 A1 9/2002 Farrell
2002/0134151 A1 9/2002 Naruoka et al.
2002/0158873 A1 10/2002 Williamson
2002/0171622 A1 11/2002 Shen et al.
2002/0171625 A1 11/2002 Rothchild
2003/0014212 A1 1/2003 Ralston et al.
2003/0020718 A1 1/2003 Marshall et al.
2003/0022716 A1 1/2003 Park et al.
2003/0032466 A1 2/2003 Watashiba
2003/0032484 A1 2/2003 Ohshima et al.
2003/0034961 A1 2/2003 Kao
2003/0038778 A1 2/2003 Noguera
2003/0063065 A1 4/2003 Lee et al.
2003/0064712 A1 4/2003 Gaston et al.
2003/0073492 A1 4/2003 Tosaki et al.
2003/0092493 A1 5/2003 Shimizu et al.
2003/0093591 A1 5/2003 Hohl
2003/0096650 A1 5/2003 Eguchi et al.
2003/0100363 A1 5/2003 Ali
2003/0128187 A1 6/2003 Strubbe
2003/0123705 A1 7/2003 Stam et al.
2003/0160862 A1 8/2003 Charlier et al.
2003/0169233 A1 9/2003 Hansen
2003/0193572 A1 10/2003 Wilson et al.
2003/0232649 A1 12/2003 Gizis et al.
2004/0001082 A1 1/2004 Said
2004/0017355 A1 1/2004 Shim
2004/0023736 A1 2/2004 Cardinale
2004/0029640 A1 2/2004 Masuyama et al.
2004/0035925 A1 2/2004 Wu et al.
2004/0046736 A1 3/2004 Pryor et al.
2004/0047464 A1 3/2004 Yu et al.
2004/0051680 A1 * 3/2004 Azuma ..... G03B 13/28 345/8
2004/0054512 A1 3/2004 Kim et al.
2004/0063480 A1 4/2004 Wang
2004/0063481 A1 4/2004 Wang
2004/0063502 A1 4/2004 Hussaini et al.
2004/0070564 A1 4/2004 Dawson et al.
2004/0070565 A1 4/2004 Nayar et al.
2004/0087366 A1 5/2004 Shum et al.
2004/0095327 A1 5/2004 Lo
2004/0104891 A1 6/2004 Sacca et al.
2004/0140955 A1 7/2004 Metz
2004/0150728 A1 8/2004 Ogino
2004/0155962 A1 8/2004 Marks
2004/0174473 A1 9/2004 Cavanaugh et al.
2004/0178576 A1 9/2004 Hillis et al.
2004/0180720 A1 9/2004 Nashi et al.
2004/0189720 A1 9/2004 Wilson et al.
2004/0204240 A1 10/2004 Barney
2004/0207597 A1 10/2004 Marks
2004/0213419 A1 10/2004 Varma et al.
2004/0222970 A1 11/2004 Martinez et al.

(56) References Cited

U.S. PATENT DOCUMENTS

| | | | |
|---|---|---|---|
| 2004/0227725 | A1 | 11/2004 | Calarco et al. |
| 2004/0239670 | A1 | 12/2004 | Marks |
| 2004/0240542 | A1 | 12/2004 | Yeredor et al. |
| 2004/0254017 | A1 | 12/2004 | Cheng |
| 2004/0266528 | A1 | 12/2004 | Wang |
| 2005/0009605 | A1 | 1/2005 | Rosenberg et al. |
| 2005/0026684 | A1 | 2/2005 | Sumi et al. |
| 2005/0037844 | A1 | 2/2005 | Shum et al. |
| 2005/0047611 | A1 | 3/2005 | Mao |
| 2005/0054457 | A1 | 3/2005 | Eyestone et al. |
| 2005/0059488 | A1 | 3/2005 | Larsen |
| 2005/0064936 | A1 | 3/2005 | Pryor |
| 2005/0075167 | A1 | 4/2005 | Beaulieu et al. |
| 2005/0085298 | A1 | 4/2005 | Woolston |
| 2005/0088369 | A1 | 4/2005 | Yoshioka |
| 2005/0102374 | A1 | 5/2005 | Moragne et al. |
| 2005/0105777 | A1 | 5/2005 | Kozlowski et al. |
| 2005/0117045 | A1 | 6/2005 | Abdellatif et al. |
| 2005/0157204 | A1 | 7/2005 | Marks |
| 2005/0162384 | A1 | 7/2005 | Yokoyama |
| 2005/0162385 | A1 | 7/2005 | Yokoyama |
| 2005/0174324 | A1 | 8/2005 | Liberty et al. |
| 2005/0181878 | A1 | 8/2005 | Danieli et al. |
| 2005/0198095 | A1 | 9/2005 | Du et al. |
| 2005/0215320 | A1 | 9/2005 | Koay et al. |
| 2005/0226431 | A1 | 10/2005 | Mao |
| 2005/0239548 | A1 | 10/2005 | Ueshima et al. |
| 2005/0282603 | A1 | 12/2005 | Parrott et al. |
| 2006/0025229 | A1 | 2/2006 | Mahajan et al. |
| 2006/0033713 | A1 | 2/2006 | Pryor |
| 2006/0035710 | A1 | 2/2006 | Festejo et al. |
| 2006/0038819 | A1 | 2/2006 | Festejo et al. |
| 2006/0126900 | A1 | 6/2006 | Mihara et al. |
| 2006/0139322 | A1 | 6/2006 | Marks |
| 2006/0143571 | A1 | 6/2006 | Chan |
| 2006/0166738 | A1 | 7/2006 | Eyestone et al. |
| 2006/0183546 | A1 | 8/2006 | Addington et al. |
| 2006/0204012 | A1 | 9/2006 | Marks |
| 2006/0227211 | A1 | 10/2006 | Kotake |
| 2006/0233389 | A1 | 10/2006 | Mao |
| 2006/0239471 | A1 | 10/2006 | Mao |
| 2006/0252474 | A1 | 11/2006 | Zalewski |
| 2006/0252475 | A1 | 11/2006 | Zalewski |
| 2006/0252477 | A1 | 11/2006 | Zalewski |
| 2006/0252541 | A1 | 11/2006 | Zalewski et al. |
| 2006/0252543 | A1 | 11/2006 | Van Noland et al. |
| 2006/0256081 | A1 | 11/2006 | Zalewski |
| 2006/0264258 | A1 | 11/2006 | Zalewski et al. |
| 2006/0264259 | A1* | 11/2006 | Zalewski et al. ..... 463/36 |
| 2006/0264260 | A1 | 11/2006 | Zalewski |
| 2006/0269072 | A1 | 11/2006 | Mao |
| 2006/0269073 | A1 | 11/2006 | Mao |
| 2006/0274032 | A1 | 12/2006 | Mao et al. |
| 2006/0274911 | A1 | 12/2006 | Mao |
| 2006/0277571 | A1 | 12/2006 | Marks |
| 2006/0280312 | A1 | 12/2006 | Mao |
| 2006/0281550 | A1 | 12/2006 | Schena |
| 2006/0282873 | A1 | 12/2006 | Zalewski |
| 2006/0287084 | A1 | 12/2006 | Mao |
| 2006/0287085 | A1 | 12/2006 | Mao |
| 2006/0287086 | A1 | 12/2006 | Zalewski |
| 2006/0287087 | A1 | 12/2006 | Zalewski |
| 2007/0015558 | A1 | 1/2007 | Zalewski |
| 2007/0015559 | A1 | 1/2007 | Zalewski |
| 2007/0021208 | A1 | 1/2007 | Mao |
| 2007/0025562 | A1 | 2/2007 | Zalewski |
| 2007/0060336 | A1 | 3/2007 | Marks et al. |
| 2007/0061413 | A1 | 3/2007 | Larsen |
| 2007/0066394 | A1 | 3/2007 | Ikeda et al. |
| 2007/0072675 | A1 | 3/2007 | Hamano et al. |
| 2007/0120834 | A1 | 5/2007 | Boillot |
| 2007/0120996 | A1 | 5/2007 | Boillot |
| 2007/0260340 | A1 | 11/2007 | Mao et al. |
| 2007/0260517 | A1 | 11/2007 | Zalewski |
| 2007/0261077 | A1 | 11/2007 | Zalewski |
| 2007/0270215 | A1 | 11/2007 | Miyamoto et al. |
| 2007/0270217 | A1 | 11/2007 | Rabin |
| 2007/0293317 | A1 | 12/2007 | Sato et al. |
| 2008/0056561 | A1 | 3/2008 | Sawachi |
| 2008/0070684 | A1 | 3/2008 | Haigh-Hutchinson |
| 2008/0091421 | A1 | 4/2008 | Gustavsson |
| 2008/0208613 | A1 | 8/2008 | Scibora |
| 2009/0010494 | A1 | 1/2009 | Bechtel et al. |
| 2009/0016642 | A1 | 1/2009 | Hart |
| 2009/0067291 | A1 | 3/2009 | Atsmon et al. |
| 2009/0118012 | A1 | 5/2009 | Sternberg |
| 2009/0221368 | A1 | 9/2009 | Yen et al. |
| 2009/0221374 | A1 | 9/2009 | Yen et al. |
| 2009/0288064 | A1 | 11/2009 | Yen et al. |
| 2010/0004896 | A1 | 1/2010 | Yen et al. |
| 2010/0137064 | A1 | 6/2010 | Shum et al. |
| 2011/0074669 | A1 | 3/2011 | Marks et al. |
| 2011/0077082 | A1 | 3/2011 | Marks et al. |
| 2011/0118021 | A1 | 5/2011 | Zalewski et al. |

FOREIGN PATENT DOCUMENTS

| | | | | |
|---|---|---|---|---|
| EP | 0750202 | | 12/1996 | ..... G01S 17/00 |
| EP | 0750202 | | 5/1998 | |
| EP | 0867798 | | 9/1998 | |
| EP | 0613294 | | 10/1998 | |
| EP | 1098686 | | 5/1999 | |
| EP | 1074934 | | 2/2001 | |
| EP | 1176559 | A2 | 1/2002 | |
| EP | 1180384 | | 2/2002 | |
| EP | 1206950 | | 5/2002 | |
| EP | 0652686 | | 8/2002 | |
| EP | 1279425 | | 1/2003 | |
| EP | 1306112 | | 5/2003 | |
| EP | 0869458 | | 7/2003 | |
| EP | 1335338 | | 8/2003 | |
| EP | 1358918 | | 11/2003 | |
| EP | 1402929 | | 3/2004 | |
| EP | 1411461 | | 4/2004 | |
| EP | 1435258 | | 7/2004 | ..... A63F 13/04 |
| EP | 1435258 | | 9/2004 | |
| EP | 0835676 | | 10/2004 | |
| EP | 0823683 | | 7/2005 | |
| EP | 1553486 | A1 | 7/2005 | |
| EP | 1489596 | | 9/2006 | |
| EP | 1033882 | | 9/2009 | |
| EP | 1449358 | | 2/2011 | |
| FR | 2780176 | | 6/1998 | |
| FR | 2814965 | | 4/2002 | |
| FR | 2832892 | | 4/2004 | |
| GB | 2206716 | | 1/1989 | |
| GB | 2388418 | A | 3/2002 | |
| GB | 2376397 | | 12/2002 | |
| GB | 2398691 | A | 8/2004 | |
| JP | 1138949 | | 5/1989 | |
| JP | 1284897 | | 11/1989 | |
| JP | 6-198075 | A | 7/1994 | |
| JP | 6102980 | | 12/1994 | |
| JP | 9128141 | | 5/1997 | |
| JP | 9185456 | | 7/1997 | |
| JP | 9265346 | | 10/1997 | |
| JP | 2000-123186 | A | 4/2000 | |
| JP | 2000-172431 | | 6/2000 | ..... G06F 3/033 |
| JP | 2000-259340 | | 9/2000 | |
| JP | 2000/259856 | | 9/2000 | |
| JP | 2000/350859 | | 12/2000 | |
| JP | 2001-166676 | | 6/2001 | ..... G09B 9/00 |
| JP | 2001-170358 | A | 6/2001 | |
| JP | 2002-306846 | A | 10/2002 | |
| JP | 2002306846 | | 10/2002 | |
| JP | 2002320773 | | 11/2002 | |
| JP | 2002/369969 | | 12/2002 | |
| JP | 2003-78779 | A | 3/2003 | |
| JP | 2003-126548 | A | 5/2003 | |
| JP | 2003135851 | | 5/2003 | |
| JP | 2003-236244 | A | 8/2003 | |
| JP | 2004-145448 | | 5/2004 | ..... G06T 17/40 |
| JP | 2004-336740 | A | 11/2004 | |
| JP | 2005/046422 | | 2/2005 | |

(56) References Cited

FOREIGN PATENT DOCUMENTS

| | | | | |
|---|---|---|---|---|
| JP | 2006-509548 | A | 3/2006 | |
| JP | 2006-99468 | A | 4/2006 | |
| JP | 2011-045780 | | 3/2011 | |
| WO | 88/05942 | | 8/1988 | |
| WO | 98/48571 | | 4/1997 | |
| WO | 99/35633 | | 1/1999 | |
| WO | 99/26198 | | 5/1999 | |
| WO | 99/26198 | | 10/1999 | |
| WO | WO 99/26198 | | 10/1999 | |
| WO | 01/18563 | | 3/2001 | |
| WO | WO 02/27456 | | 2/2002 | ..... G06F 3/00 |
| WO | 02/052496 | | 7/2002 | |
| WO | WO 3/079179 | | 9/2003 | ..... G06F 3/033 |
| WO | 2004/041379 | A2 | 5/2004 | |
| WO | 2004073814 | | 9/2004 | |
| WO | 2004073815 | | 9/2004 | |
| WO | 2005073838 | A2 | 8/2005 | |
| WO | 2005/107911 | | 11/2005 | |
| WO | 2005113086 | A1 | 12/2005 | |
| WO | 2006/121896 | | 11/2006 | |
| WO | 2007/095082 | | 8/2007 | |
| WO | 2008056180 | A2 | 5/2008 | |

OTHER PUBLICATIONS

USPTO; Office Action issued in U.S. Appl. No. 11/536,559; mailed Jun. 30, 2008; 8 pages.

USPTO; Office Action issued in U.S. Appl. No. 11/382,034; mailed Aug. 4, 2008; 14 pages.

Patent Cooperation Treaty; "International Search Report" issued in PCT/US07/67367, which corresponds to U.S. Appl. Nos. 11/382,034; 11/382,037; 11/382,039; mailed Jun. 3, 2008; 2 pages.

Patent Cooperation Treaty; "Written Opinion of the International Searching Authority" issued in PCT/US07/67367, which corresponds to U.S. Appl. Nos. 11/382,034; 11/382,037; 11/382,039; mailed Jun. 3, 2008; 5 pages.

Patent Cooperation Treaty; "Notification Concerning Transmittal of the International Search Report and the Written Opinion of the International Searching Authority or the Declaration" issued in PCT/US07/67367, which corresponds to U.S. Appl. Nos. 11/382,034; 11/382,037; 11/382,039; mailed Jun. 3, 2008; 2 pages.

USPTO; Final Office Action issued in U.S. Appl. No. 11/382,034; mailed Mar. 9, 2009; 28 pages.

USPTO; Office Action issued in U.S. Appl. No. 11/382,037; mailed Oct. 2, 2008; 6 pages.

USPTO; Final Office Action issued in U.S. Appl. No. 11/382,043; mailed Sep. 4, 2008; 15 pages.

USPTO; Office Action issued in U.S. Appl. No. 11/382,043; mailed Feb. 9, 2009; 20 pages.

USPTO; Office Action issued in U.S. Appl. No. 11/382,039; mailed Oct. 1, 2008; 6 pages.

USPTO; Office Action issued in U.S. Appl. No. 11/382,259; mailed Sep. 15, 2008; 15 pages.

USPTO; Final Office Action issued in U.S. Appl. No. 11/382,259; mailed Mar. 25, 2009; 17 pages.

USPTO; Office Action issued in U.S. Appl. No. 11/382,258; mailed Sep. 17, 2008; 11 pages.

USPTO; Final Office Action issued in U.S. Appl. No. 11/382,258; mailed Mar. 19, 2009; 14 pages.

Patent Cooperation Treaty; "International Search Report" issued in PCT/US07/67697, which corresponds to U.S. Pub. No. 2007/0015558A1; mailed Sep. 15, 2008; 3 pages.

Patent Cooperation Treaty; "Written Opinion of the International Searching Authority" issued in PCT/US07/67697, which corresponds to U.S. Pub. No. 2007/0015558A1; mailed Sep. 15, 2008; 7 pages.

Patent Cooperation Treaty; "Notification Concerning Transmittal of the International Search Report and the Written Opinion of the International Searching Authority or the Declaration" issued in PCT/US07/67697, which corresponds to U.S. Pub. No. 2007/0015558A1; mailed Sep. 15, 2008; 1 page.

Patent Cooperation Treaty; "International Search Report" issued in PCT/US07/67961, which corresponds to U.S. Pub. No. 2006/0282873A1; mailed Sep. 16, 2008; 2 pages.

Patent Cooperation Treaty; "Written Opinion of the International Searching Authority" issued in PCT/US07/67961, which corresponds to U.S. Pub. No. 2006/0282873A1; mailed Sep. 16, 2008; 3 pages.

Patent Cooperation Treaty; "Notification Concerning Transmittal of the International Search Report and the Written Opinion of the International Searching Authority or the Declaration" issued in PCT/US07/67961, which corresponds to U.S. Pub. No. 2006/0282873A1; mailed Sep. 16, 2008; 1 page.

USPTO; Final Office Action issued in U.S. Appl. No. 11/536,559; mailed Sep. 15, 2008; 8 pages.

USPTO; Office Action issued in U.S. Appl. No. 11/536,559; mailed Mar. 2, 2009; 8 pages.

USPTO; Office Action issued in U.S. Appl. No. 11/624,637; mailed Oct. 1, 2008; 9 pages.

USPTO; Final Office Action issued in U.S. Appl. No. 11/382,699; mailed Sep. 23, 2008; 11 pages.

Gary Zalewski; "Method and Apparatus for Tracking Three-Dimensional Movements of an Object Using a Depth Sensing Camera"; U.S. Appl. No. 12/262,044, filed Oct. 30, 2008; 76 pages.

USPTO; Office Action issued in U.S. Appl. No. 11/382,250; mailed Jul. 22, 2008; 11 pages.

Patent Cooperation Treaty; "International Search Report" issued in PCT/US08/73196, which corresponds to U.S. Pub. No. 2008/0080789A1, U.S. Appl. No. 11/840,170; mailed Nov. 7, 2008; 2 pages.

Patent Cooperation Treaty; "Written Opinion of the International Searching Authority" issued in PCT/US08/73196, which corresponds to U.S. Pub. No. 2008/0080789A1, U.S. Appl. No. 11/840,170; mailed Nov. 7, 2008; 4 pages.

Patent Cooperation Treaty; "Notification Concerning Transmittal of the International Search Report and the Written Opinion of the International Searching Authority or the Declaration" issued in PCT/US08/73196, which corresponds to U.S. Pub. No. 2008/0080789A1, U.S. Appl. No. 11/840,170; mailed Nov. 7, 2008; 1 page.

USPTO, Office Action from U.S. Appl. No. 11/382,043; U.S. Pub. No. US-2006-0264260-A1; mailed Feb. 5, 2008; 16 pages.

USPTO, Office Action from U.S. Appl. No. 11/382,699; U.S. Pub. No. US-2007-0265075-A1; mailed Feb. 14, 2008; 15 pages.

USPTO, Office Action from U.S. Appl. No. 11/536,559; mailed Dec. 10, 2007; 6 pages.

Naturalpoint Inc., "NaturalPoint TrackIR, TrackIR Software Version 3.10 Manual", Old TrackIR Manual 3.10, posted on the Internet May 3, 2004, pp. 1-35.

Naturalpoint Inc., "NaturalPoint TrackIR, Users Manual version 4.0.020", TrackIR 3 :: TrackIR Manual 4.0.020, posted on the Internet Jan. 9, 2005, pp. 1-29.

Naturalpoint Inc., "Vector Expansion QuickStart Guide v2", posted on the Internet Jan. 11, 2005, 1 page.

Naturalpoint Inc., "NaturalPoint TrackIR, Users Manual version 4.1.028", TrackIR 4:Pro :: TrackIR Manual 4.1.028, posted on the Internet Nov. 15, 2005, pp. 1-30.

Naturalpoint Inc., "TrackClip PRO Quick Start Guide", posted on the Internet Dec. 12, 2006, 1 page.

Naturalpoint Inc., "TrackIR Newsletter", Newsletters from TrackIR website: http://www.naturalpoint.com/trackir/04-community/newsletters/, dated Jan. 2005 through Sep. 2006 (printed from the Internet Mar. 7, 2008), pp. 1-48.

Naturalpoint Inc., "TrackIR : head tracking view control immersion for flight racing and action simulator", Pages from TrackIR website: http://www.naturalpoint.com/trackir/, Copyright Jul. 2005 (printed from the Internet Mar. 7, 2008), pp. 1-59.

USPTO; Office Action issued in U.S. Appl. No. 11/382,034; mailed Nov. 13, 2009; 33 pages.

USPTO; Final Office Action issued in U.S. Appl. No. 11/382,037; mailed Sep. 29, 2009; 7 pages.

(56) References Cited

OTHER PUBLICATIONS

USPTO; Advisory Action issued in U.S. Appl. No. 11/382,043; mailed Dec. 11, 2009; 4 pages.
European Patent Office; "Extended European Search Report (including the Supplementary European Search Report and the European Search Opinion)" issued in European Application No. EP 07 76 1296 for PCT/US2007/067437; dated Nov. 30, 2009; 8 pages.
USPTO; Final Office Action issued in U.S. Appl. No. 11/536,559; mailed Oct. 13, 2009; 8 pages.
USPTO; Final Office Action issued in U.S. Appl. No. 11/536,559; mailed Feb. 26, 2010; 9 pages.
USPTO; Notice of Allowance issued in U.S. Appl. No. 11/624,637 (Publication No. US 2008-0274804 A1) ; mailed Jan. 29, 2010; 6 pages.
USPTO; Final Office Action issued in U.S. Appl. No. 11/382,699; mailed Oct. 29, 2009; 11 pages.
USPTO; Office Action issued in U.S. Appl. No. 11/551,197; mailed Mar. 18, 2010; 9 pages.
USPTO; Office Action issued in U.S. Appl. No. 11/382,039; mailed Dec. 8, 2009; 8 pages.
USPTO; Notice of Allowance and Fee(s) Due issued in U.S. Appl. No. 11/382,258; mailed Sep. 24, 2009; 7 pages.
USPTO; Notice of Allowance and Fee(s) Due issued in U.S. Appl. No. 11/382,258; mailed Mar. 30, 2010; 4 pages.
USPTO; Final Office Action issued in U.S. Appl. No. 11/382,034; mailed Jun. 16, 2010; 34 pages.
USPTO; Office Action issued in U.S. Appl. No. 11/382,037; mailed Mar. 31, 2010; 8 pages.
USPTO; Office Action issued in U.S. Appl. No. 11/382,043; mailed Jun. 23, 2010; 16 pages.
USPTO; Office Action issued in U.S. Appl. No. 11/382,039; mailed Jun. 8, 2010; 8 pages.
USPTO; Office Action issued in U.S. Appl. No. 11/382,251; mailed Jun. 21, 2010; 10 pages.
USPTO; Advisory Action issued in U.S. Appl. No. 11/536,559; mailed Jun. 16, 2010; 3 pages.
USPTO; Interview Summary issued in U.S. Appl. No. 11/624,637; mailed May 5, 2009; 2 pages.
USPTO; Interview Summary issued in U.S. Appl. No. 11/382,699; mailed Mar. 29, 2010; 3 pages.
USPTO; Interview Summary issued in U.S. Appl. No. 11/382,699; mailed Apr. 26, 2010; 3 pages.
USPTO; Notice on Panel Decision issued in U.S. Appl. No. 11/382,699; mailed May 26, 2010; 2 pages.
U.S. Appl. No. 11/838,823, filed Aug. 14, 2007, Benoist.
U.S. Appl. No. 11/624,637, filed Jan. 18, 2007, Harrison.
U.S. Appl. No. 11/551,682, filed Oct. 20, 2006, Mondesir.
U.S. Appl. No. 11/551,197, filed Oct. 19, 2006, Mondesir.
U.S. Appl. No. 11/536,559, filed Sep. 28, 2006, Zalewski.
U.S. Appl. No. 11/382,699, filed May 10, 2006, Zalewski.
U.S. Appl. No. 29/259,348, filed May 6, 2006, Zalewski.
U.S. Appl. No. 29/259,349, filed May 6, 2006, Goto.
U.S. Appl. No. 29/259,350, filed May 6, 2006, Zalewski.
U.S. Appl. No. 60/798,031, filed May 6, 2006, Woodard.
U.S. Appl. No. 11/381,727, filed May 4, 2006, Mao.
U.S. Appl. No. 11/381,728, filed May 4, 2006, Mao.
U.S. Appl. No. 11/381,729, filed May 4, 2006, Mao.
U.S. Appl. No. 11/301,673, filed Dec. 12, 2005, Marks.
U.S. Appl. No. 60/718,145, filed Sep. 15, 2005, Hernandez-Abrego.
U.S. Appl. No. 60/678,413, filed May 5, 2005, Marks.
U.S. Appl. No. 29/246,743, filed May 8, 2006.
U.S. Appl. No. 29/246,744, filed May 8, 2006.
U.S. Appl. No. 29/246,759, filed May 8, 2006.
U.S. Appl. No. 29/246,762, filed May 8, 2006.
U.S. Appl. No. 29/246,763, filed May 8, 2006.
U.S. Appl. No. 29/246,764, filed May 8, 2006.
U.S. Appl. No. 29/246,765, filed May 8, 2006.
U.S. Appl. No. 29/246,766, filed May 8, 2006.
U.S. Appl. No. 29/246,767, filed May 8, 2006.
U.S. Appl. No. 29/246,768, filed May 8, 2006.
USPTO; Final Office Action issued in U.S. Appl. No. 11/382,043; mailed Aug. 21, 2009; 14 pages.
USPTO; Office Action issued in U.S. Appl. No. 11/624,637; mailed Sep. 15, 2009; 11 pages.
Nintendo; "Super Mario 64 Instruction Booklet"; released Jun. 1996; pp. 1-25 plus title pages (all included in the attached 14 page PDF).
USPTO; Final Office Action issued in U.S. Appl. No. 11/382,037; mailed May 11, 2009; 6 pages.
USPTO; Final Office Action issued in U.S. Appl. No. 11/382,039; mailed May 6, 2009; 7 pages.
USPTO; Advisory Action issued in U.S. Appl. No. 11/382,259; mailed Jul. 7, 2009; 9 pages.
USPTO; Advisory Action issued in U.S. Appl. No. 11/536,559; mailed Jan. 15, 2009; 3 pages.
USPTO; Final Office Action issued in U.S. Appl. No. 11/624,637; mailed Apr. 6, 2009; 19 pages.
USPTO; Office Action issued in U.S. Appl. No. 11/551,682; mailed May 26, 2009; 10 pages.
USPTO; Advisory Action issued in U.S. Appl. No. 11/382,699; mailed Mar. 11, 2009; 3 pages.
USPTO; Office Action issued in U.S. Appl. No. 11/382,699; mailed Apr. 24, 2009; 11 pages.
USPTO; Advisory Action issued in U.S. Appl. No. 11/382,034; mailed Sep. 21, 2010; 4 pages.
USPTO; Office Action issued in U.S. Appl. No. 11/382,034; mailed Dec. 23, 2010; 40 pages.
USPTO; Notice of Allowance issued in U.S. Appl. No. 11/382,037; mailed Sep. 20, 2010; 11 pages.
USPTO; Supplemental Notice of Allowability issued in U.S. Appl. No. 11/382,037; mailed Nov. 16, 2010; 5 pages.
USPTO; Final Office Action issued in U.S. Appl. No. 11/382,043; mailed Oct. 22, 2010; 17 pages.
USPTO; Final Office Action issued in U.S. Appl. No. 11/382,039; mailed Nov. 24, 2010; 9 pages.
USPTO; Notice of Allowance issued in U.S. Appl. No. 11/536,559; mailed Aug. 25, 2010; 4 pages.
USPTO; Office Action issued in U.S. Appl. No. 11/551,197; mailed Sep. 1, 2010; 10 pages.
Korean Intellectual Property Office; "Notice of Preliminary Rejection" issued in Korean Patent Application No. 10-2009-706674; mailed Oct. 19, 2010; 8 pages.
USPTO; Office Action issued in U.S. Appl. No. 11/382,699; mailed Aug. 17, 2010; 12 pages.
USPTO; Office Action issued in U.S. Appl. No. 11/382,034; mailed Jun. 28, 2011; 43 pages.
USPTO; Notice of Allowance issued in U.S. Appl. No. 11/382,037; mailed Feb. 3, 2011; 6 pages.
USPTO; Office Action issued in U.S. Appl. No. 11/382,037; mailed May 26, 2011; 6 pages.
USPTO; Advisory Action issued in U.S. Appl. No. 11/382,043; mailed Jan. 26, 2011; 3 pages.
USPTO; Final Office Action issued in U.S. Appl. No. 11/382,043; mailed Apr. 13, 2011; 18 pages.
USPTO; Supplemental Final Office Action issued in U.S. Appl. No. 11/382,043; mailed Apr. 21, 2011; 18 pages.
USPTO; Advisory Action issued in U.S. Appl. No. 11/382,039; mailed Feb. 4, 2011; 3 pages.
USPTO; Office Action issued in U.S. Appl. No. 11/382,039; mailed May 12, 2011; 10 pages.
EPO; Extended Search Report issued in European Application No. 07797288.3; dated Feb. 21, 2011; 8 pages.
USPTO; Office Action issued in U.S. Appl. No. 11/382,251; mailed Dec. 8, 2010; 12 pages.
USPTO; Notice of Allowance issued in U.S. Appl. No. 11/536,559; mailed Jan. 31, 2011; 4 pages.
USPTO; Notice of Allowance issued in U.S. Appl. No. 11/536,559; mailed May 12, 2011; 5 pages.
State Intellectual Property Office, P.R. China; First Office Action in Chinese Patent Application No. 200880000845.3, mailed Dec. 21, 2010; 8 pages.
USPTO; Final Office Action issued in U.S. Appl. No. 11/382,699; mailed Feb. 1, 2011; 12 pages.

(56) References Cited

OTHER PUBLICATIONS

USPTO; Interview Summary issued in U.S. Appl. No. 11/382,699; mailed Apr. 13, 2011; 3 pages.
Bolt, R.A., "'Put-that-there': voice and gesture at the graphics interface", Computer Graphics, vol. 14, No. 3 (ACM SIGGRAPH Conference Proceedings) Jul. 1980, pp. 262-270.
Dewitt, Thomas and Edelstein, Phil, "Pantomation: A System for Position Tracking," Proceedings of the 2nd Symposium on Small Computers in the Arts, Oct. 1982, pp. 61-69.
Gvili, et al., "Depth Keying", SPIE vol. 5006 (2003), 2003 SPIE-IS&T, pp. 564-574 (031).
Hemmi, et al., "3-D Natural Interactive Interface-Using Marker Tracking from a Single View", Sep. 9, 1991, Systems and Computers in Japan.
Ephraim et al. "Speech Enhancement Using a Minimum Mean-Square Error Log-Spectral Amplitude Estimator", 1985, IEEE.
Ephraim et al. "Speech Enhancement Using a Minimum Mean-Square Error Short-Time Spectral Amplitude Estimator", 1984, IEEE.
Richardson et al. "Virtual Network Computing", 1998, IEEE Internet Computing vol. 2.
Wilson et al., "Audio-Video Array Source Localization for Intelligent Environments", 2002 IEEE Dept. of Electrical Eng and Computer Science, MIT, Cambridge, MA 02139.
Fiala, et al., "A Panoramic Video and Acoustic Beamforming Sensor for Videoconferencing", 2004 IEEE, Computational Video Group, National Research Council, Ottawa, Canada KIA OR6.
Kanade, et al., "A Stereo Machine for Video-rate Dense Depth Mapping and Its New Application" 1996, CVPR 96, IEEE Computer Society Conference, pp. 196-202 (022).
Nakamura, et al., "A Consideration on Reconstructing 3-D Model Using Object Views", 2004-01601-003, pp. 17-21, Kokkaido University, Japan, nakamura@media.eng.hokudal.ac.jp.
Nakagawa, et al., "A Collision Detection and Motion Image Synthesis Between a Background Image and a Foreground 3-Dimensional Object", TVRSJ Bol. 4, No. 2, pp. 425-430, 1999, Japan.
Nishida, et al., "A Method of Estimating Human Shapes by Fitting the Standard Human Model to Partial Measured Data", D-11 vol. J84-D-11, No. 7, pp. 1310-1318, Jul. 2001.
Mihara, et al., "A Realtime Vision-Based Interface Using Motion Processor and Applications to Robotics", vol. J84-D-11, No. 9, pp. 2070-2078, Jan. 9, 2001, Japan.
Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.
Jojic, et al., "Tracking Self-Occluding Articulated Objects in Dense Disparity Maps", Computer Vision, 1999, The Proceedings for the Seventh IEEE International Conference on Kerkyra, Greece Sep. 20-27, 1999, Los Alamitos, CA, US, IEEE Computer Society, US, Sep. 20, 1999, pp. 123-130.
Fujitsu, "Internet Development of Emulators" Abstract, Mar. 1997, vol. 48, No. 2.
Lanier, Jaron, "Virtually there: three-dimensional tele-immersion may eventually bring the world to your desk", Scientific American, ISSN: 0036-8733, Year: 2001.
"The Tracking Cube: A Three-Dimensional Input Device", IBM Technical Disclosure Bulletin, Aug. 1, 1989, pp. 91-95, No. 3B, IBM Corp. New York, U.S.
K. B. Shimoga, et al., "Touch and Force Reflection for Telepresence Surgery". Engineering in Medicine and Biology Opportunities of the IEEEE, Baltimore, MD, USA, Nov. 3, 1994, New York, New York, USA, pp. 1049-1050.
Iddan, et al., "3D Imaging in the Studio (And Elsewhere . . . )", Proceedings of the SPIE, SPIE, Bellingham, VA, US, vol. 4298, Jan. 24, 2001, pp. 48-55, XP008005351.
XP-002453974, "CFS and FS95/98/2000: How to Use the Trim Controls to Keep Your Aircraft Level", Aug. 10, 2007, http://support.microsoft.coml?scid=kb%3Ben-us%3B175195&x=13&y=15.
European Patent Office; App. No. 07251651.1; European Search Report mailed Oct. 18, 2007.
PCT; App. No. PCT/US06/61056; International Search Report and Written Opinion mailed Mar. 3, 2008.
PCT; App. No. PCT/US07/67004; International Search Report and Written Opinion of the International Searching Authority mailed Jul. 28, 2008.
U.S. Appl. No. 11/382,031; Office Action mailed Sep. 30, 2008.
U.S. Appl. No. 11/382,035; Office Action mailed Jul. 25, 2008.
U.S. Appl. No. 11/382,031; Office Action mailed Sep. 2, 2009.
U.S. Appl. No. 11/382,031; Final Office Action mailed Mar. 19, 2009.
U.S. Appl. No. 11/382,035; Office Action mailed May 27, 2009.
U.S. Appl. No. 11/382,035; Final Office Action mailed Jan. 7, 2009.
U.S. Appl. No. 11/382,250; Final Office Action mailed May 1, 2009.
U.S. Appl. No. 11/382,250; Office Action mailed Jan. 22, 2010.
U.S. Appl. No. 11/382,250; Notice of Allowance mailed Sep. 13, 2010.
U.S. Appl. No. 11/382,031; Notice of Allowance mailed Sep. 22, 2010.
Korean Patent Office; Korean App. No. 10-2008-7029704; Notice of Preliminary Rejection mailed Aug. 25, 2010.
Chinese Patent Office; China App. No. 200780016094; First Office Action mailed Aug. 16, 2010.
Korean Patent Office; Korean App. No. 10-2008-7029705; Notice of Preliminary Rejection mailed Aug. 25, 2010.
U.S. Appl. No. 11/382,032; Office Action mailed Sep. 25, 2009.
European Patent Office; App. No. EP 07760946.9; Extended European Search Report mailed Oct. 27, 2010.
Definition of "mount"—Merriam-Webster Online Dictionary; downloaded from the Internet <http://www.M-w.com/dictionary/mountable>, downloaded on Nov. 8, 2007.
CFS and FS95/98/2000: How to Use the Trim Controls to Keep Your Aircraft Level; downloaded from the Internet <http://support,microsoft.com/?scid=kb%3Ben-us%3B175195&x=13&y=15>; downloaded on Aug. 10, 2007.
Dietrich, F., "Real Time Animation Techniques with Microcomputers", Pixel Creations, University of Michigan Press 1982, 4 pages.
You, S., "Fusion of Vision and Gyro Tracking for Robust Augmented Reality Registration", Proceedings IEEE Virtual Reality, 2001, 8 pages.
USPTO, Final Office Action issued in U.S. Appl. No. 11/382,251 mailed May 25, 2011, 12 pages.
USPTO, Notice of Allowance issued U.S. Appl. No. 11/536,559 mailed Aug. 3, 2011, 5 pages.
USPTO, Notice of Allowance issued in U.S. Appl. No. 11/536,559 mailed Nov. 7, 2011, 5 pages.
USPTO, Office Action issued in U.S. Appl. No. 11/838,823 mailed Sep. 15, 2011, 7 pages.
USPTO, Office Action issued in U.S. Appl. No. 11/382,699 mailed Nov. 9, 2011, 11 pages.
USPTO, Office Action issued in U.S. Appl. No. 12/262,044 mailed Oct. 14, 2011, 10 pages.
USPTO, Office Action issued in U.S. Appl. No. 11/382,251 mailed Nov. 23, 2011, 11 pages.
USPTO, Final Office Action issued in U.S. Appl. No. 11/382,036 mailed Sep. 7, 2011, 26 pages.
Japanese Patent Office, Notification of Reasons for Refusal issued in Japanese Patent Application 2009-509960 dated Nov. 15, 2011, 8 pages.
USPTO, Final Office Action issued in U.S. Appl. No. 11/382,039 mailed Dec. 15, 2011, 7 pages.
USPTO, Final Office Action issued in U.S. Appl. No. 11/382,034 mailed Dec. 23, 2011, 47 pages.
USPTO, Office Action issued in U.S. Appl. No. 11/382,037 mailed Dec. 27, 2011, 5 pages.
Japanese Patent Office, Notification of Reasons for Refusal issued in Japanese Patent Application 2009-509977 dated Jan. 17, 2012, 10 pages.
USPTO, Final Office Action issued in U.S. Appl. No. 12/262,044 mailed Feb. 21, 2012, 9 pages.
USPTO, Notice of Allowance issued in U.S. Appl. No. 11/536,559 mailed Mar. 5, 2012, 5 pages.

(56) References Cited

OTHER PUBLICATIONS

USPTO, Advisory Action issued in U.S. Appl. No. 11/382,039 mailed Mar. 14, 2012, 2 pages.
USPTO, Final Office Action issued in U.S. Appl. No. 11/838,823 mailed Mar. 28, 2012, 8 pages.
USPTO, Advisory Action issued in U.S. Appl. No. 11/382,039 mailed Mar. 29, 2012, 3 pages.
USPTO; Applicant-Initiated Interview Summary issued in U.S. Appl. No. 11/382,039 mailed Apr. 3, 2012, 3 pages.
USPTO; Advisory Action issued in U.S. Appl. No. 13/004,780, mailed Aug. 6, 2013, 3 pages.
USPTO; Final Office Action issued in U.S. Appl. No. 11/382,699, mailed Jul. 25, 2013, 14 pages.
European Patent Office; "Extended European Search Report" issued in European Patent Application No. 12156402.5, dated Jul. 27, 2012, 11 pages.
European Patent Office; "Extended European Search Report" issued in European Patent Application No. 12156589.9, dated Aug. 2, 2012, 6 pages.
Japanese Patent Office; "Notification of Reasons for Refusal" issued in Japanese Patent Application No. 2012-057129, dated Dec. 3, 2013, 8 pages (includes English translation).
Japanese Patent Office; "Notification of Reasons for Refusal" issued in Japanese Patent Application No. 2012-057132, dated Dec. 3, 2013, 4 pages (includes English translation).
USPTO; Office Action issued in U.S. Appl. No. 13/004,780, mailed Dec. 16, 2013, 12 pages.
USPTO; Pending Unpublished U.S. Patent Application by inventor Zalewski, Gary M. et al.; U.S. Appl. No. 14/059,326, filed Oct. 21, 2013, and as amended by Preliminary Amendment filed Nov. 1, 2013; entitled "Method and Apparatus for Tracking Three-Dimensional Movements of an Object Using a Depth Sensing Camera"; 93 pages, which includes the specification, claims, abstract, and drawings as-filed Oct. 21, 2013, and Preliminary Amendment filed Nov. 1, 2013.
USPTO; Final Office Action issued in U.S. Appl. No. 11/382,699, mailed Dec. 27, 2012, 13 pages.
Japanese Patent Office; "Decision to Grant a Patent" issued in Japanese Patent Application No. 2009-509960, dated Jun. 11, 2013, 3 pages.
USPTO; Notice of Allowance issued in U.S. Appl. No. 12/262,044, mailed Jun. 21, 2013, 10 pages.
USPTO; Final Office Action issued in U.S. Appl. No. 12/262,044, mailed Nov. 8, 2012, 10 pages.
USPTO; Pending Unpublished U.S. Patent Application by Zalewski, Gary M. et al.; U.S. Appl. No. 14/059,326, filed Oct. 21, 2013, entitled "Method and Apparatus For Tracking Three-Dimenstional Movements of an Object Using a Depth Sensing Camera", 77 pages, which includes the application abstract, specification, claims, and drawings.
Japanese Patent Office; "Notification of Reasons for Refusal" issued in Japanese Patent Application No. 2012-120096, dated Jan. 7, 2014, 5 pages (includes English translation).
USPTO; Final Office Action issued in U.S. Appl. No. 11/382,034, mailed Feb. 5, 2013, 44 pages.
Japanese Patent Office; Final Notification of Reasons for Refusal issued in Japanese Patent Application No. 2009-509977, mailed Aug. 14, 2012, 4 pages (includes English translation).
USPTO; Notice of Allowance issued in U.S. Appl. No. 11/382,039, mailed Aug. 29, 2013, 9 pages.
European Patent Office; "Communication pursuant to Rules 70(2) and 70a(2) EPC and reference to Rule 39(1) EPC" issued in European Patent Application No. 12156402.5, dated Sep. 3, 2012, 2 pages.
European Patent Office; "Communication pursuant to Rules 70(2) and 70a(2) EPC and reference to Rule 39(1) EPC" issued in European Patent Application No. 12156589.9, dated Sep. 10, 2012, 2 pages.
USPTO; Office Action issued in U.S. Appl. No. 11/382,251, mailed Dec. 4, 2012, 12 pages.
USPTO, Advisory Action issued in U.S. Appl. No. 12/262,044 mailed Apr. 26, 2012, 3 pages.
European Patent Office; "Communication pursuant to Article 94(3) EPC" issued in European Patent Application No. 12156402.5; dated May 27, 2013, 5 pages.
European Patent Office; "Extended European Search Report" issued in corresponding European Patent Application No. 08797908.4, dated Jun. 22, 2012, 5 pages.
Japanese Patent Office; Notification of Reasons for Refusal issued in corresponding Japanese Patent Application No. 2010-515294, dated Jun. 26, 2012, 8 pages (includes English translation).
USPTO; Office Action issued in U.S. Appl. No. 11/382,699, mailed Jun. 5, 2012, 12 pages.
European Patent Office; "Communication pursuant to Rules 70(2) and 70a(2) EPC" issued in European Patent Application No. 08797908.4, dated Jul. 10, 2012, 1 page.
USPTO; Office Action issued in U.S. Appl. No. 11/382,034, mailed Jun. 26, 2012, 44 pages.
USPTO; Office Action issued in U.S. Appl. No. 13/004,780, mailed Jun. 27, 2012, 12 pages.
Uspto; Office Action issued in U.S. Appl. No. 12/262,044, mailed Jul. 10, 2012, 8 pages.
USPTO; Final Office Action issued in U.S. Appl. No. 13/004,780, mailed May 10, 2013, 11 pages.
USPTO; Final Office Action issued in U.S. Appl. No. 11/382,251, mailed Jan. 14, 2014, 13 pages.
USPTO; Advisory Action issued in U.S. Appl. No. 12/262,044, mailed Feb. 19, 2013, 3 pages.
USPTO; Office Action issued in U.S. Appl. No. 11/382,699, mailed Apr. 17, 2013, 14 pages.
Japanese Patent Office; Notification of Reasons for Refusal issued in Japanese Patent Application No. 2009-509960, dated Jul. 31, 2012, 7 pages (includes English translation).
USPTO; Notice of Allowance issued in U.S. Appl. No. 11/536,559, mailed Jul. 30, 2012, 5 pages.
USPTO; Notice of Allowance issued in U.S. Appl. No. 11/382,037, mailed Aug. 7, 2012, 8 pages.
US 2002/0018582 A1, 02/2002, Hagiwara et al. (Withdrawn).

* cited by examiner

400

500

OBJECT DIRECTION USING VIDEO INPUT COMBINED WITH TILT ANGLE INFORMATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation-in-part (CIP) of U.S. patent application Ser. No. 11/536,559, filed on Sep. 28, 2006, entitled "MAPPING MOVEMENTS OF A HAND-HELD CONTROLLER TO THE TWO-DIMENSIONAL IMAGE PLANE OF A DISPLAY SCREEN", which is hereby incorporated by reference herein in its entirety.

BACKGROUND OF THE INVENTION

1. Field of the Invention

The present invention relates generally to computer entertainment systems, and more specifically to a user's manipulation of a controller for such computer entertainment systems.

2. Discussion of the Related Art

Computer entertainment systems typically include a hand-held controller, game controller, or other controller. A user or player uses the controller to send commands or other instructions to the entertainment system to control a video game or other simulation being played. For example, the controller may be provided with a manipulator which is operated by the user, such as a joy stick. The manipulated variable of the joy stick is converted from an analog value into a digital value, which is sent to the game machine main frame. The controller may also be provided with buttons that can be operated by the user.

It is with respect to these and other background information factors that the present invention has evolved.

SUMMARY OF THE INVENTION

One embodiment provides a method for use in obtaining input data from an object, comprising: capturing a live image of the object with an image capture device; receiving information related to a tilt angle of the object from one or more sensors other than the image capture device; using the information related to a tilt angle of the object to obtain at least one rotated reference image of the object; comparing the live image of the object with the rotated reference image of the object; and generating an indication in response to the live image matching the rotated reference image.

Another embodiment provides an apparatus for use in obtaining input data from an object, comprising: an image capture device configured to capture a live image of the object; and a processor based system configured to receive information related to a tilt angle of the object from one or more sensors other than the image capture device, use the information related to a tilt angle of the object to obtain at least one rotated reference image of the object, compare the live image of the object with the rotated reference image of the object, and generate an indication in response to the live image matching the rotated reference image.

Another embodiment provides a storage medium storing a computer program executable by a processor based system, the computer program causing the processor based system to execute steps comprising: receiving a captured live image of an object from an image capture device; receiving information related to a tilt angle of the object from one or more sensors other than the image capture device; using the information related to a tilt angle of the object to obtain at least one rotated reference image of the object; comparing the live image of the object with the rotated reference image of the object; and generating an indication in response to the live image matching the rotated reference image.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

The user or player of a video game typically holds the game controller with one or both hands in order to operate the buttons, joy stick, etc., located on the controller. Often times while playing the game the user will also move the entire controller itself around in the air as he or she simultaneously operates the buttons, joy stick, etc. Some users tend to get excited while playing the game and attempt to control actions or aspects of the game by moving the entire controller itself around in the air.

Various embodiments of the methods, apparatus, schemes and systems described herein provide for the detection, capture and tracking of the movements, motions and/or manipulations of the entire controller body itself by the user. The detected movements, motions and/or manipulations of the entire controller body by the user may be used as additional commands to control various aspects of the game or other simulation being played.

Detecting and tracking a user's manipulations of a game controller body may be implemented in different ways. For example, in some embodiments a camera peripheral can be used with the computer entertainment system to detect motions of the hand-held controller body and transfer them into actions in a game. The camera can be used to detect many different types of motions of the controller, such as for example up and down movements, twisting movements, side to side movements, jerking movements, wand-like motions, plunging motions, etc. Such motions may correspond to various commands such that the motions are transferred into actions in a game.

Detecting and tracking the user's manipulations of a game controller body can be used to implement many different types of games, simulations, etc., that allow the user to, for example, engage in a sword or lightsaber fight, use a wand to trace the shape of items, engage in many different types of sporting events, engage in on-screen fights or other encounters, etc.

Figure 1A:
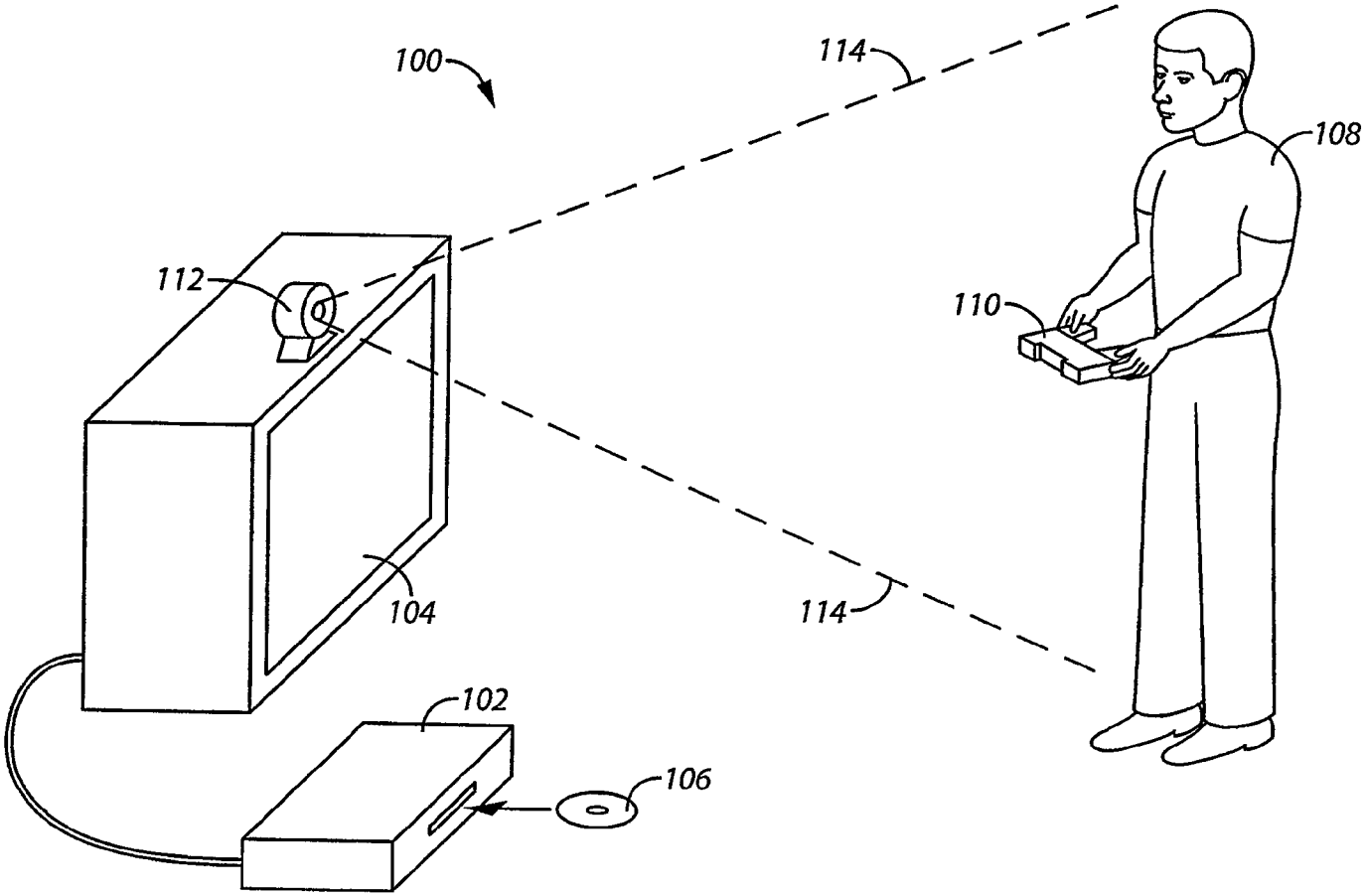
FIG. 1A is a pictorial diagram illustrating a system that operates in accordance with an embodiment of the present invention.

Referring to FIG. 1A, there is illustrated a system 100 that operates in accordance with an embodiment of the present invention. As illustrated, a computer entertainment system or console 102 uses a television or other video display 104 to display the images of the video game or other simulation thereon. The game or other simulation may be stored on a DVD, CD, flash memory, USB memory, or other memory media 106 that is inserted into the console 102. A user or player 108 manipulates a game controller 110 to control the video game or other simulation.

A camera or other video image capturing device 112 is positioned so that the controller 110 is within the camera's field of view 114. As illustrated, the camera 110 may be placed on the video display 104, but it should be well understood that the camera may be located elsewhere. By way of example, the camera 112 may comprise a camera peripheral device such as the commercially available EyeToy™ product. But it should be well understood that any type or brand of camera may be used, such as for example a web-cam camera, add-on USB camera, infrared (IR) capability camera, fast frame capture rate camera, etc.

In some embodiments, the camera or other image capturing device 112, as well as the image capture unit discussed below, may comprise a Z-camera or depth camera. Such a Z-camera or depth camera may, for example, provide or measure a depth of each pixel and/or determine the distance of a pixel from the camera. As such, any of the cameras or other image capturing devices described herein may, in some embodiments, comprise any type of three-dimensional camera.

During operation, the user 108 physically moves the controller 110 itself. That is, the user 108 physically moves the entire controller 110 around in the air. For example, the controller 110 may be moved in any direction by the user 108, such as up, down, to one side, to the other side, twisted, rolled, shaken, jerked, plunged, etc. These movements of the controller 110 itself may be detected and captured by the camera 112 by way of tracking through image analysis in a manner described below.

In general, the detected and captured movements of the controller 110 are used to generate position and orientation data for the controller 110. Because this data is gathered on an image frame-by-frame basis, the data can be used to calculate many physical aspects of the movement of the controller 110, such as for example its acceleration and velocity along any axis, its tilt, pitch, yaw, roll, as well as any telemetry points of the controller 110.

The ability to detect and track the movements of the controller 110 makes it possible to determine whether any predefined movements of the controller 110 are performed. That is, certain movement patterns or gestures of the controller 110 may be predefined and used as input commands for the game or other simulation. For example, a plunging downward gesture of the controller 110 may be defined as one command, a twisting gesture of the controller 110 may be defined as another command, a shaking gesture of the controller 110 may be defined as another command, and so on. In this way the manner in which the user 108 physically moves the controller 110 itself is used as another input for controlling the game, which provides a more stimulating and entertaining experience for the user. Examples of how movements of the controller 110 can be mapped to input commands for the game will be discussed below.

Figure 1B:
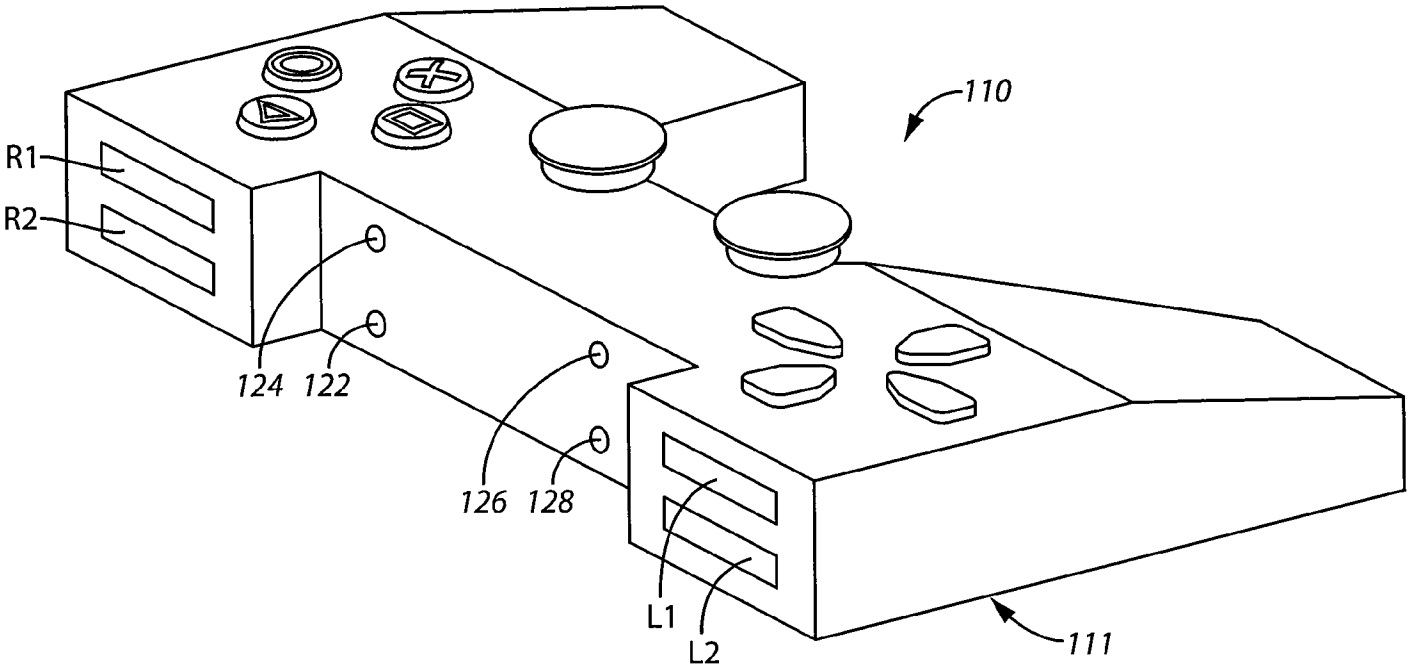
FIG. 1B is a perspective view of a controller made in accordance with an embodiment of the present invention.

Referring to FIG. 1B, there is illustrated a more detailed view of the controller 110 that is made in accordance with an embodiment of the present invention. The controller 110 includes a body 111. The body 111 is the part of the game controller 110 that one would hold by hand (or wear if it were a wearable game controller). An input device manipulable by a user is something such as, for example, a button or multiaxis control stick on the controller. One or more buttons may be disposed on the body 111. The body may include a housing holdable by hand. The housing may include a handgrip graspable by hand. Thus, during operation when the user 108 physically moves the controller 110 itself, the user 108 physically moves the body 111 of the controller 110. The user moves the body 111 around in the air, or in free-space.

The body 111 may have a forward section to be oriented towards a screen when a progress of a game controlled in accordance with the game controller is displayed upon the screen. At least one input device may be assembled with the body 111 with the input device manipulable by a user to register an input from the user.

One or more light-emitting diodes (LEDs) may be disposed on the body that are arranged in a geometric shape. Or, another type of photonically detectable ("PD") element may be assembled with the body 111. A position of the photonically detectable element may be within an image being recorded by an image capture device when the forward section is oriented at least generally towards the screen. The positions of the PD element at different points in time may be quantifiable at quantify movement of the body 111 in space.

In this embodiment, the controller 110 includes four light-emitting diodes (LEDs) 122, 124, 126, 128. As illustrated, the four LEDs 122, 124, 126, 128 may be arranged in a substantially square or rectangular pattern and located on the bridge of the controller 110 between the R1 and L1 buttons. Thus, in this embodiment the geometric shape comprises a substantially square or rectangular pattern. The square or rectangular pattern formed by the four LEDs 122, 124, 126, 128 will be referred to herein as the "bounding box" formed by the LEDs.

It should be well understood that the geometric shape may comprise many different shapes. For example, the geometric shape may comprise any linear or two-dimensional pattern. Although a linear array of LEDs is preferred, the LEDs may alternatively, be arranged in a rectangular pattern or an arcuate pattern to facilitate determination of an image plane of the LED array when analyzing an image of the LED pattern obtained by an image capture camera.

While the illustrated embodiment of the controller utilizes four LEDs, it should be well understood that other embodiments may utilize more than four LEDs or less than four LEDs. For example, three LEDs will work, and two LEDs will also work to provide tracking information. Even one LED can provide position information. Furthermore, the LEDs may be located on a different part of the controller 110.

The LEDs may be positioned or disposed on the controller 110 in a variety of ways, including in a cluster, a line, a triangle, and/or other such configurations. One LED may be used or multiple LEDs can be used. In the case of multiple LEDs, in one configuration, the plane that is formed that intersects the LEDs may be tilted with respect to the orientation of the controller. The actual orientation of the controller may be determined by performing a transformation of data received in the image plane to determine the controller orientation. Additionally or alternatively, the LEDs can be removable, attachable and/or detachable. For example, the LEDs can be included on a plate or separate casing that is detachable from the body 111.

Figure 1C:
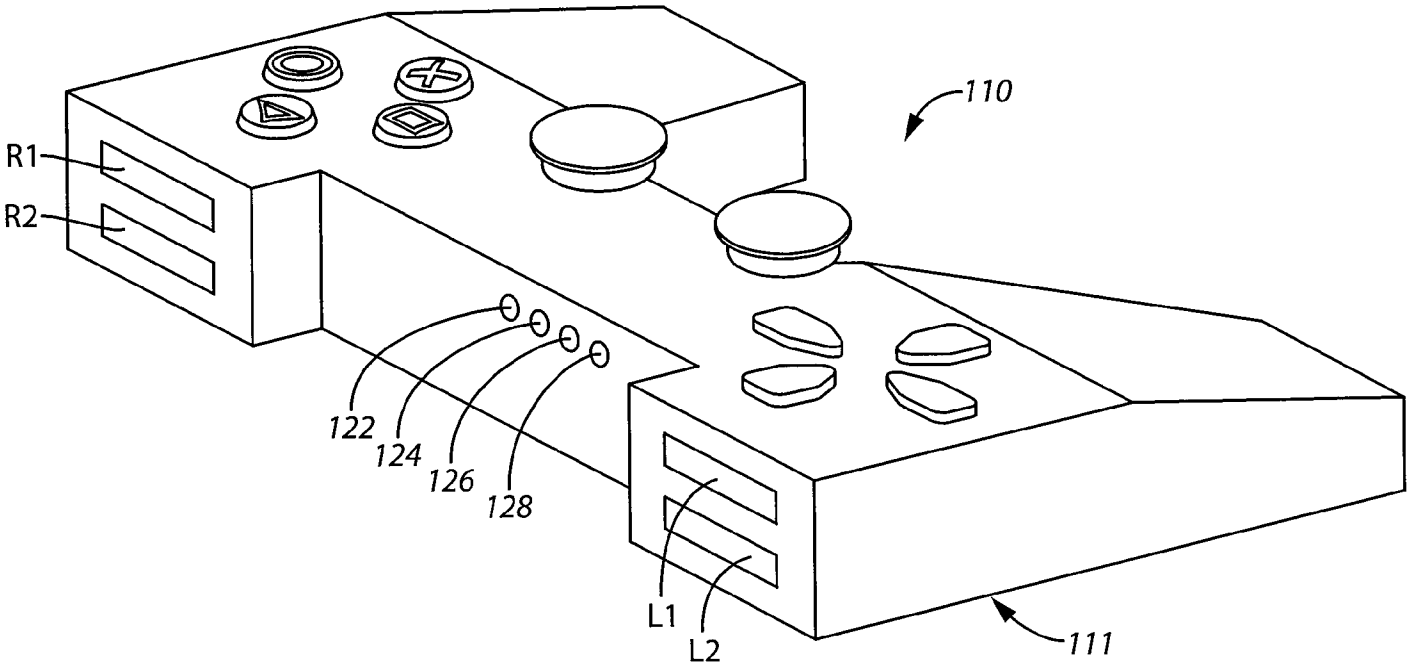
FIG. 1C is a perspective view of a controller made in accordance with an embodiment of the present invention.

Referring to FIG. 1C, there is illustrated a view of the controller 110 that is made in accordance with an embodiment of the present invention. The controller 110 includes the body 111 and a cluster or array of LEDs 122, 124, 126 and 128. As illustrated, the four LEDs 122, 124, 126, 128 may be arranged in a substantially linear pattern and located on the bridge of the controller 110 between the R1 and L1 buttons. Thus, in this embodiment the geometric shape comprises a substantially linear pattern. Further in some embodiments, one or more of the LEDs can be implemented through infrared LEDs. For example, infrared LEDs can be paired with the visible LEDs. The visible LEDs can, for example, show a player ID. In some implementations, the LEDs may be surface mounted, with the infrared LEDs peeking through small windows that allow both visible LED and infrared LED transmission.

Figure 1D:
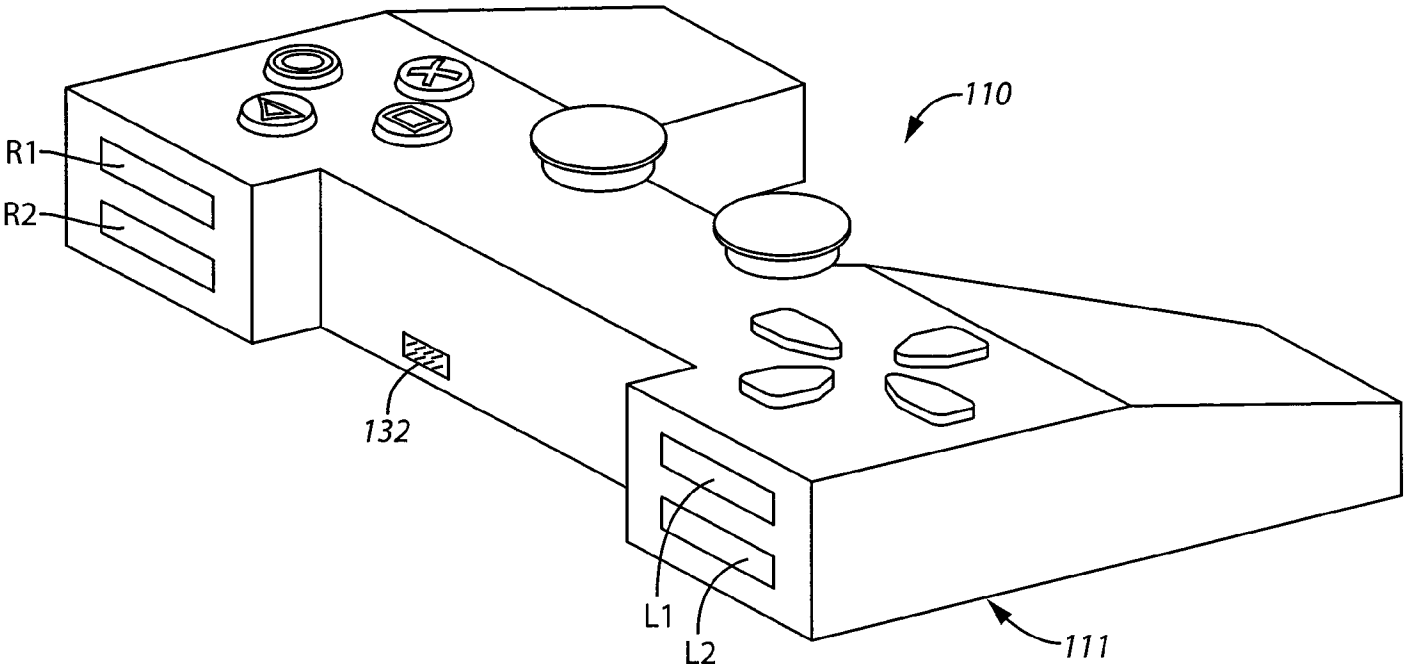
FIG. 1D is a perspective view of a controller made in accordance with an embodiment of the present invention.

Referring to FIG. 1D, there is illustrated a view of the controller 110 that is made in accordance with an embodiment of the present invention. The controller 110 includes the body 111 and a communications interface and/or port 132. The interface, in some embodiments, allows the controller to couple directly with a tracking device and/or the console 102. The tracking devices at least in part can allow for the detection of movement of the controller 110, by optical, audio and/or inertia. The interface 132 can be substantially any relevant communication interface, such as a universal serial bus (USB) interface, universal asynchronous receiver transmitter (UART), and/or other such relevant interface. The interface 132 can be positioned on the controller 110 in substantially any position. As illustrated, the interface 132 may be located on the bridge of the controller 110 between the R1 and L1 buttons.

Figure 1E:
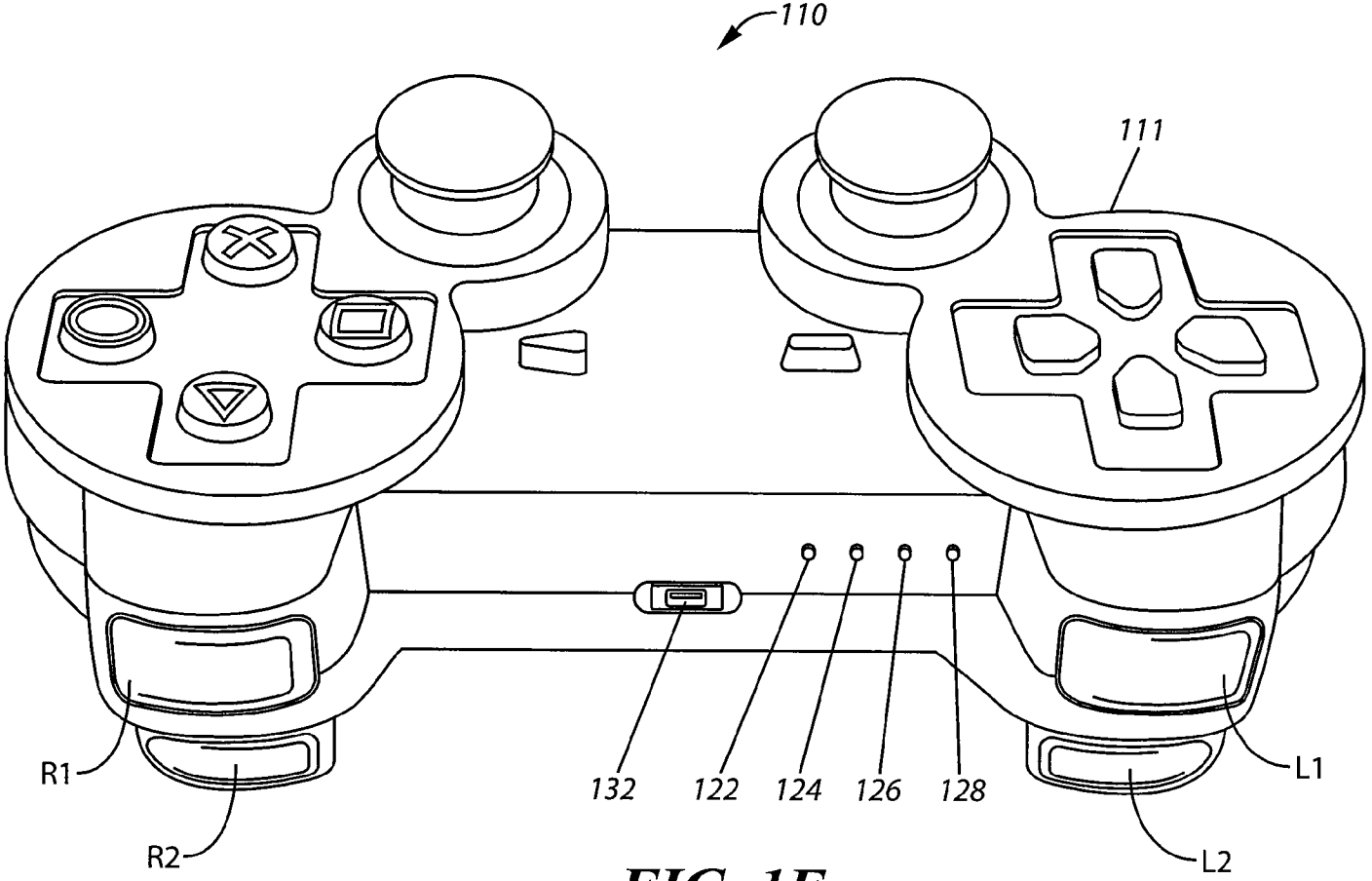
FIG. 1E is a perspective view of a controller made in accordance with some embodiments of the present invention.

Referring to FIG. 1E, there is depicted a perspective view of the controller 110 that is made in accordance with some embodiments of the present invention. The controller includes the body 111, the R1 and L1 buttons, the one or more LEDs 122, 124, 126 and 128, the interface 132 (e.g., a USB interface), and other relevant buttons, indicators and the like. The LEDs 122, 124, 126 and 128 are shown in the linear pattern, however, other patterns can be employed as described above and further below. Additionally in some implementations, the LEDs and/or interface 132 can be removable, attachable and/or detachable.

The four LEDs 122, 124, 126, 128 produce four points or dots that are perceived by camera 112 (FIG. 1A). Because the camera 112 is looking at the player 108 with the controller 110 in his hands, the camera 112 is able to track the movement of the controller 110 by tracking the movement of the dots produced by the four LEDs 122, 124, 126, 128 and the bounding box that they form.

Namely, as the user 108 twists and rotates the controller body 110 the projection of the four dots are cast on the image plane of the camera 112's outputs. Image analysis is used to track the user's manipulations of the controller and to determine controller position and orientation. Thus, the four LEDs 122, 124, 126, 128 produce information regarding the body's movement. The positions of one or two controllers can be determined, or the relative movements of two controllers can be tracked.

Figure 2A:
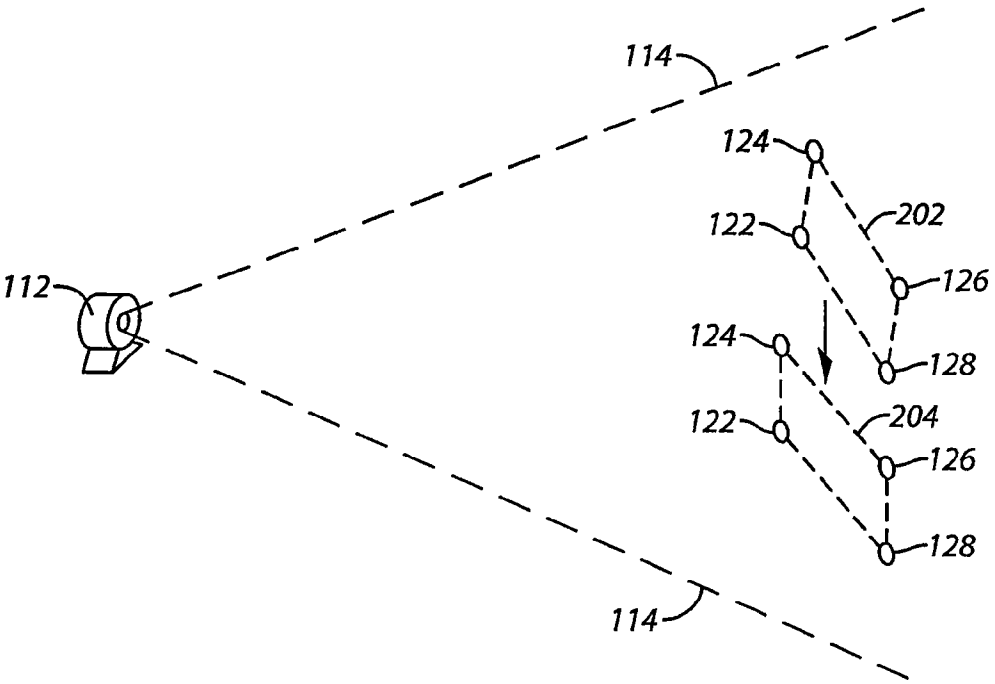
FIG. 2A is a pictorial diagram illustrating a manner for determining position information for a controller in accordance with an embodiment of the present invention.

FIG. 2A illustrates an example of how the bounding box is used to track the movements of the controller. Specifically, the controller, and thus the four LEDs 122, 124, 126, 128, are located within the field of view 114 of the camera 112. The four LEDs 122, 124, 126, 128 form a bounding box 202 when the controller is in a first position. When the controller is moved to a second position the four LEDs 122, 124, 126, 128 form a second bounding box 204. In addition, when the controller is moved from the first to the second position, the intermediate positions of the bounding boxes are also captured, depending on the speed of the movement and the frame rate of the camera 112.

Figure 2B:
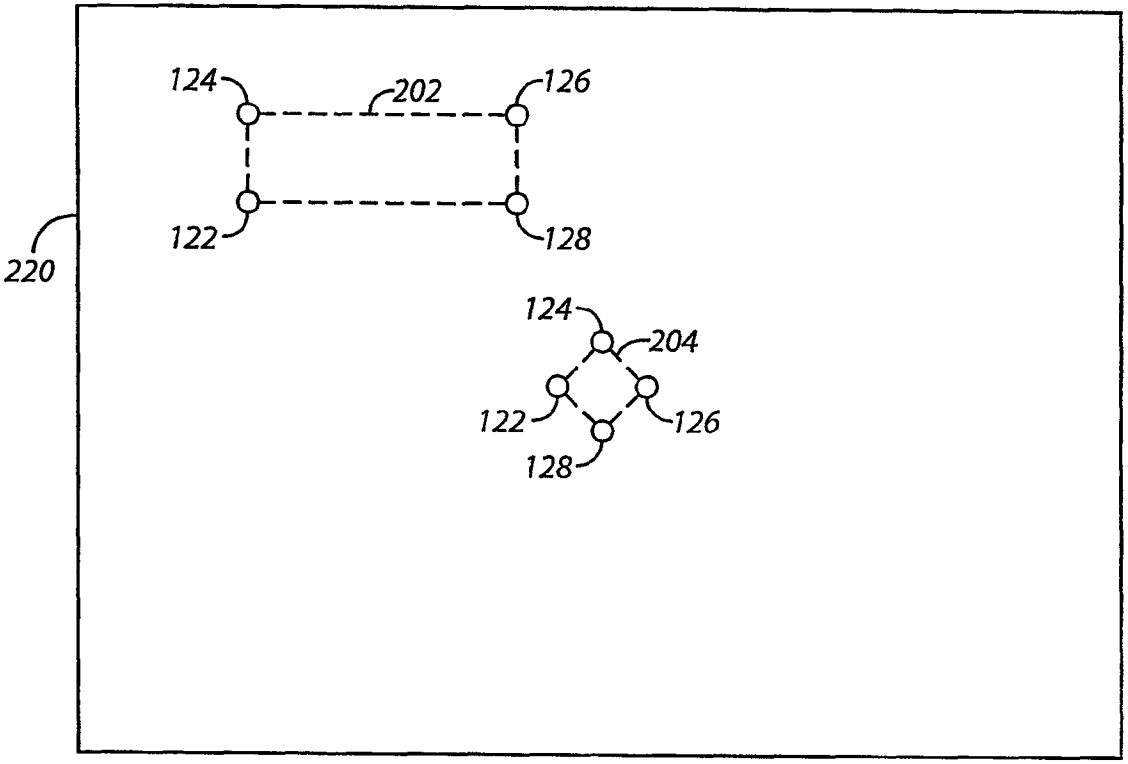
FIG. 2B is a planar view of an image plane illustrating a manner for determining position information for a controller in accordance with an embodiment of the present invention.

The bounding boxes 202 and 204 formed by the four LEDs 122, 124, 126, 128 are captured in the image plane of the camera 112. FIG. 2B illustrates an example of the image plane 220 of the camera 112 showing the bounding boxes 202 and 204. A physics analysis is performed to derive and determine the movements of the bounding box and how the rectangle of the bounding box deforms into different shapes based on the tilt, yaw, etc. of the controller. By projecting the bounding boxes on the image plane, the position, orientation, acceleration, velocity, etc., of the controller can be determined, which can in turn be used to track the user's manipulations of the game controller.

Figure 3B:
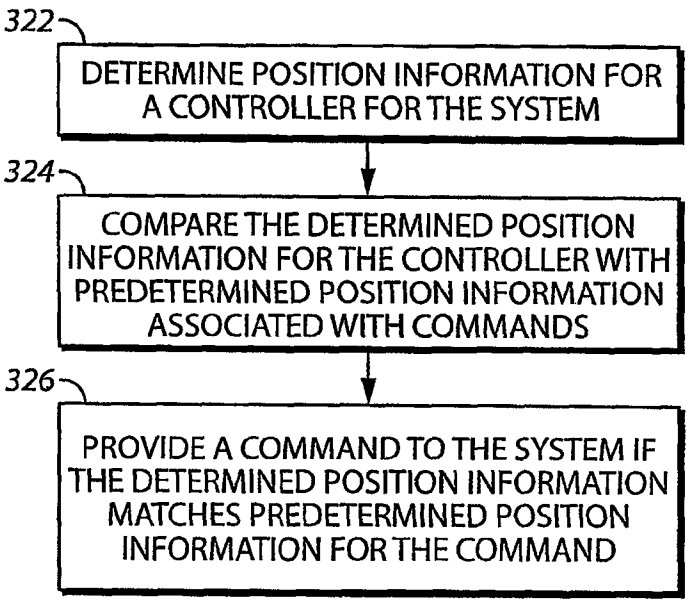
FIG. 3B is a flow diagram illustrating a method for use in providing input to a system in accordance with an embodiment of the present invention.
Figure 3A:
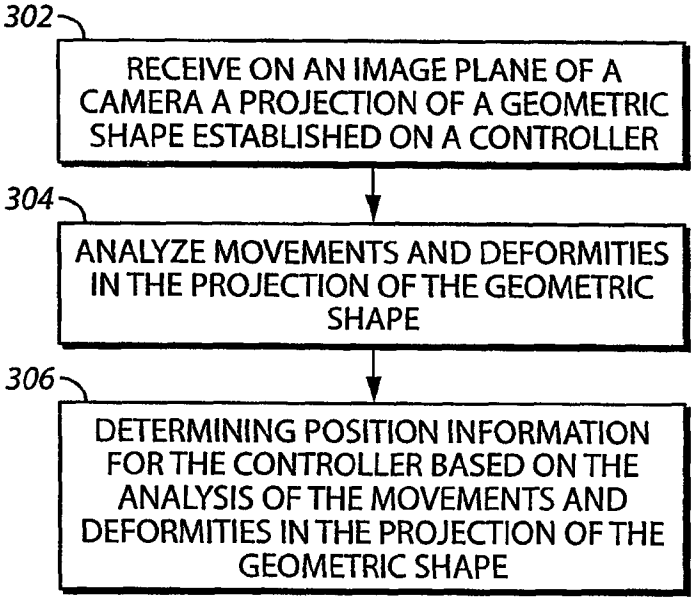
FIG. 3A is a flow diagram illustrating a method for use in obtaining information in accordance with an embodiment of the present invention.

Referring to FIG. 3A, there is illustrated a method 300 for use in obtaining information from a controller in accordance with an embodiment of the present invention. The method 300 may be executed and performed by many different types of systems and devices, such as for example entertainment systems and consoles, computers, consumer electronics device, etc. An example of a system that may be used to perform the method 300 will be described below.

The method 300 begins in step 302 in which a projection of a geometric shape established on the controller is received on an image plane of a camera. This step may be performed as has already been described above.

In step 304 the movements and deformities in the projection of the geometric shape are analyzed. Namely, the four dots of the bounding box are tracked and analyzed. Field and frame analysis is performed on the image plane of the camera output to analyze the manipulation of the four reference points to determine position orientation, tilt, yaw, roll, etc. of the controller. In addition, acceleration of the controller can be tracked in any direction. Analysis of the frames of the image can give the acceleration along any axis. Telemetry points of the controller can also be computed. It can also be determined whether or not the controller is in a resting position or resting state, such as for example when the controller is in a neutral or steady state near the user's waist.

As the controller rolls the image translates in the plane. Changes in the width of the rectangle of the bounding box indicate the controller is rolling. As the yaw of the controller is adjusted, the width of the rectangle changes. Yaw maps to the width of the rectangle. Tilt of the controller influences the height of the rectangle.

For example, the bounding box 202 (FIG. 2B) indicates that the controller was initially positioned looking fairly straight ahead at the camera. The bounding box 204 indicates that the controller was then moved downward, rolled and turned to the user's left.

It is difficult to know which side of the "ground plane" the controller is positioned on because the image plane only sees a deformed rectangle. For example, this issue can occur if someone walks in front of and occludes the camera during a time when the user manipulates the controller and moves the controller to an equal distance on the other side of an axis horizon line. This may cause the bounding box to look the same in the image plane. This can also happen if the controller travels outside of the viewing region of the image capture device.

As such, a determination may need to be made as to whether the deformation is caused by positive or negative tilt or roll (positive and negative being related to up/down and left/right movements away from the steady state origin position). This can be solved by reading other telemetry from the controller or by strobing or modulating the LEDs to enable the video analyzer system to discriminate individual corners of the bounding box rectangle for tracking purposes. The LEDs may be strobed or modulated as an aid for discerning the different corners of the bounding box. Or, each LED may have its own frequency as an aid for discerning the different corners of the bounding box. By identifing each specific corner of a bounding region, i.e. each LED, it can be determined which side of a horizontal line the controller is on at any point in time. In this way problems associated with the controller passing through the camera plane can be handled.

Tracking the movements and rotations of the bounding box on the screen is based on a frame-by-frame analysis. The camera's output creates the frames of image data. The projection of the bounding box is captured in software. The movements of the controller across the frames is based on the translation of the box.

The use of a high frame rate provides the ability to accurately track acceleration and changes in acceleration of the movement of the controller. That is, by projecting the image on the plane at high rates, the delta movements of the controller can be tracked. This provides the ability to plot the acceleration, the points where the acceleration peaks out, the points where gravity zeros out, and the points of inflection. The points of inflection are the transition points where the controller stops and changes direction. All of this analysis is performed by analyzing the frames of the image and determining the position and deformation of the bounding box. By way of example, frame rates of 120 frames per second or higher may be used, but it should well understood that any frame rate may be used.

As will be discussed below, the history of previous frames may be mapped. This allows the previous telemetry of the controller to be looked at for determining certain parameters such as, for example, in tracking acceleration, velocity, and stopping points.

In step 306 (FIG. 3A) position information for the controller is determined based on the analysis of the movements and deformities in the projection of the geometric shape. By way of example, an image analyzer may be used to perform one or both of steps 304 and 306. Namely, an image analyzer may be used to perform the analysis of the movements and deformations of the bounding boxes in the image plane of the camera. The output of the video camera may be coupled to the input of an image analyzer. An example of a system which may incorporate an image analyzer for implementing one or more of the methods, schemes and functions described herein will be discussed below.

The image analyzer monitors the bounding box formed by the reference LEDs as captured in the image plane of the camera. The image analyzer analyzes the position, rotation, horizontal and vertical deformation of the bounding box to determine the physical user manipulation of the controller, its position, roll, tilt and yaw coordinates. At the end of the image analysis the data may be output in the form of an output ID or the like. Such output IDs from the image analysis may include data such as the x, y, z coordinates, acceleration and velocity along any axis, that the controller is in a resting position or state, etc. Thus, at the end of image analysis the image analyzer can indicate where the controller is and whether a command is issued. And the image analyzer may be pinged at any instant of time and it may provide position, orientation, last command, etc.

By way of example, the image analyzer may provide, but shall not be limited to providing the following outputs:

CONTROLLER POSITION (X, Y, Z coordinates);

CONTROLLER ORIENTATION alpha, beta, gamma (radians);

CONTROLLER X-AXIS VELOCITY;

CONTROLLER Y-AXIS VELOCITY;

CONTROLLER Z-AXIS VELOCITY;

CONTROLLER X-AXIS ACCELERATION;

CONTROLLER Y-AXIS ACCELERATION;

CONTROLLER Z-AXIS ACCELERATION;

RESTING POSITION OF STEADY STATE Y/N (at waist as described, but may be defined as any position);

TIME SINCE LAST STEADY STATE;

LAST GESTURE RECOGNIZED;

TIME LAST GESTURE RECOGNIZED; and

INTERRUPT ZERO-ACCELERATION POINT REACHED.

Each of these outputs may be generated by analyzing the movements and deformations of the bounding box as described above. These outputs may be further processed in order to track the movement of the controller. Such tracking will allow certain movements of the controller to be recognized, which can then be used to trigger certain commands as described below. It should be well understood that many other outputs may be used in addition to or in replacement of the above-listed outputs.

Additional inputs to the image analyzer may optionally be provided. Such optional inputs may include but shall not be limited the following:

SET NOISE LEVEL (X, Y or Z AXIS) (this is a reference tolerance when analyzing jitter of hands in the game);

SET SAMPLING RATE (how often frames of the camera are being taken in and analyzed);

SET GEARING; and

SET MAPPING CHAIN.

As mentioned above, the ability to detect and track the movements of the controller 110 makes it possible to determine whether any predefined movements of the controller 110 are performed. That is, certain movement patterns or gestures of the controller 110 may be mapped to input commands for the game or other simulation.

Referring to FIG. 3B, there is illustrated a method 320 for use in providing input to a system in accordance with an embodiment of the present invention. The method 320 begins in step 322 in which position information for a controller for the system is determined. This step may be performed using the methods and techniques described above.

In step 324, the determined position information for the controller is compared with predetermined position information associated with commands. That is, any number of different movements, gestures or manipulations of the controller may be mapped to various commands. This allows different movements, gestures or manipulations of the controller to be mapped into game models. For example, moving the controller up may be mapped to one command, moving the controller down may be mapped to another command, and moving the controller in any other direction may be mapped to other commands.

Similarly, shaking the controller once may be mapped to one command, shaking the controller twice may be mapped to another command, and similarly, shaking the controller three, four, five, etc., times may be mapped to other commands. That is, various gestures may be established based on shaking the controller a certain number of times. Still other gestures may be established based on shaking the controller up and down vigorously a certain number of times. Other movements of the controller such as twisting, rolling, etc., may be mapped to still other commands.

Thus, various different trajectories of the game controller may be mapped onto gestures, which trigger commands in the game. Each command is mapped to a predetermined movement of the controller. Such predetermined movements of the controller will have associated predetermined position information. In this embodiment the determined position information for the controller is compared with the predetermined position information to see if a command should be triggered.

By way of example, such mapping of gestures to game commands may be implemented as follows. The outputs of the image analyzer may be used to determine position and orientation information for the controller. The image analyzer may output various different IDs that are indicative of position and orientation of the controller. For example, one ID may be output for a steady state determination, another ID may be output to indicate shaking of the controller, and various other IDs may be output to indicate other orientations. Thus, the use of such IDs may be used to output whether the controller is in steady state or is moving. If the controller is in steady state, an ID may indicate how long the controller has been in steady state.

The determined position and orientation information for the controller may then be compared with predetermined position information associated with input commands for the game. If the determined position information matches the predetermined position information for a command, then the command is provided to the entertainment system. Again, various gestures such as pushing the controller up or down, twisting in a circle, right or left, twisting while pulling it up or down, rolling right or left, etc., may all be mapped to various commands.

When a new command or gesture is recognized the image analyzer may trigger an interrupt. The triggering of such an interrupt may be used as part of the process of providing the command to the entertainment system. The system may optionally be configured so that zero acceleration points in the axes, stop points, and/or other events also trigger interrupts.

In comparing the determined position and orientation information with the predetermined position information associated with input commands to see if there is a match, it may often be the case that there is not an exact match. This is because with movement of the controller in free-space it may be difficult to precisely recreate a predefined movement. Therefore, the predetermined position information associated with input commands may be defined in terms of ranges, tolerances, and/or thresholds that are considered to be close enough to the predetermined position information such as to activate the command. That is, commands may be defined in terms of the thresholds or ranges. Thus, in determining whether or not any commands or gestures have been identified, the system may check to see if the determined position and orientation information falls within a range of a gesture. Thus, the defined commands may have thresholds that can be looked at in determining whether or not to invoke the command.

Furthermore, in comparing the determined position and orientation information with the predetermined position information associated with input commands to see if there is a match, histories of previous frames may be saved or mapped. For example, the frame buffer may be monitored or the system may otherwise keep running records of the history of the previous frames. The previous frames may be looked at to determine if any commands are met. The mapping of frame histories may allow the telemetry of the controller at a specific time to be determined to provide the position orientation in determining if a command is met.

Finally, in step 326 if the determined position information for the controller matches predetermined position information for a command, the command is provided to the system. Such command may be used to cause an event to occur or not occur in a video game or other simulation.

In other embodiments, the movements of a game controller may mapped to game commands, such as for example in video game. With such a method, which may be used in video games or other simulations, position information for a controller that is being manipulated by a user is received. The position information is analyzed to determine whether a predetermined movement of the controller associated with a command has been performed. This analysis may be performed as described above. If the predetermined movement of the controller associated with a command has been performed, then the command is executed by the game. The execution of the command may cause a visual effect or the like to occur on the video display that the game is being displayed on.

While the discussion herein is directed to the use of LEDs on the controller for a game or other entertainment system, it should be well understood that the teachings provided herein may be applied to detect and track the movements of controllers for other types of systems, devices, consumer electronics, etc. That is, the LEDs of the game controller described above can be used to perform remote control functions for consumer electronics devises or any device. LEDs may be used on the controllers for many other types of systems and devices in order to detect and track the controllers so that such movements may be mapped to commands for those systems and device. Examples of such other types of systems and devices may include, but are not limited to, televisions, stereos, telephones, computers, home or office networks, hand-held computing or communication device, etc.

Furthermore, the teachings described herein may be applied to universal remote controls that have the ability to control several or many different devices. That is, such universal remote controls may include LEDs as described herein such that movements of the universal remote control body may be used as input commands for several or many different devices or systems.

Moreover, a game controller may have a universal remote function. For example, such may comprise a body having a forward section to be oriented towards a screen when a progress of a game controlled in accordance with the game controller is displayed upon the screen. At least one input device may be assembled with the body with the input device manipulable by a user to register an input from the user. A signal encoder may be included. An infrared signal transmitter operable to transmit an infrared signal over the air using a signal generated by the signal encoder may be included. The signal encoder may be programmable to encode the signal with a selected one of a plurality of signaling codes for reception by an electronic device having an infrared receiver and a signal decoder operable with the selected one signaling code.

Moreover, battery operated toys (including toys molded into a form and style of a branded game) can be formed having LEDs and form a tracked user manipulated body in the sensed environment.

In some embodiments the image analyzer can recognize a user or process audio authenticated gestures, etc. A user may be identified by an analyzer in the system through a gesture and a gesture may be specific to a user. Gestures may be recorded by users and stored in models. The recordation process may optionally store audio generated during recordation of a gesture. The sensed environment may be sampled into a multi-channel analyzer and processed. The processor may reference gesture models to determine and authenticate user identity or objects based on voice or acoustic patterns and to a high degree of accuracy and performance.

Figure 4:
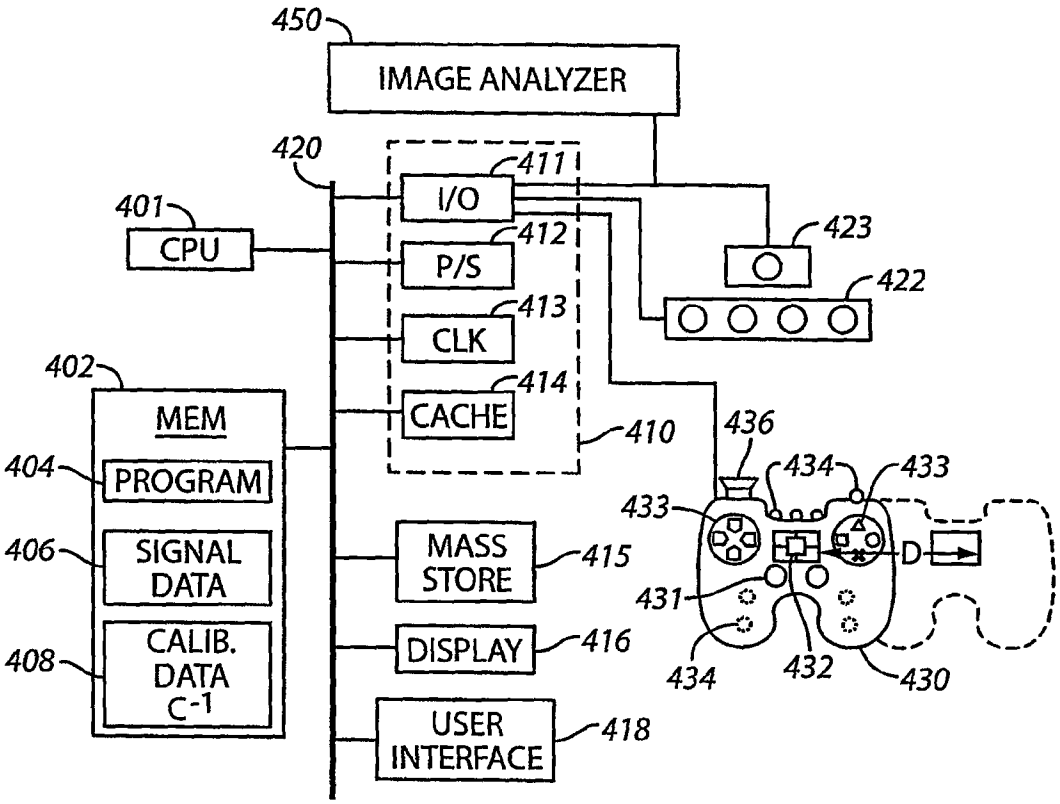
FIG. 4 is a block diagram illustrating a system that may be used to run, implement and/or execute the methods and techniques shown and described herein in accordance with embodiments of the present invention.

According to embodiments of the present invention, the methods and techniques described herein may be implemented as part of a signal processing apparatus 400, as depicted in FIG. 4. The apparatus 400 may include a processor 401 and a memory 402 (e.g., RAM, DRAM, ROM, and the like). In addition, the signal processing apparatus 400 may have multiple processors 401 if parallel processing is to be implemented. The memory 402 may include data and code configured as described above. The signal processing apparatus 400 comprises one example of a processor based system.

Specifically, the memory 402 may include signal data 406. The memory 402 may also contain calibration data 408, e.g., data representing one or more inverse eigenmatrices $C^{-1}$ for one or more corresponding pre-calibrated listening zones obtained from calibration of a microphone array 422. By way of example the memory 402 may contain eignematrices for eighteen 20 degree sectors that encompass a microphone array 422.

The apparatus 400 may also include well-known support functions 410, such as input/output (I/O) elements 411, power supplies (P/S) 412, a clock (CLK) 413 and cache 414. The apparatus 400 may optionally include a mass storage device 415 such as a disk drive, CD-ROM drive, tape drive, or the like to store programs and/or data. For example, such storage device or storage medium may store one or more computer programs executable by the apparatus or other processor based system for causing the system to execute one or more steps of the methods and/or techniques described herein. The controller may also optionally include a display unit 416 and user interface unit 418 to facilitate interaction between the controller 400 and a user. The display unit 416 may be in the form of a cathode ray tube (CRT) or flat panel screen that displays text, numerals, graphical symbols or images. The user interface 418 may include a keyboard, mouse, joystick, light pen or other device. In addition, the user interface 418 may include a microphone, video camera or other signal transducing device to provide for direct capture of a signal to be analyzed. The processor 401, memory 402 and other components of the system 400 may exchange signals (e.g., code instructions and data) with each other via a system bus 420 as shown in FIG. 4.

The microphone array 422 may be coupled to the apparatus 400 through the I/O functions 411. The microphone array may include between about 2 and about 8 microphones, preferably about 4 microphones with neighboring microphones separated by a distance of less than about 4 centimeters, preferably between about 1 centimeter and about 2 centimeters. Preferably, the microphones in the array 422 are omni-directional microphones. An optional image capture unit 423 (e.g., a digital camera) may be coupled to the apparatus 400 through the I/O functions 411. One or more pointing actuators 425 that are mechanically coupled to the camera may exchange signals with the processor 401 via the I/O functions 411.

As mentioned above, in some embodiments, the optional image capture unit 423, as well as any of the cameras described herein, may comprise any type of camera or sensor capable of detecting light emitting elements. For example, in some embodiments the optional image capture unit 423 may comprise a Z-camera or depth camera or some other type of three-dimensional camera. Such a Z-camera or depth camera may, for example, provide or measure a depth of each pixel and/or determine the distance of a pixel from the camera.

As used herein, the term I/O generally refers to any program, operation or device that transfers data to or from the system 400 and to or from a peripheral device. Every data transfer may be regarded as an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, such as a CD-ROM drive, CD-R drive or internal modem or other peripheral such as a flash memory reader/writer, hard drive.

In certain embodiments of the invention, the apparatus 400 may be a video game unit, which may include a joystick controller 430 coupled to the processor via the I/O functions 411 either through wires (e.g., a USB cable) or wirelessly. The joystick controller 430 may have analog joystick controls 431 and conventional buttons 433 that provide control signals commonly used during playing of video games. Such video games may be implemented as processor readable data and/or instructions which may be stored in the memory 402 or other processor readable medium such as one associated with the mass storage device 415.

The joystick controls 431 may generally be configured so that moving a control stick left or right signals movement along the X axis, and moving it forward (up) or back (down) signals movement along the Y axis. In joysticks that are configured for three-dimensional movement, twisting the stick left (counter-clockwise) or right (clockwise) may signal movement along the Z axis. These three axis—X Y and Z—are often referred to as roll, pitch, and yaw, respectively, particularly in relation to an aircraft.

In addition to conventional features, the joystick controller 430 may include one or more inertial sensors 432, which may provide position and/or orientation information to the processor 401 via an inertial signal. Orientation information may include angular information such as a tilt, roll or yaw of the joystick controller 430. By way of example, the inertial sensors 432 may include any number and/or combination of accelerometers, gyroscopes or tilt sensors. In a preferred embodiment, the inertial sensors 432 include tilt sensors adapted to sense orientation of the joystick controller with respect to tilt and roll axes, a first accelerometer adapted to sense acceleration along a yaw axis and a second accelerometer adapted to sense angular acceleration with respect to the yaw axis. An accelerometer may be implemented, e.g., as a MEMS device including a mass mounted by one or more springs with sensors for sensing displacement of the mass relative to one or more directions. Signals from the sensors that are dependent on the displacement of the mass may be used to determine an acceleration of the joystick controller 430. Such techniques may be implemented by program code instructions 404 which may be stored in the memory 402 and executed by the processor 401.

By way of example an accelerometer suitable as the inertial sensor 432 may be a simple mass elastically coupled at three or four points to a frame, e.g., by springs. Pitch and roll axes lie in a plane that intersects the frame, which is mounted to the joystick controller 430. As the frame (and the joystick controller 430) rotates about pitch and roll axes the mass will displace under the influence of gravity and the springs will elongate or compress in a way that depends on the angle of pitch and/or roll. The displacement and of the mass can be sensed and converted to a signal that is dependent on the amount of pitch and/or roll. Angular acceleration about the yaw axis or linear acceleration along the yaw axis may also produce characteristic patterns of compression and/or elongation of the springs or motion of the mass that can be sensed and converted to signals that are dependent on the amount of angular or linear acceleration. Such an accelerometer device can measure tilt, roll angular acceleration about the yaw axis and linear acceleration along the yaw axis by tracking movement of the mass or compression and expansion forces of the springs. There are a number of different ways to track the position of the mass and/or or the forces exerted on it, including resistive strain gauge material, photonic sensors, magnetic sensors, hall-effect devices, piezoelectric devices, capacitive sensors, and the like.

In addition, the joystick controller 430 may include one or more light sources 434, such as light emitting diodes (LEDs). The light sources 434 may be used to distinguish one controller from the other. For example one or more LEDs can accomplish this by flashing or holding an LED pattern code. By way of example, 5 LEDs can be provided on the joystick controller 430 in a linear or two-dimensional pattern. Although a linear array of LEDs is preferred, the LEDs may alternatively, be arranged in a rectangular pattern or an arcuate pattern to facilitate determination of an image plane of the LED array when analyzing an image of the LED pattern obtained by the image capture unit 423. Furthermore, the LED pattern codes may also be used to determine the positioning of the joystick controller 430 during game play. For instance, the LEDs can assist in identifying tilt, yaw and roll of the controllers. This detection pattern can assist in providing a better user/feel in games, such as aircraft flying games, etc. The image capture unit 423 may capture images containing the joystick controller 430 and light sources 434. Analysis of such images can determine the location and/or orientation of the joystick controller. Such analysis may be implemented by program code instructions 404 stored in the memory 402 and executed by the processor 401. To facilitate capture of images of the light sources 434 by the image capture unit 423, the light sources 434 may be placed on two or more different sides of the joystick controller 430, e.g., on the front and on the back (as shown in phantom). Such placement allows the image capture unit 423 to obtain images of the light sources 434 for different orientations of the joystick controller 430 depending on how the joystick controller 430 is held by a user.

In addition the light sources 434 may provide telemetry signals to the processor 401, e.g., in pulse code, amplitude modulation or frequency modulation format. Such telemetry signals may indicate which joystick buttons are being pressed and/or how hard such buttons are being pressed. Telemetry signals may be encoded into the optical signal, e.g., by pulse coding, pulse width modulation, frequency modulation or light intensity (amplitude) modulation. The processor 401 may decode the telemetry signal from the optical signal and execute a game command in response to the decoded telemetry signal. Telemetry signals may be decoded from analysis of images of the joystick controller 430 obtained by the image capture unit 423. Alternatively, the apparatus 401 may include a separate optical sensor dedicated to receiving telemetry signals from the lights sources 434. The use of LEDs in conjunction with determining an intensity amount in interfacing with a computer program is described, e.g., in commonly-owned U.S. patent application Ser. No. 11/429,414 filed May 4, 2006, to Richard L. Marks et al., entitled "USE OF COMPUTER IMAGE AND AUDIO PROCESSING IN DETERMINING AN INTENSITY AMOUNT WHEN INTERFACING WITH A COMPUTER PROGRAM", which is incorporated herein by reference in its entirety. In addition, analysis of images containing the light sources 434 may be used for both telemetry and determining the position and/or orientation of the joystick controller 430. Such techniques may be implemented by program code instructions 404 which may be stored in the memory 402 and executed by the processor 401.

The processor 401 may use the inertial signals from the inertial sensor 432 in conjunction with optical signals from light sources 434 detected by the image capture unit 423 and/or sound source location and characterization information from acoustic signals detected by the microphone array 422 to deduce information on the location and/or orientation of the joystick controller 430 and/or its user. For example, "acoustic radar" sound source location and characterization may be used in conjunction with the microphone array 422 to track a moving voice while motion of the joystick controller is independently tracked (through the inertial sensor 432 and or light sources 434). Any number of different combinations of different modes of providing control signals to the processor 401 may be used in conjunction with embodiments of the present invention. Such techniques may be implemented by program code instructions 404 which may be stored in the memory 402 and executed by the processor 401.

Signals from the inertial sensor 432 may provide part of a tracking information input and signals generated from the image capture unit 423 from tracking the one or more light sources 434 may provide another part of the tracking information input. By way of example, and without limitation, such "mixed mode" signals may be used in a football type video game in which a Quarterback pitches the ball to the right after a head fake head movement to the left. Specifically, a game player holding the controller 430 may turn his head to the left and make a sound while making a pitch movement swinging the controller out to the right like it was the football. The microphone array 420 in conjunction with "acoustic radar" program code can track the user's voice. The image capture unit 423 can track the motion of the user's head or track other commands that do not require sound or use of the controller. The sensor 432 may track the motion of the joystick controller (representing the football). The image capture unit 423 may also track the light sources 434 on the controller 430. The user may release of the "ball" upon reaching a certain amount and/or direction of acceleration of the joystick controller 430 or upon a key command triggered by pressing a button on the joystick controller 430.

In certain embodiments of the present invention, an inertial signal, e.g., from an accelerometer or gyroscope may be used to determine a location of the joystick controller 430. Specifically, an acceleration signal from an accelerometer may be integrated once with respect to time to determine a change in velocity and the velocity may be integrated with respect to time to determine a change in position. If values of the initial position and velocity at some time are known then the absolute position may be determined using these values and the changes in velocity and position. Although position determination using an inertial sensor may be made more quickly than using the image capture unit 423 and light sources 434 the inertial sensor 432 may be subject to a type of error known as "drift" in which errors that accumulate over time can lead to a discrepancy D between the position of the joystick 430 calculated from the inertial signal (shown in phantom) and the actual position of the joystick controller 430. Embodiments of the present invention allow a number of ways to deal with such errors.

For example, the drift may be cancelled out manually by re-setting the initial position of the joystick controller 430 to be equal to the current calculated position. A user may use one or more of the buttons on the joystick controller 430 to trigger a command to re-set the initial position. Alternatively, image-based drift may be implemented by re-setting the current position to a position determined from an image obtained from the image capture unit 423 as a reference. Such image-based drift compensation may be implemented manually, e.g., when the user triggers one or more of the buttons on the joystick controller 430. Alternatively, image-based drift compensation may be implemented automatically, e.g., at regular intervals of time or in response to game play. Such techniques may be implemented by program code instructions 404 which may be stored in the memory 402 and executed by the processor 401.

In certain embodiments it may be desirable to compensate for spurious data in the inertial sensor signal. For example the signal from the inertial sensor 432 may be oversampled and a sliding average may be computed from the oversampled signal to remove spurious data from the inertial sensor signal. In some situations it may be desirable to oversample the signal and reject a high and/or low value from some subset of data points and compute the sliding average from the remaining data points. Furthermore, other data sampling and manipulation techniques may be used to adjust the signal from the inertial sensor to remove or reduce the significance of spurious data. The choice of technique may depend on the nature of the signal, computations to be performed with the signal, the nature of game play or some combination of two or more of these. Such techniques may be implemented by program code instructions 404 which may be stored in the memory 402 and executed by the processor 401.

The processor 401 may perform digital signal processing on signal data 406 in response to the data 406 and program code instructions of a program 404 stored and retrieved by the memory 402 and executed by the processor module 401. Code portions of the program 404 may conform to any one of a number of different programming languages such as Assembly, C++, JAVA or a number of other languages. The processor module 401 forms a general-purpose computer that becomes a specific purpose computer when executing programs such as the program code 404. Although the program code 404 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

In one embodiment, among others, the program code 404 may include a set of processor readable instructions that implement any one or more of the methods and techniques described herein or some combination of two or more of such methods and techniques. For example, the program code 404 may be configured to implement the image analyzer function described herein. Or alternatively, the image analyzer function described herein may be implemented in hardware.

In the illustrated embodiment the image analyzer function described above is illustrated as the image analyzer 450. The image analyzer 450 may receive its input from a camera, such as for example the image capture unit 423 or the camera 112 (FIG. 1A). Thus, the output of the video camera 112 or the image capture unit 423 may be coupled to the input of the image analyzer 450. The output of the image analyzer 450 may be provided to the system of the apparatus 400. This way, either commands themselves or information needed to see if a command or gesture has been recognized is provided to the apparatus 400. The image analyzer 450 may be coupled to the rest of the apparatus 400 in many different ways; as such, the illustrated connections are just one example. As another example, the image analyzer 450 may be coupled to the system bus 420, which will allow it to receive its input data from the image capture unit 423 and provide its output to the apparatus 400.

The image analyzer 450 may optionally be included in the apparatus 400 or the entertainment system or console 102, or the image analyzer 450 may be located separately from these devices and systems. And again, it should be well understood that the image analyzer 450 may be implemented, in whole or in part, in software, hardware or some combination of both. In the scenario where the image analyzer 450 is implemented in software, then the block 450 represents the image analyzer function implemented in software.

The program code 404 may generally include one or more instructions that direct the one or more processors to select a pre-calibrated listening zone at runtime and filter out sounds originating from sources outside the pre-calibrated listening zone. The pre-calibrated listening zones may include a listening zone that corresponds to a volume of focus or field of view of the image capture unit 423.

The program code may include one or more instructions which, when executed, cause the apparatus 400 to select a pre-calibrated listening sector that contains a source of sound. Such instructions may cause the apparatus to determine whether a source of sound lies within an initial sector or on a particular side of the initial sector. If the source of sound does not lie within the default sector, the instructions may, when executed, select a different sector on the particular side of the default sector. The different sector may be characterized by an attenuation of the input signals that is closest to an optimum value. These instructions may, when executed, calculate an attenuation of input signals from the microphone array 422 and the attenuation to an optimum value. The instructions may, when executed, cause the apparatus 400 to determine a value of an attenuation of the input signals for one or more sectors and select a sector for which the attenuation is closest to an optimum value.

The program code 404 may optionally include one or more instructions that direct the one or more processors to produce a discrete time domain input signal $x_m(t)$ from the microphones $M_0, \ldots M_M$, determine a listening sector, and use the listening sector in a semi-blind source separation to select the finite impulse response filter coefficients to separate out different sound sources from input signal $x_m(t)$. The program 404 may also include instructions to apply one or more fractional delays to selected input signals $x_m(t)$ other than an input signal $x_0(t)$ from a reference microphone $M_0$. Each fractional delay may be selected to optimize a signal to noise ratio of a discrete time domain output signal y(t) from the microphone array. The fractional delays may be selected to such that a signal from the reference microphone $M_0$ is first in time relative to signals from the other microphone(s) of the array. The program 404 may also include instructions to introduce a fractional time delay Δ into an output signal y(t) of the microphone array so that: $y(t+\Delta)=x(t+\Delta)*b_0+x(t-1+\Delta)*b_1+x(t-2+\Delta)*b_2+ \ldots +x(t-N+\Delta)b_N$, where Δ is between zero and ±1.

The program code 404 may optionally include processor executable instructions including one or more instructions which, when executed cause the image capture unit 423 to monitor a field of view in front of the image capture unit 423, identify one or more of the light sources 434 within the field of view, detect a change in light emitted from the light source(s) 434; and in response to detecting the change, triggering an input command to the processor 401. The use of LEDs in conjunction with an image capture device to trigger actions in a game controller is described e.g., in commonly-owned, U.S. patent application Ser. No. 10/759,782 to Richard L. Marks, filed Jan. 16, 2004 and entitled: METHOD AND APPARATUS FOR LIGHT INPUT DEVICE, which is incorporated herein by reference in its entirety.

The program code 404 may optionally include processor executable instructions including one or more instructions which, when executed, use signals from the inertial sensor and signals generated from the image capture unit from tracking the one or more light sources as inputs to a game system, e.g., as described above. The program code 404 may optionally include processor executable instructions including one or more instructions which, when executed compensate for drift in the inertial sensor 432.

In addition, the program code 404 may optionally include processor executable instructions including one or more instructions which, when executed adjust the gearing and mapping of controller manipulations to game a environment. Such a feature allows a user to change the "gearing" of manipulations of the joystick controller 430 to game state. For example, a 45 degree rotation of the joystick controller 430 may be geared to a 45 degree rotation of a game object. However this 1:1 gearing ratio may be modified so that an X degree rotation (or tilt or yaw or "manipulation") of the controller translates to a Y rotation (or tilt or yaw or "manipulation") of the game object. Gearing may be 1:1 ratio, 1:2 ratio, 1:X ratio or X:Y ratio, where X and Y can take on arbitrary values. Additionally, mapping of input channel to game control may also be modified over time or instantly. Modifications may comprise changing gesture trajectory models, modifying the location, scale, threshold of gestures, etc. Such mapping may be programmed, random, tiered, staggered, etc., to provide a user with a dynamic range of manipulatives. Modification of the mapping, gearing or ratios can be adjusted by the program code 404 according to game play, game state, through a user modifier button (key pad, etc.) located on the joystick controller 430, or broadly in response to the input channel. The input channel may include, but may not be limited to elements of user audio, audio generated by controller, tracking audio generated by the controller, controller button state, video camera output, controller telemetry data, including accelerometer data, tilt, yaw, roll, position, acceleration and any other data from sensors capable of tracking a user or the user manipulation of an object.

In certain embodiments the program code 404 may change the mapping or gearing over time from one scheme or ratio to another scheme, respectively, in a predetermined time-dependent manner. Gearing and mapping changes can be applied to a game environment in various ways. In one example, a video game character may be controlled under one gearing scheme when the character is healthy and as the character's health deteriorates the system may gear the controller commands so the user is forced to exacerbate the movements of the controller to gesture commands to the character. A video game character who becomes disoriented may force a change of mapping of the input channel as users, for example, may be required to adjust input to regain control of the character under a new mapping. Mapping schemes that modify the translation of the input channel to game commands may also change during gameplay. This translation may occur in various ways in response to game state or in response to modifier commands issued under one or more elements of the input channel. Gearing and mapping may also be configured to influence the configuration and/or processing of one or more elements of the input channel.

In addition, a speaker 436 may be mounted to the joystick controller 430. In "acoustic radar" embodiments wherein the program code 404 locates and characterizes sounds detected with the microphone array 422, the speaker 436 may provide an audio signal that can be detected by the microphone array 422 and used by the program code 404 to track the position of the joystick controller 430. The speaker 436 may also be used to provide an additional "input channel" from the joystick controller 430 to the processor 401. Audio signals from the speaker 436 may be periodically pulsed to provide a beacon for the acoustic radar to track location. The audio signals (pulsed or otherwise) may be audible or ultrasonic. The acoustic radar may track the user manipulation of the joystick controller 430 and where such manipulation tracking may include information about the position and orientation (e.g., pitch, roll or yaw angle) of the joystick controller 430. The pulses may be triggered at an appropriate duty cycle as one skilled in the art is capable of applying. Pulses may be initiated based on a control signal arbitrated from the system. The apparatus 400 (through the program code 404) may coordinate the dispatch of control signals amongst two or more joystick controllers 430 coupled to the processor 401 to assure that multiple controllers can be tracked.

Figure 5:
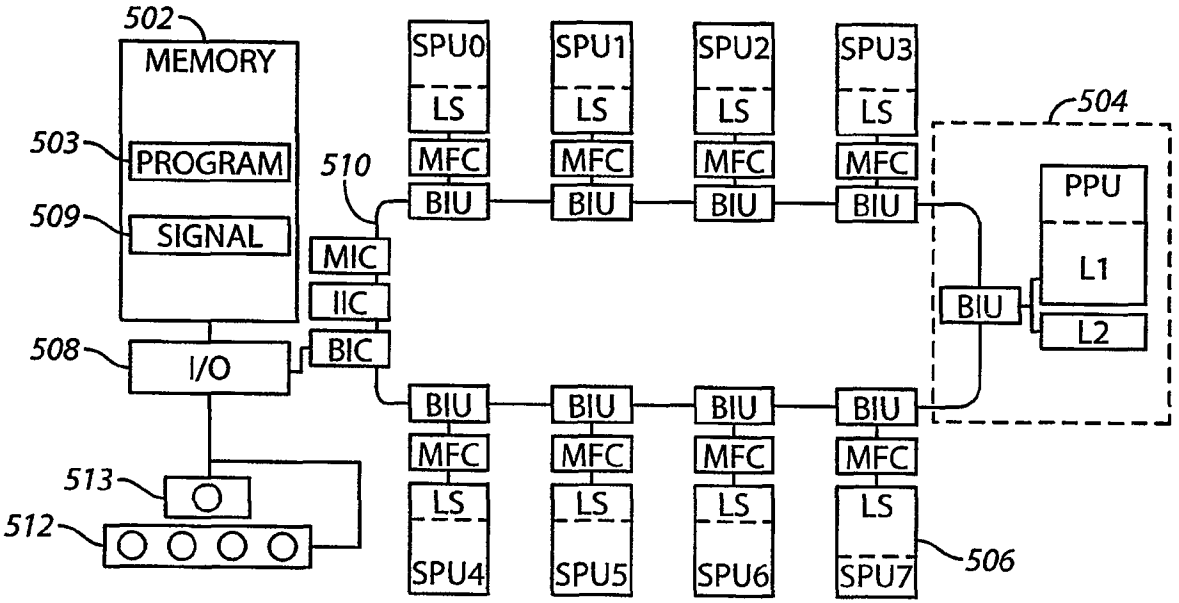
FIG. 5 is a block diagram illustrating a processor that may be used to run, implement and/or execute the methods and techniques shown and described herein in accordance with embodiments of the present invention.

By way of example, embodiments of the present invention may be implemented on parallel processing systems. Such parallel processing systems typically include two or more processor elements that are configured to execute parts of a program in parallel using separate processors. By way of example, and without limitation, FIG. 5 illustrates a type of cell processor 500 according to an embodiment of the present invention. The cell processor 500 may be used as the processor 401 of FIG. 4. In the example depicted in FIG. 5, the cell processor 500 includes a main memory 502, power processor element (PPE) 504, and a number of synergistic processor elements (SPEs) 506. In the example depicted in FIG. 5, the cell processor 500 includes a single PPE 504 and eight SPE 506. In such a configuration, seven of the SPE 506 may be used for parallel processing and one may be reserved as a back-up in case one of the other seven fails. A cell processor may alternatively include multiple groups of PPEs (PPE groups) and multiple groups of SPEs (SPE groups). In such a case, hardware resources can be shared between units within a group. However, the SPEs and PPEs must appear to software as independent elements. As such, embodiments of the present invention are not limited to use with the configuration shown in FIG. 5.

The main memory 502 typically includes both general-purpose and nonvolatile storage, as well as special-purpose hardware registers or arrays used for functions such as system configuration, data-transfer synchronization, memory-mapped I/O, and I/O subsystems. In embodiments of the present invention, a signal processing program 503 may be resident in main memory 502. The signal processing program 503 may run on the PPE. The program 503 may be divided up into multiple signal processing tasks that can be executed on the SPEs and/or PPE.

By way of example, the PPE 504 may be a 64-bit PowerPC Processor Unit (PPU) with associated caches L1 and L2. The PPE 504 is a general-purpose processing unit, which can access system management resources (such as the memory-protection tables, for example). Hardware resources may be mapped explicitly to a real address space as seen by the PPE. Therefore, the PPE can address any of these resources directly by using an appropriate effective address value. A primary function of the PPE 504 is the management and allocation of tasks for the SPEs 506 in the cell processor 500.

Although only a single PPE is shown in FIG. 5, some cell processor implementations, such as cell broadband engine architecture (CBEA), the cell processor 500 may have multiple PPEs organized into PPE groups, of which there may be more than one. These PPE groups may share access to the main memory 502. Furthermore the cell processor 500 may include two or more groups SPEs. The SPE groups may also share access to the main memory 502. Such configurations are within the scope of the present invention.

Each SPE 506 is includes a synergistic processor unit (SPU) and its own local storage area LS. The local storage LS may include one or more separate areas of memory storage, each one associated with a specific SPU. Each SPU may be configured to only execute instructions (including data load and data store operations) from within its own associated local storage domain. In such a configuration, data transfers between the local storage LS and elsewhere in a system 500 may be performed by issuing direct memory access (DMA) commands from the memory flow controller (MFC) to transfer data to or from the local storage domain (of the individual SPE). The SPUs are less complex computational units than the PPE 504 in that they do not perform any system management functions. The SPU generally have a single instruction, multiple data (SIMD) capability and typically process data and initiate any required data transfers (subject to access properties set up by the PPE) in order to perform their allocated tasks. The purpose of the SPU is to enable applications that require a higher computational unit density and can effectively use the provided instruction set. A significant number of SPEs in a system managed by the PPE 504 allow for cost-effective processing over a wide range of applications.

Each SPE 506 may include a dedicated memory flow controller (MFC) that includes an associated memory management unit that can hold and process memory-protection and access-permission information. The MFC provides the primary method for data transfer, protection, and synchronization between main storage of the cell processor and the local storage of an SPE. An MFC command describes the transfer to be performed. Commands for transferring data are sometimes referred to as MFC direct memory access (DMA) commands (or MFC DMA commands).

Each MFC may support multiple DMA transfers at the same time and can maintain and process multiple MFC commands. Each MFC DMA data transfer command request may involve both a local storage address (LSA) and an effective address (EA). The local storage address may directly address only the local storage area of its associated SPE. The effective address may have a more general application, e.g., it may be able to reference main storage, including all the SPE local storage areas, if they are aliased into the real address space.

To facilitate communication between the SPEs 506 and/or between the SPEs 506 and the PPE 504, the SPEs 506 and PPE 504 may include signal notification registers that are tied to signaling events. The PPE 504 and SPEs 506 may be coupled by a star topology in which the PPE 504 acts as a router to transmit messages to the SPEs 506. Alternatively, each SPE 506 and the PPE 504 may have a one-way signal notification register referred to as a mailbox. The mailbox can be used by an SPE 506 to host operating system (OS) synchronization.

The cell processor 500 may include an input/output (I/O) function 508 through which the cell processor 500 may interface with peripheral devices, such as a microphone array 512 and optional image capture unit 513. In addition an Element Interconnect Bus 510 may connect the various components listed above. Each SPE and the PPE can access the bus 510 through a bus interface units BIU. The cell processor 500 may also includes two controllers typically found in a processor: a Memory Interface Controller MIC that controls the flow of data between the bus 510 and the main memory 502, and a Bus Interface Controller BIC, which controls the flow of data between the I/O 508 and the bus 510. Although the requirements for the MIC, BIC, BIUs and bus 510 may vary widely for different implementations, those of skill in the art will be familiar their functions and circuits for implementing them.

The cell processor 500 may also include an internal interrupt controller IIC. The IIC component manages the priority of the interrupts presented to the PPE. The IIC allows interrupts from the other components the cell processor 500 to be handled without using a main system interrupt controller. The IIC may be regarded as a second level controller. The main system interrupt controller may handle interrupts originating external to the cell processor.

In embodiments of the present invention, certain computations, such as fractional delays, may be performed in parallel using the PPE 504 and/or one or more of the SPE 506. Each fractional delay calculation may be run as one or more separate tasks that different SPE 506 may take as they become available.

Some embodiments provide a tracking device for use in obtaining information for controlling an execution of a game program by a processor for enabling an interactive game to be played by a user. The tracking device can include a body and at least one PD element. The body can further include a section to be oriented towards a screen when a progress of a game provided via execution of the game apparatus is displayed upon the screen. The at least one PD element can additionally be assembled with the body. A position of the PD element within an image can be recordable by an image capture device when the section is oriented at least partly towards the screen. In operation, positions of the PD element at different points in time are quantifiable to quantify movement of the body in space.

Further, the body can be mountable to a game controller. The game controller can include a game controller body and at least one input device assembled with the game controller body. The input device can be manipulable by a user such that an input from the user can be registered. In some instances the apparatus includes both the tracking device and the game controller.

In some embodiments, the PD element can include a retroreflector. Additionally or alternatively, the PD element can have a color that has a high contrast relative to a color of a portion of the body adjacent to the PD element. Further, each of the at least one PD element can include a pattern that includes at least two different textures. For example, the textures can differ in at least one of brightness, color, roughness and/or other such relevant textures. In some embodiments, the PD element includes a light source, and in some implementations the light source can include at least one LED.

Further, some embodiments include two, three, four or more PD elements. These multiple PD elements can be oriented in one or more configurations. For example, in implementations with two PD elements, the PD elements can be oriented to define a line, and in some implementations with three PD elements, the elements can be oriented in a triangle. In other implementations having four PD elements, the elements can be arranged or positioned to define four lines. The four lines can define, for example, a rectangle or other relevant configuration.

The PD elements can include light sources and at least one of the light sources can be distinguishable from the other light sources by a characteristic relating to the light output by the at least one light source. The at least one light source can be distinguishable from the other light sources, for example, by at least one of a strobe frequency, an on-off duty cycle, a timing of an on interval within an on-off cycle, a spectral content of the output of the light source, and/or other such relevant distinctions and/or combinations of distinctions. In some embodiments, the body of the tracking device is mountable to the user's body.

The tracking devices according to some embodiments can further include a communications interface that can conduct digital communications with at least one of the processor, the game controller and/or both the processor and the game controller. The communications interface can be substantially any relevant interface, such as a universal asynchronous receiver transmitter ("UART"), universal serial bus ("USB") controller, and/or other such relevant interfaces and/or combinations of interfaces. Typically, the interface is operable to perform at least one of receiving a control signal for controlling an operation of the tracking device, for transmitting a signal from the tracking device for communication with another device, and/or other such communication functionality.

Some embodiments further include a processor operable to execute a game program to display a progress of a game on a screen to enable the game to be interactively played by a user. The position of one or more PD elements can be recordable by an image capture device located, for example, in a vicinity of the screen, and the processor can be configured to detect the position of the PD element within the image using information outputted by the image capture device. Additionally or alternatively, the processor can be operable to detect user input information for controlling execution of the game program from the information outputted by the image capture device, to obtain a series of samples representative of acceleration of the body in space at different points in time from information outputted by the image capture device, and/or to determine a velocity of the body using the series of samples, for example by integrating acceleration values obtained from the series of samples over an interval of time.

The processor can, in some instances, can determine a displacement of the body in space by first integrating acceleration values obtained from the series of samples over an interval of time and then integrating a result of the first integrating. Additionally or alternatively, the processor can determine a position of the body in space by determining the displacement in relation to a previously determined position.

In some instances where the tracking device includes at least two of PD elements, the processor can obtain a series of samples representative of acceleration of the body in at least two degrees of freedom in space using the information outputted by the image capture device. When the tracking device includes at least three of the PD elements, the processor can obtain a series of samples representative of acceleration of the body in at least three degrees of freedom using the information outputted by the image capture device. The three degrees of freedom, for example, can include movement along three orthogonal axes x, y and z, and/or pitch, yaw and roll. In some embodiments, the processor can quantify the movement in six degrees of freedom, which can include, for example, three degrees of freedom and pitch, yaw and roll.

Further, some embodiments provide a controller. The controller can include a body, one or more buttons disposed on the body, and one or more detectable elements disposed on the body that are arranged in an array. Additionally in some implementations, the array is a linear array.

As mentioned above, computer entertainment systems typically include a handheld controller, game controller, or other controller. A user or player uses the controller to send commands or other instructions to the entertainment system to control a video game or other simulation being played. Televisions, stereos, other entertainment systems, and appliances also include handheld controllers.

Various embodiments of the methods, apparatus, schemes and systems described herein provide for the mapping of the three-dimensional movements of a handheld controller to the two-dimensional image plane of a display screen. This allows the three-dimensional movements of the entire controller body itself by the user to be used in controlling aspects of a system in which manipulations are performed on the two-dimensional image plane of the display screen.

Figure 6A:
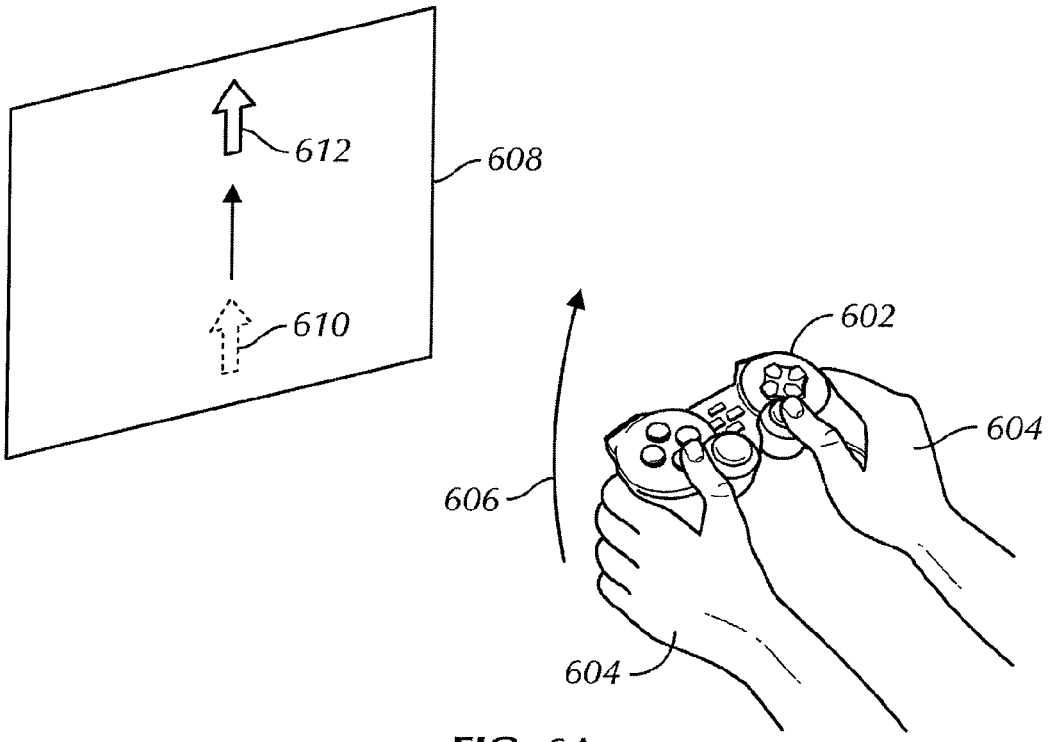
FIGS. 6A, 6B, and 6C are pictorial diagrams illustrating a system that operates in accordance with another embodiment of the present invention.
Figure 6B:
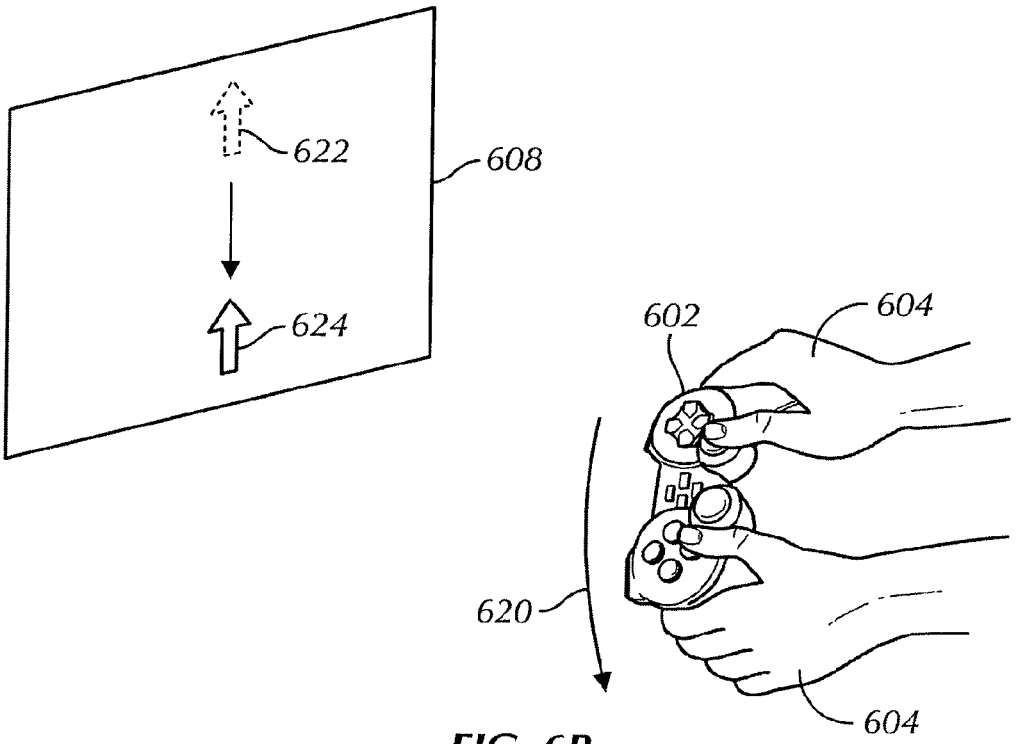
Figure 6C:
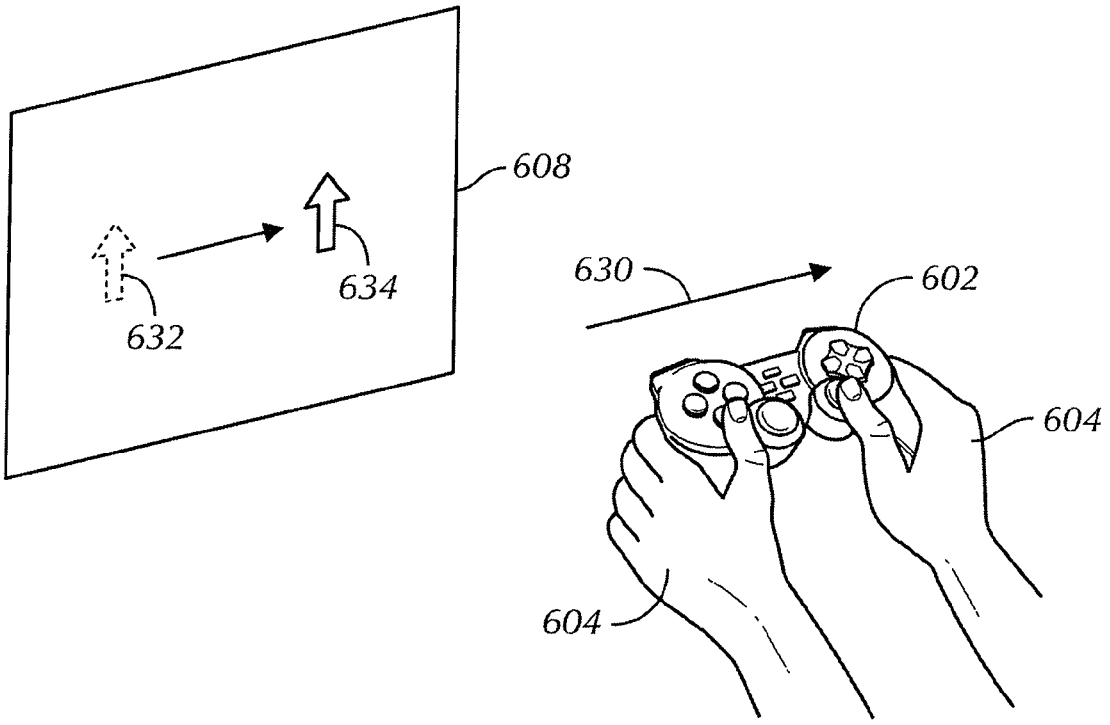

For example, FIGS. 6A, 6B and 6C illustrate a system that operates in accordance with an embodiment of the present invention. In this embodiment, the three-dimensional movements of a handheld controller can be used for a mouse-like function in manipulating a pointer on the screen. For example, FIG. 6A illustrates a controller 602 held in the hands 604 of a player. An upward movement 606 of the controller 602 moves a cursor on the screen 608 of a display from a one position 610 up to another position 612. In FIG. 6B, a downward movement 620 of the controller 602 moves a cursor on the screen 608 of the display from a one position 622 down to another position 624. And in FIG. 6C, a sideways movement 630 of the controller 602 moves a cursor on the screen 608 of the display from a one position 632 sideways to another position 634. As will be discussed below, in other embodiments the three-dimensional movements of a handheld controller can be used for other functions, such as in a game for manipulating crosshairs or the like on the screen.

Figure 7:
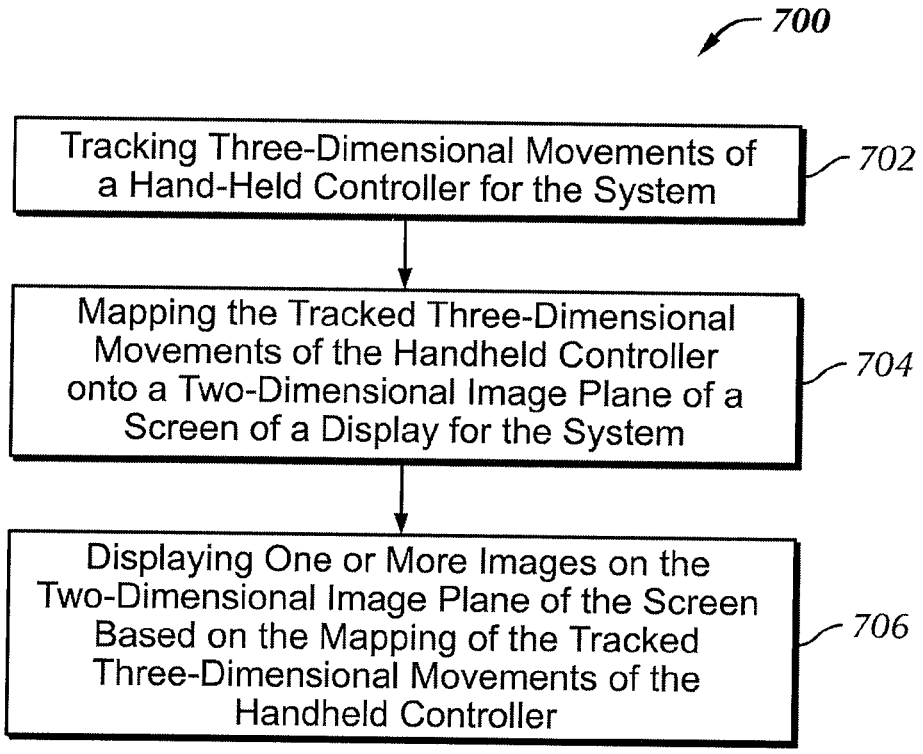
FIG. 7 is a flow diagram illustrating a method for use in controlling a system in accordance with an embodiment of the present invention.

Referring to FIG. 7, there is illustrated a method 700 that operates in accordance with an embodiment of the present invention. The method 700 begins in step 702 in which the three-dimensional movements of a hand-held controller for a system are tracked. Such tracking may be performed in many different ways. For example, such tracking may be performed through inertial, video, acoustical, or infrared analysis in any of the manners described herein above or in any other manner.

In the example of video tracking, for example, a camera peripheral can be used with the computer entertainment system to detect motions of the hand-held controller body and transfer them into actions in a game. The camera can be used to detect many different types of motions of the controller, such as for example up and down movements, twisting movements, side to side movements, jerking movements, wand-like motions, plunging motions, etc. Again, however, the tracking may alternatively be performed through inertial, acoustical, or infrared analysis. For example, in embodiments that use infrared analysis, an infrared analyzer and a linear infrared array are used to determine a user's position and the orientation of a controller based on looking at the output of the sensors.

In step 704, the tracked three-dimensional movements of the handheld controller are then mapped onto the two-dimensional image plane of the screen of the display for the system. That is, the movements of the controller body itself in three-dimensions are cast onto the two-dimensional image plane that is on the screen. Thus, the three-dimensional movements of the controller are translated onto the X—Y coordinates of the two-dimensional image plane of the screen.

In step 706, one or more images are then displayed on the two-dimensional image plane of the screen based on the mapping of the tracked three-dimensional movements of the handheld controller. The images may comprise many different types of images. For example, as shown in FIGS. 6A, 6B and 6C, the images may comprise a pointer for use in selecting items displayed on the screen. In that example, the whole controller 602 itself becomes a mouse-like device and can be used like a mouse to control and select items on the screen like menus, links, etc.

Various different types of controller movements can be configured to cause various different movements of the images displayed on the screen. For example, the user may lift up on the controller or he or she can twist his or her wrist up, causing certain movements of the images. Or in another example, the user can push down on the controller location, and then point the nose down to have the cursor go further down. Or in another example, the user may move to the left with the position of the controller, but then the user twists the orientation to the left which makes the cursor go to the left. Or in another example, the user may move the controller to the right and also twists the orientation to the right which makes the cursor go to the right. Again, these are just examples and many other types of movements may be configured.

Figure 8:
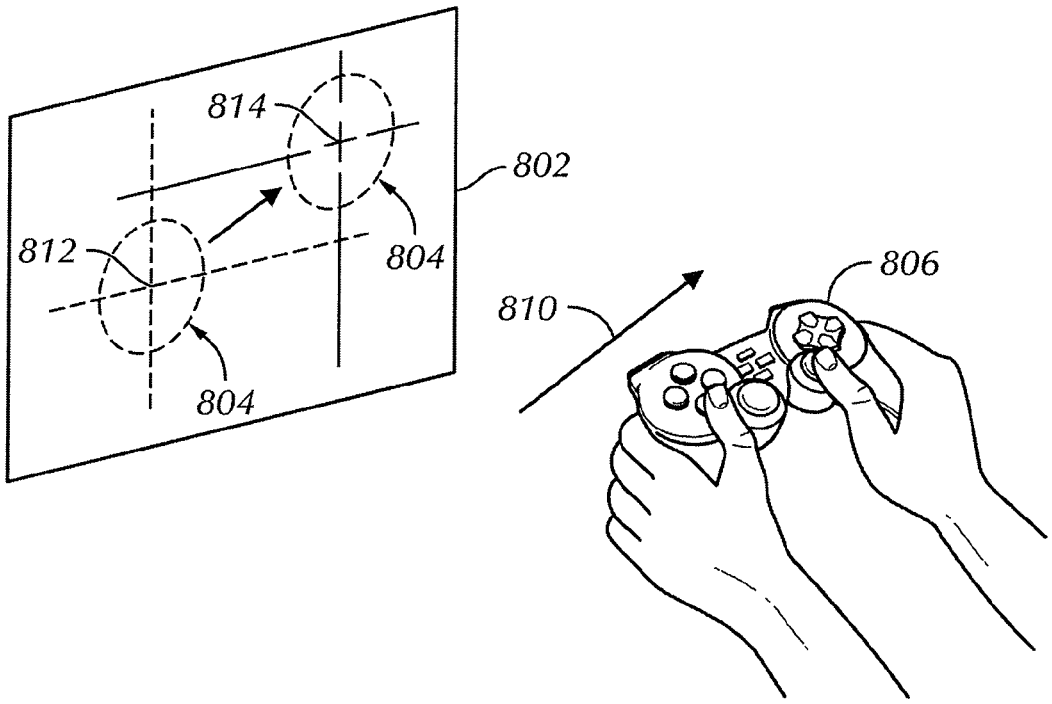
FIG. 8 is a pictorial diagram illustrating a system that operates in accordance with another embodiment of the present invention.

Referring to FIG. 8, there is illustrated another system that operates in accordance with an embodiment of the present invention. In this embodiment, the one or more images may comprise a set of crosshairs, such as for a shooter game. For example, in FIG. 8 the user or player may be walking through a three-dimensional space displayed on a screen 802 with the camera panning and moving through the game. A set of crosshairs 804 of the user's gun or the like are mapped to the X-Y coordinates of the two-dimensional image plane of the screen 802 over the three-dimensional space.

As the user moves the controller body 806 in three-dimensions, the movements cause the two-dimensional crosshairs 804 to move. As shown, a sideways and upward movement 810 of the controller body 806 causes a sideways and upward movement of the two-dimensional crosshairs 804 from one position 812 to another position 814. Thus, the games may comprise a three-dimensional game, but the crosshairs on the screen are mapped to the X and Y coordinates in the two-dimensional plane of the screen over the and three-dimensional space.

The examples described thus far illustrate that embodiments of the present invention allow the controller to be used as a mouse-like device for selecting menus, links, items, etc., but then the controller can change functions and be used for other functions, such as for example, controlling crosshairs in a shooting game. Thus, the detected movements, motions and/or manipulations of the entire controller body by the user may be used as additional commands to control various aspects of the game or other simulation being played.

In some embodiments, as an optional feature, the gearing of the manipulation to two-dimensional mapping may be adjusted or throttled so the user can move the cursor faster or slower based on the level of throttle that is chosen. This provides the user with flexibility in choosing the speed at which the cursor, crosshairs, etc., move in response to the motions and movements of the controller. Such gearing may be adjusted using any buttons or controls on the controller. By way of example, in some embodiments the hearing may be throttled using the variable buttons L2 and R2 (FIGS. 1B, 1C, 1D, and 1E) or any other buttons or controls.

Figure 9:
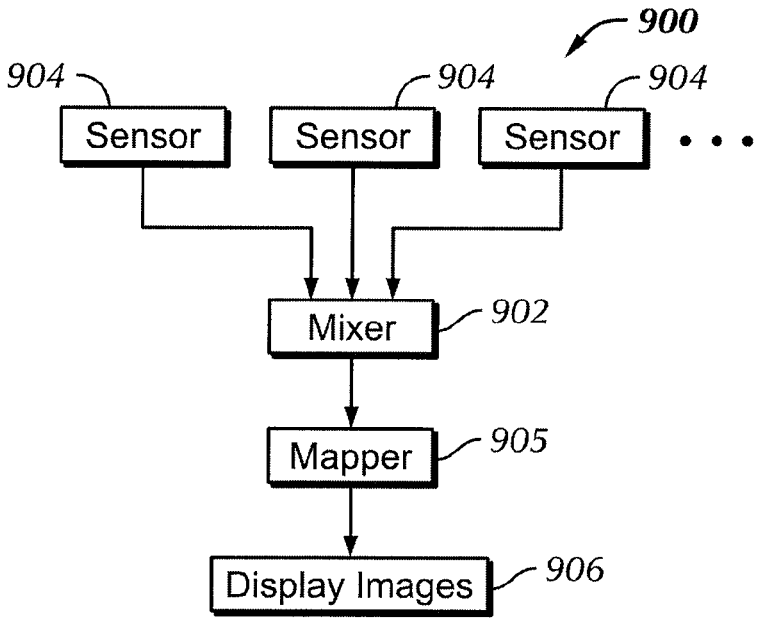
FIG. 9 is a block diagram illustrating a system that operates in accordance with another embodiment of the present invention.

As mentioned above, the three-dimensional movements of the hand-held controller may be tracked in many different ways, such as for example through inertial, video, acoustical, or infrared analysis as described above, or in any other manner. Referring to FIG. 9, there is illustrated a system 900 that operates in accordance with an embodiment of the present invention. As described above, "mixed model" signals may be used whereby signals from one type of sensor may provide part of the tracking information input and signals generated from another type of sensor may provide another part of the tracking information input. As such, in one embodiment a feedback loop may comprise a mixer 902 that may be used to mix signals from any number of different types of sensors 904, such as inertial, video, acoustical, or infrared sensors. The output from the mixer 902 is then mapped to the two-dimensional image plane of the screen by a mapper 904 or the like. Images are then displayed 906 on the 2D image plane of the screen.

In this way the 3D movements, motions and manipulations of a controller may be sensed and tracked and then mapped through a mixer back to the 2D platform on the screen. By way of example, if video tracking is used, the 3D movements of the controller are cast onto the 2D image plane of the camera, and then the controller movements and transformations from the perspective of the 2D image plane of the camera are mapped onto the 2D platform of the screen.

Figure 10:
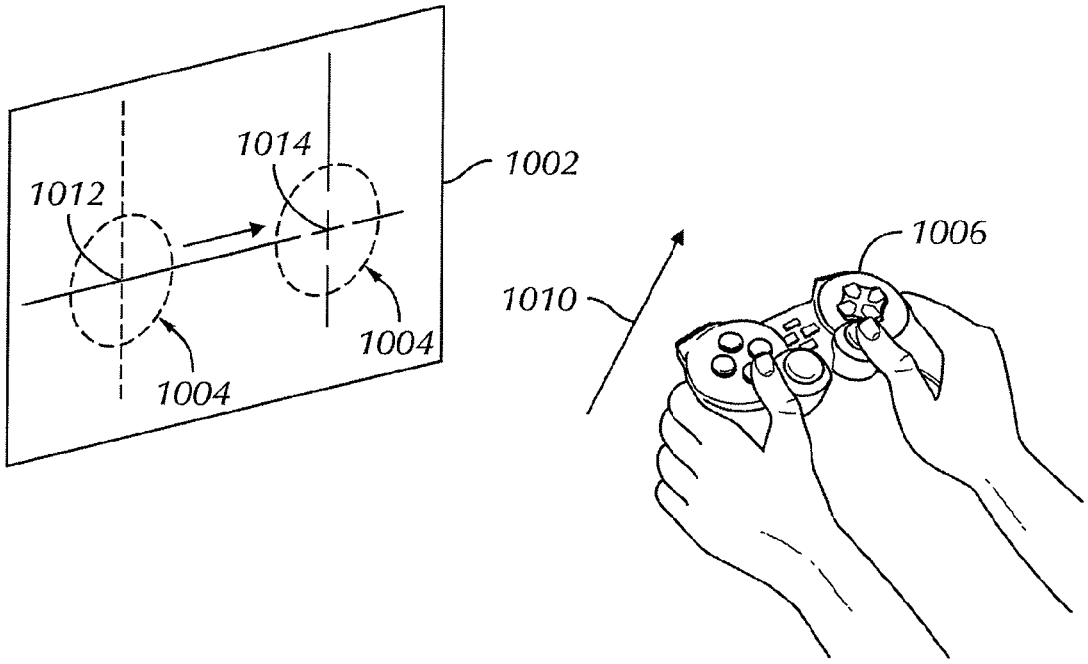
FIG. 10 is a pictorial diagram illustrating a system that operates in accordance with another embodiment of the present invention.

In other embodiments of the present invention either the X or Y coordinate of the two-dimensional image plane of the screen may optionally stay locked. This way, when a player moves the controller in various directions the image that is displayed on the screen moves only in one direction because one of the X and Y coordinates may be locked. For example, FIG. 10 illustrates a system that operates in accordance with another embodiment of the present invention. In this embodiment, a user or player may be walking through a three-dimensional space displayed on a screen 1002 with the camera panning and moving through the game. A set of crosshairs 1004 of the user's gun or the like are mapped to the X-Y coordinates of the two-dimensional image plane of the screen 1002 over the three-dimensional space.

In this example the Y coordinate is locked. As such, a sideways and upward movement 1010 of the controller body 1006 causes the two-dimensional crosshairs 1004 to move sideways along only the X axis from one position 1012 to another position 1014. The crosshairs 1004 move only along the X axis because the Y axis has been locked.

In some embodiments the user can hold a button down, which locks in one of the axes. For example, the button may lock in the Y coordinate so wherever the user moves the controller, the image on the screen will move only along the X axis. That is, the Y coordinate will stay fixed. Thus, the user can twist the controller to the right and slide all the way to the right on the X axis, or twist the controller to the left and slide all the way to the left along the X axis. In some embodiments, when the user pushes the button again, this may be configured to unlock the previously locked axis, which again provides the user with full degrees of movement. In some embodiments, the user may push another button to lock in the X-coordinate, which allows the user to slide the crosshairs only up and down.

Figure 11A:
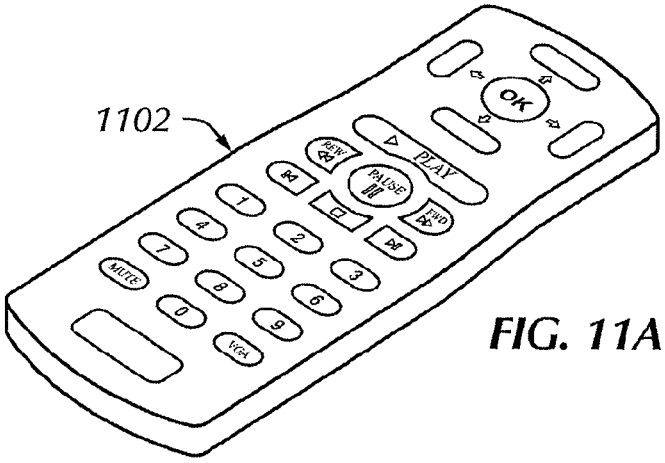
FIGS. 11A and 11B are perspective diagrams illustrating controllers that may optionally be used in the described systems in accordance with embodiments of the present invention.
Figure 11B:
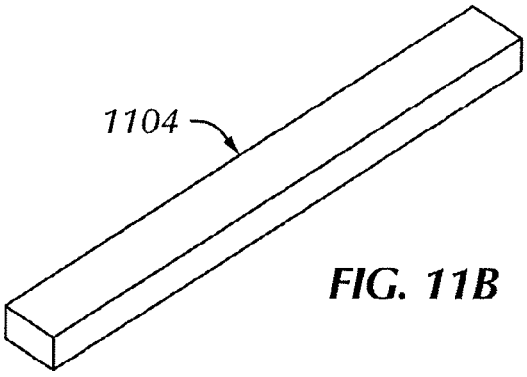

The hand-held controller may comprise any type of controller in accordance with various embodiments of the present invention. For example, while a video game console controller is illustrated, the controller may instead comprise any other type of controller, such as a traditional controller for a television, stereo, DVD player, etc. By way of example, FIG. 11A illustrates a traditional television controller 1102 that may be used in accordance with various embodiments of the present invention. Or, the controller may instead comprise any other type of object that may be tracked in the manner described herein. By way of example, FIG. 11B illustrates such an object 1104 that may be used in accordance with various embodiments of the present invention.

In some embodiments the position and yaw of the controller may be additive. This would allow controller movements to continue to move the cursor or cross-hairs in the same direction so that the movements "add" to the previous movements.

As mentioned above, detecting and tracking a user's manipulations of a game controller body may be implemented in different ways. For example, an inertial sensor, such as an accelerometer or gyroscope, an image capture unit, such as a digital camera, can be used with the computer entertainment system to detect motions of the hand-held controller body and transfer them into actions in a game. Examples of tracking a controller with an inertial sensor are described, e.g., in U.S. patent application Ser. No. 11/382,033, entitled "SYSTEM, METHOD, AND APPARATUS FOR THREE-DIMENSIONAL INPUT CONTROL", which is incorporated herein by reference. Examples of tracking a controller using image capture are described, e.g., in U.S. patent application Ser. No. 11/382,034, entitled "SCHEME FOR DETECTING AND TRACKING USER MANIPULATION OF A GAME CONTROLLER BODY", which is incorporated herein by reference. In addition, the controller and/or the user may also be tracked acoustically using a microphone array and appropriate signal processing. Examples of such acoustic tracking are described in U.S. patent application Ser. No. 11/381,721, which is incorporated herein by reference.

Acoustic sensing, inertial sensing and image capture can be used individually or in any combination to detect many different types of motions of the controller, such as for example up and down movements, twisting movements, side to side movements, jerking movements, wand-like motions, plunging motions, etc. Such motions may correspond to various commands such that the motions are transferred into actions in a game. Detecting and tracking the user's manipulations of a game controller body can be used to implement many different types of games, simulations, etc., that allow the user to, for example, engage in a sword or lightsaber fight, use a wand to trace the shape of items, engage in many different types of sporting events, engage in on-screen fights or other encounters, etc. A game program may be configured to track the motion of the controller and recognize certain pre-recorded gestures from the tracked motion. Recognition of one or more of these gestures may trigger a change in the game state.

As mention above, in some embodiments of the present invention controller path information obtained from these different sources may be mixed prior to analysis for gesture recognition. The tracking data from different sources (e.g., acoustic, inertial and image capture) may be mixed in a way that improves the likelihood of recognition of a gesture.

Figure 12:
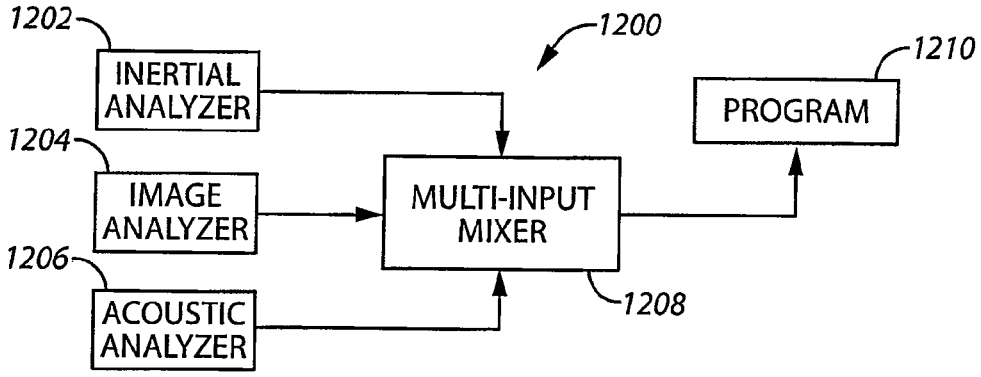
FIG. 12 is a block diagram of a system for mixing various control inputs according to an embodiment of the present invention.

As discussed above, data from inertial, image capture and acoustic sources may be analyzed to generate a path that tracks the position and/or orientation of the controller. As shown in the block diagram of FIG. 12 a system 1200 according to an embodiment of the invention may include an inertial analyzer 1202, an image analyzer 1204 and an acoustic analyzer 1206. Each of these analyzers receives signals from a sensed environment. The analyzers 1202, 1206, 1208 may be implemented in hardware, in software (or firmware) or some combination of two or more of these. Each of the analyzers produces tracking information related the position and/or orientation of an object of interest. By way of example, the object of interest may be the controller 110 referred to above. The image analyzer 1204 may operate in connection with and to form fields below and with respect to methods described in U.S. patent application Ser. No. 11/382,034. The inertial analyzer 1202 may operate in connection with and to form fields below and with respect to methods described in U.S. patent application Ser. No. 11/382,033, entitled "SYSTEM, METHOD, AND APPARATUS FOR THREE-DIMENSIONAL INPUT CONTROL". The acoustic analyzer 1206 may operate in connection with and to form fields below and with respect to methods described in U.S. patent application Ser. No. 11/381,724.

The analyzers 1202, 1204 and 1206 may be regarded as being associated with different channels of inputs of position and/or orientation information. The Mixer 1208 may accept multiple input channels and such channels may contain sample data characterizing the sensed environment, typically from the perspective of the channel. The position and/or orientation information generated by the inertial analyzer 1202, image analyzer 1204 and acoustic analyzer 1206 can be coupled into the input of a mixer 1208. The Mixer 1208 and analyzers 1202, 1204, 1206 may be queried by a game software 1210 and may be configured to interrupt game software in response to events. Events may include gesture recognition events, gearing changes, configuration changes, setting noise levels, setting sampling rate, changing mapping chains, etc, examples of which are discussed below. The mixer 1208 may operate in connection with and to form fields below and with respect to methods described herein.

As discussed above, signals from different input channels, e.g., inertial sensors, video images and/or acoustic sensors may be analyzed by the inertial analyzer 1202, image analyzer 1204 and acoustic analyzer 1206, respectively, to determine the motion and/or orientation of the controller 110 during play of a video game according to an inventive method. Such a method may be implemented as a series of processor executable program code instructions stored in a processor readable medium and executed on a digital processor.

Figure 13A:
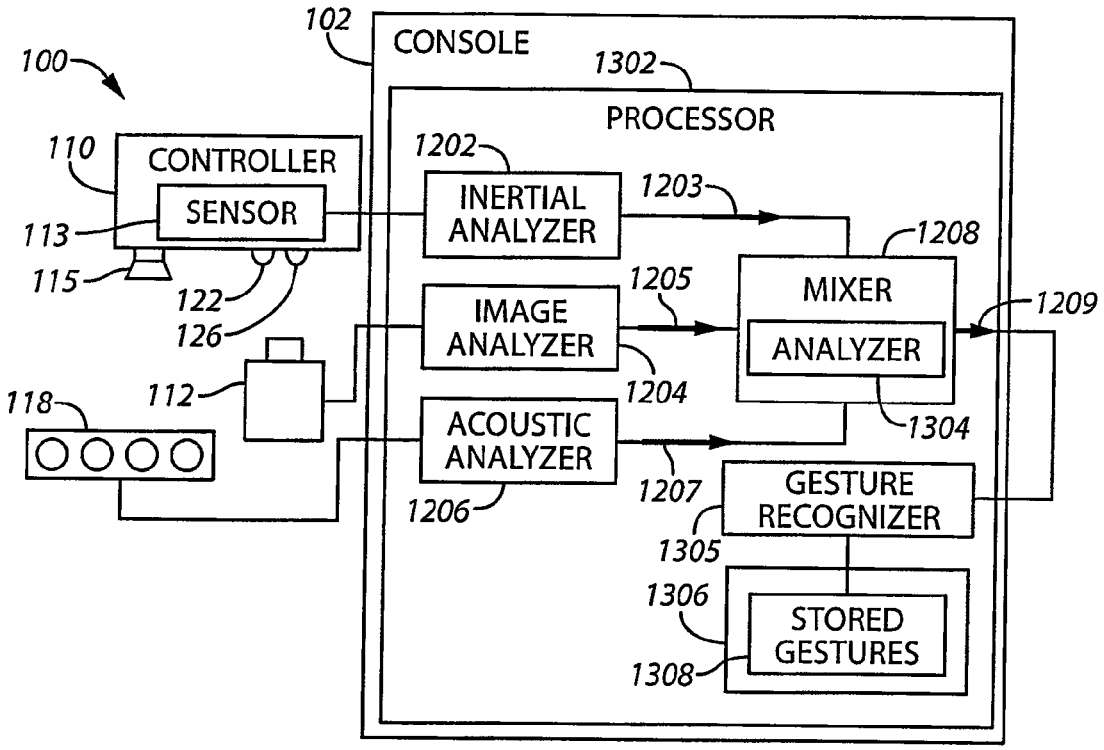
FIG. 13A is a block diagram of a system according to an embodiment of the present invention.

For example, as depicted in FIG. 13A, the video game system 100 may include on the console 102 having the inertial analyzer 1202, image analyzer 1204 and acoustic analyzer 1206 implemented either in hardware or software. By way of example, the analyzers 1202, 1204, 1206 may be implemented as software instructions running on a suitable processor unit 1302. By way of example, the processor unit 1302 may be a digital processor, e.g., a microprocessor of a type commonly used in video game consoles. A portion of the instructions may be stored in a memory 1306. Alternatively, the inertial analyzer 1202, image analyzer 1204 and acoustic analyzer 1206 may be implemented in hardware, e.g., as an application specific integrated circuit (ASIC). Such analyzer hardware may be located on the controller 110 or on the console 102 or may be remotely located elsewhere. In hardware implementations, the analyzers 1202, 1204, 1206 may be programmable in response to external signals e.g., from the processor 1302 or some other remotely located source, e.g., connected by USB cable, wireless connection, or over a network.

Figure 13B:
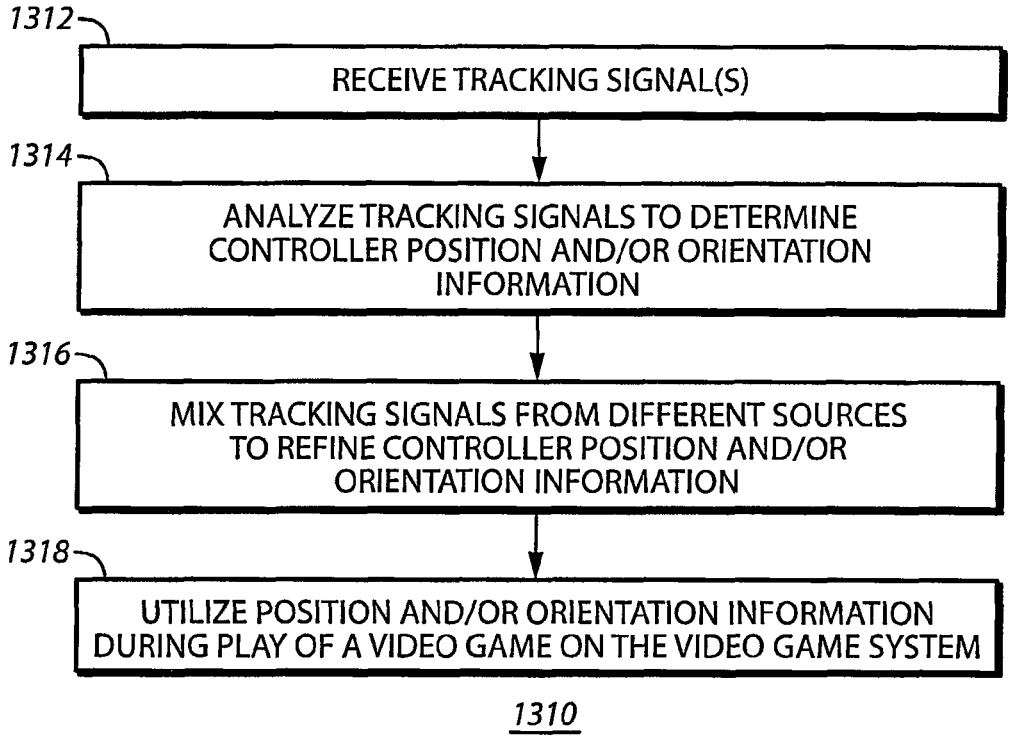
FIG. 13B is a flow diagram of a method according to an embodiment of the present invention.

The inertial analyzer 1202 may include or implement instructions that analyze the signals generated by an inertial sensor 113 and utilize information regarding position and/or orientation of the controller 110. Similarly, the image analyzer 1204 may implement instructions that analyze images captured by the image capture unit 112. In addition, the acoustic analyzer may implement instructions that analyze images captured by a microphone array 118. As shown in the flow diagram 1310 of FIG. 13B these signals and/or images may be received by the analyzers 1202, 1204, 1206 as indicated at block 1312. The signals and/or images may be analyzed by the analyzers 1202, 1204, 1206 to determine inertial tracking information 1203, image tracking information 1205 and acoustic tracking information 1207 regarding the position and/or orientation of the controller 110 as indicated at block 1314. The tracking information 1203, 1205, 1207 may be related to one or more degrees of freedom. It is preferred that six degrees of freedom are tracked to characterize the manipulation of the controller 110 or other tracked object. Such degrees of freedom may relate to the controller tilt, yaw, roll and position, velocity or acceleration along the x, y and z-axis.

In some embodiments the controller 110 may also include an acoustic signal generator 115 (e.g., a speaker) to provide a source of sound to facilitate acoustic tracking of the controller 110 with the microphone array 118 and appropriate acoustic signal processing, e.g., as described in U.S. patent application Ser. No. 11/381,724, which is incorporated herein by reference.

As indicated at block 1316, the mixer 1208 mixes the inertial information 1203, image information 1205 and acoustic information 1207 to generate refined position and/or orientation information 1209. By way of example, the mixer 1208 may apply different weights the inertial, image and acoustic tracking information 1203, 1205, 1207 based on game or environmental conditions and the take a weighted average. In addition, the mixer 1208 may include its own mixer analyzer 1304 that analyzes the combined position/orientation information and generates its own resulting "mixer" information that involves combinations of the information generated by the other analyzers.

In an embodiment of the present invention the mixer 1208 may assign a distribution value to the tracking information 1203, 1205, 1207 from the analyzers 1202, 1204, 1206. As noted above, certain sets of input control data may be averaged. In the present embodiment, however, the input control data is assigned a value prior to its being averaged whereby the input control data from some analyzers is of more analytical importance than from others.

The mixer 1208 may take on a number of functionalities in the context of the present system including observation, correction, stabilization, derivation, combination, routing, mixing, reporting, buffering, interrupting other processes and analysis. Such may be performed with respect to the tracking information 1203, 1205, 1207 received from one or more of the analyzers 1202, 1204, 1206. While each of the analyzers 1202, 1204, 1206 may receive and/or derive certain tracking information, the mixer 1208 may be implemented to optimize the use of the received tracking information 1203, 1205, 1207 and generate refined tracking information 1209.

The analyzers 1202, 1204, 1206 and mixer 1208 are preferably configured to provide tracking information similar output formats. Tracking information parameters from any analyzer element 1202, 1204, 1206 can be mapped to a single parameter in an analyzer. Alternatively, the mixer 1208 may form tracking information for any of the analyzers 1202, 1204, 1206 by processing one or more tracking information parameters from one or more of analyzers 1202, 1204, 1206. The mixer may combine two or more elements of tracking information of the same parameter type taken from the analyzers 1202, 1204, 1206 and/or perform functions across multiple parameters of tracking information generated by the analyzers to create a synthetic set of output having the benefit of being generated from multiple channels of input.

The refined tracking information 1209 may be utilized during play of a video game with the system 100 as indicated at block 1318. In certain embodiments, the position and/or orientation information may be used in relation to gestures made by the user 108 during game play. In some embodiments the mixer 1208 may operate in conjunction with the gesture recognizer 1305 to associate at least one action in a game environment with one or more user actions from the user (e.g., manipulation of the controller in space).

Figure 13C:
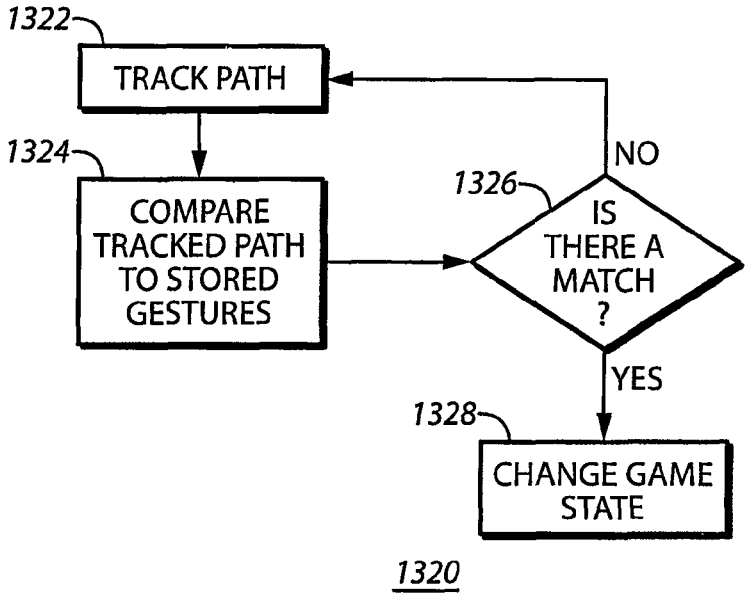
FIG. 13C is a flow diagram of a method according to an embodiment of the present invention.

As indicated in the flow diagram 1320 of FIG. 13C, a path of the controller 110 may be tracked using the position and/or orientation information as indicated at block 1322. By way of example, and without limitation, the path may include a set of points representing a position of the center of mass of the controller with respect to some system of coordinates. Each position point may be represented by one or more coordinates, e.g., X, Y and Z coordinates in a Cartesian coordinate system. A time may be associated with each point on the path so that both the shape of the path and the progress of the controller along the path may be monitored. In addition, each point in the set may have associated with it data representing an orientation of the controller, e.g., one or more angles of rotation of the controller about its center of mass. Furthermore, each point on the path may have associated with it values of velocity and acceleration of the center of mass of the controller and rates of angular rotation and angular acceleration of the controller about its center of mass.

As indicated at block 1324, the tracked path may be compared to one or more stored paths corresponding to known and/or pre-recorded gestures 1308 that are relevant to the context of the video game being played. Recognizer 1305 may be configured to recognize a user or process audio authenticated gestures, etc. For example, a user may be identified by the recognizer 1305 through a gesture and that a gesture may be specific to a user. Such a specific gestures may recorded and included among the pre-recorded gestures 1308 stored in memory 1306. The recordation process may optionally store audio generated during recordation of a gesture. The sensed environment is sampled into a multi-channel analyzer and processed. The processor may reference gesture models to determine and authenticate and/or identify a user or objects based on voice or acoustic patterns and to a high degree of accuracy and performance.

As indicated in FIG. 13A, data 1308 representing the gestures may be stored in the memory 1306. Examples of gestures include, but are not limited to throwing an object such as a ball, swinging an object such as a bat or golf club, pumping hand pump, opening or closing a door or window, turning steering wheel or other vehicle control, martial arts moves such as punches, sanding movements, wax on wax off, paint the house, shakes, rattles, rolls, football pitches, turning knob movements, 3D MOUSE movements, scrolling movements, movements with known profiles, any recordable movement, movements along any vector back and forth i.e. pump the tire but at some arbitrary orientation in space, movements along a path, movements having precise stop and start times, any time based user manipulation that can be recorded, tracked and repeated within the noise floor, splines, and the like. Each of these gestures may be pre-recorded from path data and stored as a time-based model. Comparison of the path and stored gestures may start with an assumption of a steady state if the path deviates from a steady state the path can be compared to the stored gestures by a process of elimination. If at block 1326 there is no match, the analyzer 1304 may continue tracking the path of the controller 110 at block 1322. If there is a sufficient match between the path (or a portion thereof) and a stored gesture the state of the game may be changed as indicated at 1328. Changes of state of the game may include, but are not limited to interrupts, sending control signals, changing variables, etc.

Here is one example of this can occur. Upon determining that the controller 110 has left a steady state the path an analyzer 1202, 1204, 1206, or 1304 tracks movement of the controller 110. As long as the path of the controller 110 complies with a path defined in the stored gesture models 1308, those gestures are possible "hits". If the path of the controller 110 deviates (within the noise tolerance setting) from any gesture model 1308, that gesture model is removed from the hit list. Each gesture reference model includes a time-base in which the gesture is recorded. The analyzer 1202, 1204, 1206, or 1304 compares the controller path data to the stored gestures 1308 at the appropriate time index. Occurrence of a steady state condition resets the clock. When deviating from steady state (i.e. when movements are tracked outside of the noise threshold) the hit list is populated with all potential gesture models. The clock is started and movements of the controller are compared against the hit list. Again, the comparison is a walk through time. If any gesture in the hit list reaches the end of the gesture then it is a hit.

In some embodiments of the present invention the mixer 1208 may assign a distribution value to the tracking information 1203, 1205, 1207 from the analyzers 1202, 1204, 1206. As noted above, certain sets of input control data may be averaged. In the present embodiment, however, the input control data is assigned a value prior to its being averaged whereby the input control data from some analyzers is of more analytical importance than from others.

For example, the mixer 1208 may require tracking information related to acceleration and steady state. The mixer 1208 would then receive the tracking information 1203, 1205, 1207 as described above. The tracking information may include parameters relating to acceleration and steady state, e.g., as described above. Prior to averaging the data representing this information, the mixer 1208 may assign distribution values to tracking information data set 1203, 1205, 1207. For example, the x- and y-acceleration parameters from the inertial analyzer 1202 may be weighted at a value of 90%. The x- and y-acceleration data from the image analyzer 1206, however, may be weighted at only 10%. The acoustic analyzer tracking information 1207 as it pertains to acceleration parameters may be weighted at zero percent, that is, the data has no value.

Similarly, the Z-axis tracking information parameters from the inertial analyzer 1202 may be weighted at 10% whereas the image analyzer Z-axis tracking information may be weighted at 90%. The acoustic analyzer tracking information 1207 may, again, be weighted at 0% value but steady state tracking information from the acoustic analyzer 1206 may be weighted at 100% with the remaining analyzer tracking information be weighted at 0%.

After the appropriate distribution weight has been assigned, the input control data may be averaged in conjunction with that weight to arrive at a weighted average input control data set that is subsequently analyzed by the gesture recognizer 1305 and associated with a particular action in the game environment. The values associated may be pre-defined by the mixer 1208 or by a particular game title. The values may also be the result of the mixer 1208 identifying a particular quality of data coming from the various analyzers and thus making a dynamic adjustment as is further discussed below. The adjustment may also be the result of building a historical knowledge base of when particular data is of particular value in a particular environment and/or in response to the particularities of a given game title.

The mixer 1208 may be configured to operate dynamically during game play. For example, as the mixer 1208 receives various input control data, it may recognize that certain data is consistently outside an acceptable range or quality of data or reflects corrupt data that may be indicative of a processing error at the related input device.

Additionally, certain conditions in a real-world environment might change. For example, natural light in the user's at-home game environment might be increasing as the morning turns to afternoon causing problems with image data capture. Further, a neighborhood or household might become noisier as the day goes on causing problems with audio data capture. Likewise, if a user has been playing for several hours, their reflexes may become less sharp thus causing problems with interpretation of inertial data.

In these instances, or in any other instance wherein the quality of a particular form of input control data is in question, the mixer 1208 may dynamically reassign distribution weight to a particular set of data coming from a particular device such that more or less importance is given to particular input control data as described above. Similarly, the game environment may change over the course of the game wherein the needs of a particular game change thus requiring a reassignment of value or need for particular input control data.

Similarly, the mixer 1208 may recognize that certain data being passed on to the gesture recognizer 1305 is being processed incorrectly, slowly, or not at all based on processing errors or feedback data that may be generated by the gesture recognizer 1305. In response to this feedback or in recognition of these processing difficulties (e.g., while the image analysis data is within an acceptable range, errors result when an association is made by the gesture recognizer 1305), the mixer 1208 may adjust what input control data it seeks from what analyzer and when, if at all. The mixer 1208 may further require certain analysis and processing of input control data by the proper analyzer before it is passed to the mixer 1208, which may re-process the data (e.g., average the data) such that a further layer of assurance is made that the data passed to the gesture recognizer 1305 will be processed effectively and appropriately.

In some embodiments, the mixer 1208 may recognize that certain data is corrupt, ineffective, or outside a particular variable and may call upon particular input control data or variable related to that data such that it may replace incorrect data or properly analyze and calculate certain data with respect to the necessary variables.

Figure 14:
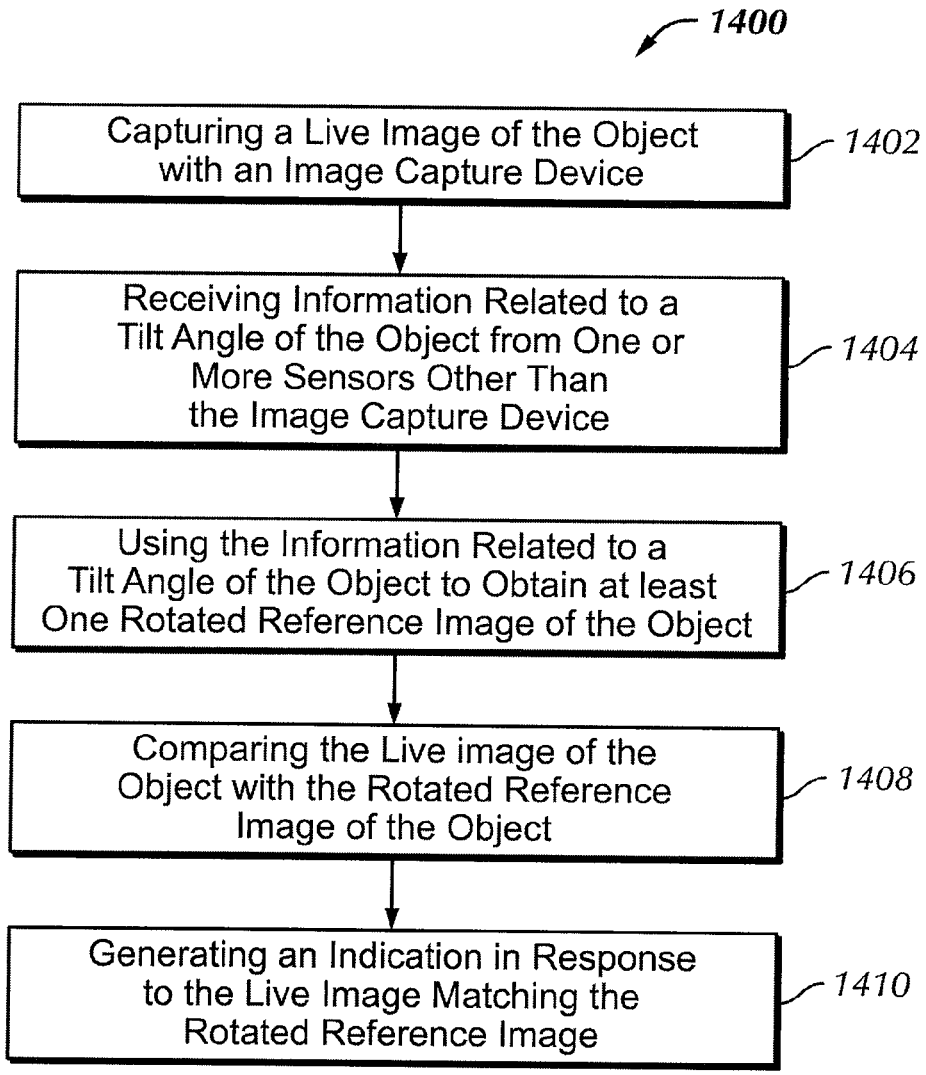
FIG. 14 is a flow diagram illustrating a method for use in obtaining input data from an object in accordance with an embodiment of the present invention.

Referring to FIG. 14, there is illustrated a method 1400 in accordance with an embodiment of the present invention. The method 1400 provides another example of how information from the various sensors may be used, combined and/or mixed to perform tracking of an object such as a controller.

In one example implementation, the method 1400 may be used to track the position of a controller using a video camera where tilt information provided by a sensor in the controller, such as a gyro sensor or accelerometer, is used to optimize controller image detection. Controller image detection is optimized by using a translated compare in which a reference detect profile image of the controller is rotated in accordance with the tilt angle of the controller provided by the sensor.

More specifically, the method 1400, which may be used in obtaining input data from an object such as a controller, begins in step 1402 where a live image of the object is captured with an image capture device. The image capture device may comprise any type of camera, such as any type of camera described herein. For example, in some embodiments the image capture device may comprise a Z-camera or depth camera or some other type of three-dimensional camera. Such a Z-camera or depth camera may, as described above, provide or measure a depth of each pixel and/or determine the distance of a pixel from the camera.

Figure 15:
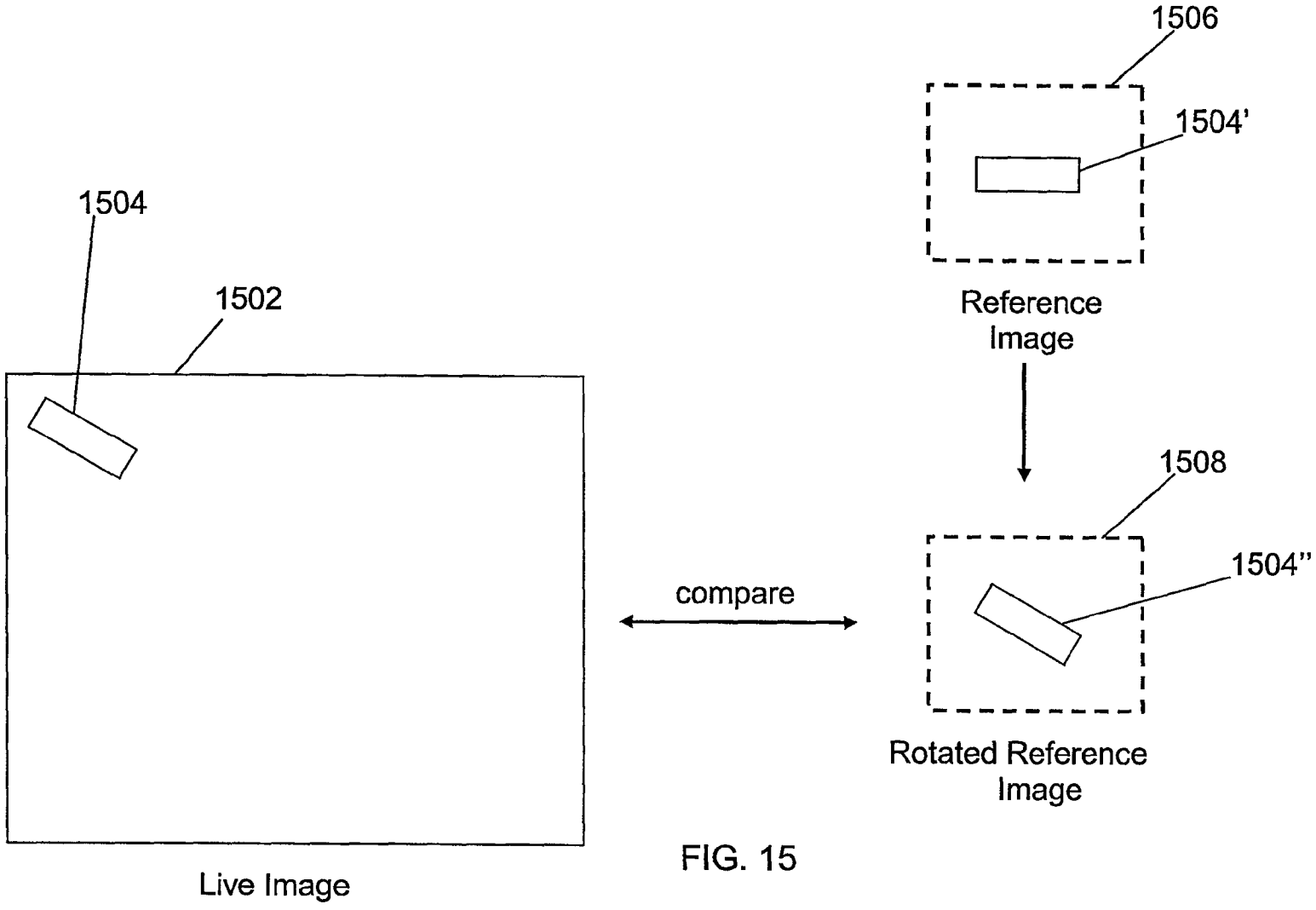
FIG. 15 is a block diagram illustrating some of the steps shown in FIG. 14 in accordance with an embodiment of the present invention.

FIG. 15 illustrates an example of this step. Namely, a live image 1502 of an object 1504 is captured. In some embodiments the object 1504 may comprise a controller. As illustrated, the object 1504 is located in the upper left corner of the camera's field of view.

In step 1404 (FIG. 14) information related to a tilt angle of the object is received from one or more sensors other than the image capture device. By way of example, the one or more sensors may comprise any one or more of a gyro sensor, accelerometer, or similar sensor. Such sensors may be located in the object.

In some embodiments the gyro sensor may be used if rotation of the object is about the gyro axis. The accelerometer readings and the direction of gravity may be used in all situations. Using the accelerometer readings has the benefit of getting an absolute angular answer that does not drift. In some embodiments both sensors may be used if rotation is about the gyro axis. In some embodiments the information related to the tilt angle of the object may be used to determine or estimate the tilt angle of the object.

Measuring the tilt angle of the object is beneficial because knowing the tilt angle helps the camera tracking, as will be described below. Using the tilt angle is also beneficial because controllers of the type described hereinabove having the ability to be tracked in six degrees of freedom can measure tilt fairly easily. Furthermore, rotation is awkward to measure using a camera.

In step 1406 the information related to a tilt angle of the object is used to obtain at least one rotated reference image of the object. By way of example, the basic reference image of the object may comprise a profile view of the object, a top view of the object, a view of a user's hand or hands holding the object, or some other view. Thus, in embodiments where the object comprises a controller, the basic reference image of the object may comprise a profile view of the controller, a top view of the controller, a view of the user's hand or hands holding the controller, or some other view.

FIG. 15 illustrates an example of a basic reference image 1506 of the object 1504, which is labeled 1504'. As illustrated, the object 1504' is not rotated.

In some embodiments, a rotated reference image of the object may be obtained by rotating the reference image on-the-fly using the information related to a tilt angle of the object or a determined tilt angle of the object. Or, in some embodiments a set of rotated versions of the reference image may be stored in memory. The information related to a tilt angle of the object, or a determined tilt angle of the object, may be used to select the corresponding rotated reference image from the stored set. The rotated reference image of the object may then be obtained by retrieving it from storage.

FIG. 15 illustrates an example of a rotated reference image 1508 of the object 1504, which is labeled 1504". As illustrated, the object 1504" is rotated in a manner that is the same or similar to the rotation of the object 1504 in the live image 1502.

It was mentioned above that in step 1406 at least one rotated reference image of the object is obtained. The language "at least one" is used because in some embodiments the information related to a tilt angle of the object is used to obtain more than one rotated reference image of the object. Each rotated reference image may be at a slightly different angle around the tilt angle of the object. And in some embodiments, the information related to a tilt angle of the object is used to generate a "set" of rotated reference images around the tilt angle rather than just one reference image exactly at the tilt angle. This way, the tilt angle measurement may be noisy and imperfect because the set will provide rotated reference images having a variety of angles near the tilt angle. The number of rotated reference images in the set may vary depending on the particular application, implementation and level of accuracy needed.

Figure 16:
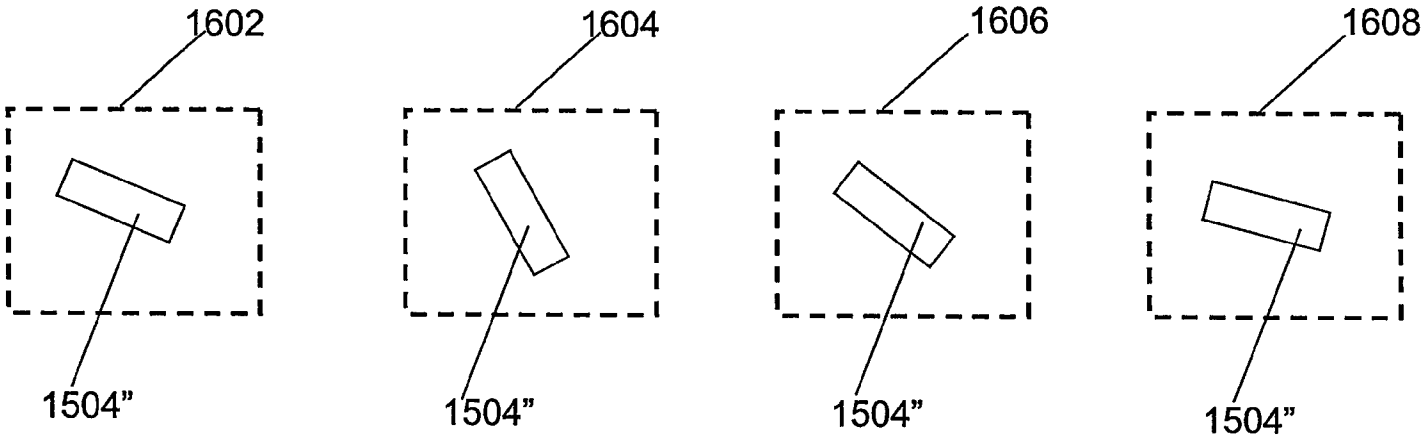
FIG. 16 is a block diagram illustrating a set of rotated reference images in accordance with an embodiment of the present invention.

FIG. 16 illustrates an example set of rotated reference images 1602, 1604, 1606, 1608 of the object 1504" around the tilt angle. The tilt angle of the object 1504" in each image is slightly different.

In step 1408 (FIG. 14) the live image of the object is compared with the one or more rotated reference images of the object. In general, the image capture unit looks for an image of the object in the x and y planes, and the image it is looking for is a translated image that reflects the angle of the object as provided by the tilt sensor or accelerometer. Thus, a benefit of the tilt measurement is that instead of matching all possible rotations of the reference image, the image capture unit just needs to check rotations close to the measured tilt angle. The rotations may be close to the measured tilt angle within a determined error tolerance, which might be based on the noise of the tilt sensor. Because the live image is compared against the appropriately rotated reference image, the rotation degree of freedom does not need to be searched during the comparison process, thereby decreasing the comparison calculation cost and increasing the comparison quality.

An optional approach used in some embodiments is to first attempt to match tilt angles around the previously matched tilt angle. This way, even if a tilt angle sensor sporadically produces "bad" data, the camera tracking may not be significantly impacted.

FIG. 15 illustrates an example of such a comparison. Namely, the live image 1502 of the object 1504 is compared with the rotated reference image 1508 of the object 1504". In embodiments where more than one rotated reference image is used as described above, the live image 1502 of the object 1504 is compared with some or all of the rotated reference images. Thus, in some embodiments, the information relating to the tilt angle of the object is used to obtain a plurality of rotated reference images of the object, and then the live image of the object is compared with each of the plurality of rotated reference images of the object.

Finally, in step 1410 (FIG. 14) an indication is generated in response to the live image matching one of the rotated reference images. The indication may comprise any type of flag or signal to indicate to software and/or hardware that a match between the live image and one of the rotated reference images has occurred.

In some embodiments, tracking of the object may be performed by determining the location in the live image where the matches occur. For example, in FIG. 15 a match occurs when the object 1504 is located in the upper left corner of the camera's field of view. This information may be used to determine the location of the object 1504. Additional matches may be used to track the object 1504's movements.

In some embodiments, the one or more reference images and live image may be passed through one or more normalizing filters. This may help to make matching more reliable by evening out lighting variations. By way of example, such normalizing filters may comprise Laplacian, Laplacian of Gaussian, signum of Laplacian of Gaussian, or any other type of filter having similar effects.

Thus, by translating or rotating the reference detect profile image of an object according to the tilt angle of the object provided by a sensor, object image detection may be optimized. Such object image detection may then be used for tracking the position of the object. For example, the method may be used for controller tracking using video input. While using the tilt angle of the object is beneficial, in some embodiments the displacement of the controller may alternatively or additionally be a cue to help the camera tracking for scale changes or horizontal/vertical motion.

It should be well understood that the object may comprise any type of object, such as any type of controller. For example, the object may comprise a remote control of the type that is used for a television, stereo, DVD player, etc. In some embodiments, the above described methods and techniques may be used with two or more controllers simultaneously. For example, the methods and techniques may be used with respect to a controller in each hand of a user, for controllers operated by multiple users, or for similar scenarios. The methods and techniques may be used to simultaneously detect and/or track all such controllers.

The entire disclosure of co-pending U.S. patent application Ser. No. 11/624,637, filed Jan. 18, 2007, entitled "METHOD AND SYSTEM FOR ADDING A NEW PLAYER TO A GAME IN RESPONSE TO CONTROLLER ACTIVITY", is hereby fully incorporated by reference herein in its entirety.

The entire disclosure of co-pending U.S. patent application Ser. No. 11/551,682, filed Oct. 20, 2006, entitled "GAME CONTROL USING THREE-DIMENSIONAL MOTIONS OF CONTROLLER", is hereby fully incorporated by reference herein in its entirety.

The entire disclosure of co-pending U.S. patent application Ser. No. 11/551,197, filed Oct. 19, 2006, entitled "CONTROLLER CONFIGURED TO TRACK USER'S LEVEL OF ANXIETY AND OTHER MENTAL AND PHYSICAL ATTRIBUTES", is hereby fully incorporated by reference herein in its entirety.

The entire disclosure of co-pending U.S. patent application Ser. No. 11/536,559, filed Sep. 28, 2006, entitled "MAPPING MOVEMENTS OF A HAND-HELD CONTROLLER TO THE TWO-DIMENSIONAL IMAGE PLANE OF A DISPLAY SCREEN", is hereby fully incorporated by reference herein in its entirety.

The entire disclosure of co-pending U.S. patent application Ser. No. 11/382,699, filed May 10, 2006, entitled "ATTACHABLE STRUCTURE FOR USE WITH HAND-HELD CONTROLLER HAVING TRACKING ABILITY", is hereby fully incorporated by reference herein in its entirety.

The entire disclosure of U.S. Provisional Patent Application No. 60/718,145, entitled "AUDIO, VIDEO, SIMULATION, AND USER INTERFACE PARADIGMS", filed Sep. 15, 2005, is hereby fully incorporated by reference herein in its entirety.

The following applications are all hereby fully incorporated herein by reference in their entireties: U.S. patent application Ser. No. 10/207,677, entitled, "MAN-MACHINE INTERFACE USING A DEFORMABLE DEVICE", filed on Jul. 27, 2002; U.S. patent application Ser. No. 10/650,409, entitled, "AUDIO INPUT SYSTEM", filed on Aug. 27, 2003; U.S. patent application Ser. No. 10/663,236, entitled "METHOD AND APPARATUS FOR ADJUSTING A VIEW OF A SCENE BEING DISPLAYED ACCORDING TO TRACKED HEAD MOTION", filed on Sep. 15, 2003; U.S. patent application Ser. No. 10/759,782, entitled "METHOD AND APPARATUS FOR LIGHT INPUT DEVICE", filed on Jan. 16, 2004; U.S. patent application Ser. No. 10/820,469, entitled "METHOD AND APPARATUS TO DETECT AND REMOVE AUDIO DISTURBANCES", filed on Apr. 7, 2004; and U.S. patent application Ser. No. 11/301,673, entitled "METHOD FOR USING RELATIVE HEAD AND HAND POSITIONS TO ENABLE A POINTING INTERFACE VIA CAMERA TRACKING", filed on Dec. 12, 2005, all of which are hereby incorporated by reference.

The following applications are all hereby fully incorporated herein by reference in their entireties: U.S. patent application Ser. No. 11/381,729, to Xiadong Mao, entitled "ULTRA SMALL MICROPHONE ARRAY", filed on May 4, 2006, application Ser. No. 11/381,728, to Xiadong Mao, entitled "ECHO AND NOISE CANCELLATION", filed on May 4, 2006, U.S. patent application Ser. No. 11/381,725, to Xiadong Mao, entitled "METHODS AND APPARATUS FOR TARGETED SOUND DETECTION", filed on May 4, 2006, U.S. patent application Ser. No. 11/381,727, to Xiadong Mao, entitled "NOISE REMOVAL FOR ELECTRONIC DEVICE WITH FAR FIELD MICROPHONE ON CONSOLE", filed on May 4, 2006, U.S. patent application Ser. No. 11/381,724, to Xiadong Mao, entitled "METHODS AND APPARATUS FOR TARGETED SOUND DETECTION AND CHARACTERIZATION", filed on May 4, 2006, U.S. patent application Ser. No. 11/381,721, to Xiadong Mao, entitled "SELECTIVE SOUND SOURCE LISTENING IN CONJUNCTION WITH COMPUTER INTERACTIVE PROCESSING", filed on May 4, 2006; all of which are hereby incorporated by reference.

The following applications are all hereby fully incorporated herein by reference in their entireties: co-pending application Ser. No. 11/418,988, to Xiadong Mao, entitled "METHODS AND APPARATUSES FOR ADJUSTING A LISTENING AREA FOR CAPTURING SOUNDS", filed on May 4, 2006; co-pending application Ser. No. 11/418,989, to Xiadong Mao, entitled "METHODS AND APPARATUSES FOR CAPTURING AN AUDIO SIGNAL BASED ON VISUAL IMAGE", filed on May 4, 2006; co-pending application Ser. No. 11/429,047, to Xiadong Mao, entitled "METHODS AND APPARATUSES FOR CAPTURING AN AUDIO SIGNAL BASED ON A LOCATION OF THE SIGNAL", filed on May 4, 2006; co-pending application Ser. No. 11/429,133, to Richard Marks et al., entitled "SELECTIVE SOUND SOURCE LISTENING IN CONJUNCTION WITH COMPUTER INTERACTIVE PROCESSING", filed on May 4, 2006; and co-pending application Ser. No. 11/429,414, to Richard Marks et al., entitled "COMPUTER IMAGE AND AUDIO PROCESSING OF INTENSITY AND INPUT DEVICES FOR INTERFACING WITH A COMPUTER PROGRAM", filed on May 4, 2006, all of the entire disclosures of which are incorporated herein by reference.

The following applications are all hereby fully incorporated herein by reference in their entireties: U.S. patent application Ser. No. 11/382,031, entitled "MULTI-INPUT GAME CONTROL MIXER", filed on May 6, 2006; U.S. patent application Ser. No. 11/382,032, entitled "SYSTEM FOR TRACKING USER MANIPULATIONS WITHIN AN ENVIRONMENT", filed on May 6, 2006; U.S. patent application Ser. No. 11/382,033, entitled "SYSTEM, METHOD, AND APPARATUS FOR THREE-DIMENSIONAL INPUT CONTROL", filed on May 6, 2006; U.S. patent application Ser. No. 11/382,035, entitled "INERTIALLY TRACKABLE HAND-HELD CONTROLLER", filed on May 6, 2006; U.S. patent application Ser. No. 11/382,036, entitled "METHOD AND SYSTEM FOR APPLYING GEARING EFFECTS TO VISUAL TRACKING", filed on May 6, 2006; U.S. patent application Ser. No. 11/382,041, entitled "METHOD AND SYSTEM FOR APPLYING GEARING EFFECTS TO INERTIAL TRACKING", filed on May 7, 2006; U.S. patent application Ser. No. 11/382,038, entitled "METHOD AND SYSTEM FOR APPLYING GEARING EFFECTS TO ACOUSTICAL TRACKING", filed on May 6, 2006; U.S. patent application Ser. No. 11/382,040, entitled "METHOD AND SYSTEM FOR APPLYING GEARING EFFECTS TO MULTI-CHANNEL MIXED INPUT", filed on May 7, 2006; U.S. patent application Ser. No. 11/382,034, entitled "SCHEME FOR DETECTING AND TRACKING USER MANIPULATION OF A GAME CONTROLLER BODY", filed on May 6, 2006; U.S. patent application Ser. No. 11/382,037, entitled "SCHEME FOR TRANSLATING MOVEMENTS OF A HAND-HELD CONTROLLER INTO INPUTS FOR A SYSTEM", filed on May 6, 2006; U.S. patent application Ser. No. 11/382,043, entitled "DETECTABLE AND TRACKABLE HAND-HELD CONTROLLER", filed on May 7, 2006; U.S. patent application Ser. No. 11/382,039, entitled "METHOD FOR MAPPING MOVEMENTS OF A HAND-HELD CONTROLLER TO GAME COMMANDS", filed on May 7, 2006; U.S. Design patent application No. 29/259,349, entitled "CONTROLLER WITH INFRARED PORT", filed on May 6, 2006; U.S. Design patent application No. 29/259,350, entitled "CONTROLLER WITH TRACKING SENSORS", filed on May 6, 2006; U.S. Patent Application No. 60/798,031, entitled "DYNAMIC TARGET INTERFACE", filed on May 6, 2006; and U.S. Design patent application No. 29/259,348, entitled "TRACKED CONTROLLER DEVICE", filed on May 6, 2006; all of which are hereby incorporated herein by reference in their entireties.

The entire disclosure of co-pending U.S. patent application Ser. No. 11/430,594, to Gary Zalewski and Riley R. Russell, entitled "Profile Detection", filed on May 8, 2006, is incorporated herein by reference.

The entire disclosure of co-pending U.S. patent application Ser. No. 11/430,593, to Gary Zalewski and Riley R. Russell, entitled "Using Audio/Visual Environment To Select Ads On Game Platform", filed on May 8, 2006, is incorporated herein by reference.

The entire disclosure of co-pending U.S. patent application Ser. No. 11/400,997, filed on Apr. 10, 2006, to Larsen and Chen, entitled "System And Method For Obtaining User Information From Voices", is incorporated herein by reference.

The entire disclosure of co-pending U.S. patent application Ser. No. 11/382,259, to Gary Zalewski et al., entitled "Method and apparatus for use in determining lack of user activity in relation to a system", filed on May 8, 2006, is incorporated herein by reference.

The entire disclosure of co-pending U.S. patent application Ser. No. 11/382,258, to Gary Zalewski et al., entitled "Method and apparatus for use in determining an activity level of a user in relation to a system", filed on May 8, 2006, is incorporated herein by reference.

The entire disclosure of co-pending U.S. patent application Ser. No. 11/382,251, to Gary Zalewski et al., entitled "Handheld controller having detectable elements for tracking purposes", filed on May 8, 2006, is incorporated herein by reference.

The entire disclosure of co-pending U.S. patent application Ser. No. 11/382,252, entitled "TRACKING DEVICE FOR USE IN OBTAINING INFORMATION FOR CONTROLLING GAME PROGRAM EXECUTION", filed on May 8, 2006, is incorporated herein by reference.

The entire disclosure of co-pending U.S. patent application Ser. No. 11/382,256 entitled "TRACKING DEVICE WITH SOUND EMITTER FOR USE IN OBTAINING INFORMATION FOR CONTROLLING GAME PROGRAM EXECUTION", filed on May 8, 2006, is incorporated herein by reference.

The entire disclosure of co-pending U.S. patent application Ser. No. 11/382,250 entitled "OBTAINING INPUT FOR CONTROLLING EXECUTION OF A GAME PROGRAM", filed on May 8, 2006, is incorporated herein by reference.

The entire disclosure of co-pending U.S. Design patent application No. 29/246,744, entitled "VIDEO GAME CONTROLLER FRONT FACE", filed on May 8, 2006, is incorporated herein by reference.

The entire disclosure of co-pending U.S. Design patent application No. 29/246,743, entitled "VIDEO GAME CONTROLLER", filed on May 8, 2006, is incorporated herein by reference.

The entire disclosure of co-pending U.S. Design patent application No. 29/246,767, entitled "VIDEO GAME CONTROLLER", filed on May 8, 2006, is incorporated herein by reference.

The entire disclosure of co-pending U.S. Design patent application No. 29/246,768, entitled "VIDEO GAME CONTROLLER", filed on May 8, 2006, is incorporated herein by reference.

The entire disclosure of co-pending U.S. Design patent application No. 29/246,763, entitled "ERGONOMIC GAME CONTROLLER DEVICE WITH LEDS AND OPTICAL PORTS", filed on May 8, 2006, is incorporated herein by reference.

The entire disclosure of co-pending U.S. Design patent application No. 29/246,759, entitled "GAME CONTROLLER DEVICE WITH LEDS AND OPTICAL PORTS", filed on May 8, 2006, is incorporated herein by reference.

The entire disclosure of co-pending U.S. Design patent application No. 29/246,765, entitled "DESIGN FOR OPTICAL GAME CONTROLLER INTERFACE", filed on May 8, 2006, is incorporated herein by reference.

The entire disclosure of co-pending U.S. Design patent application No. 29/246,766, entitled "DUAL GRIP GAME CONTROL DEVICE WITH LEDS AND OPTICAL PORTS", filed on May 8, 2006, is incorporated herein by reference.

The entire disclosure of co-pending U.S. Design patent application No. 29/246,764, entitled "GAME INTERFACE DEVICE WITH LEDS AND OPTICAL PORTS", filed on May 8, 2006, is incorporated herein by reference.

The entire disclosure of co-pending U.S. Design patent application No. 29/246,762, entitled "ERGONOMIC GAME INTERFACE DEVICE WITH LEDS AND OPTICAL PORTS", filed on May 8, 2006, is incorporated herein by reference.

While the invention herein disclosed has been described by means of specific embodiments and applications thereof, numerous modifications and variations could be made thereto by those skilled in the art without departing from the scope of the invention set forth in the claims.

What is claimed is:

1. A method for use in obtaining input data from an object, comprising:

capturing a live image of the object with an image capture device;

receiving information related to a tilt angle of the object from one or more sensors other than the image capture device;

using the information related to a tilt angle of the object to obtain at least one rotated reference image of the object;

comparing the live image of the object with the rotated reference image of the object; and generating an indication in response to the live image matching the rotated reference image.

2. A method in accordance with claim 1, wherein the one or more sensors other than the image capture device comprises a gyro sensor *used* in the object.

3. A method in accordance with claim 1, wherein the one or more sensors other than the image capture device comprises an accelerometer *used* in the object.

4. A method in accordance with claim 1, wherein the rotated reference image of the object is obtained by retrieving it from storage.

5. A method in accordance with claim 1, wherein the rotated reference image of the object is obtained by rotating a reference image of the object.

6. A method in accordance with claim 1, further comprising:

passing the live image of the object and the rotated reference image of the object through a normalizing filter.

7. A method in accordance with claim 1, wherein the image capture device [comprises] *functions as* a camera.

8. A method in accordance with claim 1, wherein the image capture device [comprises] *functions as* a Z-camera.

9. A method in accordance with claim 1, wherein the object [comprises] *functions as* a hand-held controller.

10. A method in accordance with claim 1, wherein the information relating to the tilt angle of the object is used to obtain a plurality of rotated reference images of the object, and the live image of the object is compared with each of the plurality of rotated reference images of the object.

11. An apparatus for use in obtaining input data from an object, comprising:

an image capture device configured to capture a live image of the object; and a processor based system configured to receive information related to a tilt angle of the object from one or more sensors other than the image capture device, use the information related to a tilt angle of the object to obtain at least one rotated reference image of the object, compare the live image of the object with the rotated reference image of the object, and generate an indication in response to the live image matching the rotated reference image.

12. An apparatus in accordance with claim 11, wherein the one or more sensors other than the image capture device comprises a gyro sensor in the object.

13. An apparatus in accordance with claim 11, wherein the one or more sensors other than the image capture device comprises an accelerometer in the object.

14. An apparatus in accordance with claim 11, wherein the rotated reference image of the object is obtained by retrieving it from storage.

15. An apparatus in accordance with claim 11, wherein the rotated reference image of the object is obtained by rotating a reference image of the object.

16. An apparatus in accordance with claim 11, wherein the processor based system is further configured to pass the live image of the object and the rotated reference image of the object through a normalizing filter.

17. An apparatus in accordance with claim 11, wherein the image capture device comprises a camera.

18. An apparatus in accordance with claim 11, wherein the object comprises a hand-held controller.

19. An apparatus in accordance with claim 11, wherein the information relating to the tilt angle of the object is used to obtain a plurality of rotated reference images of the object, and the live image of the object is compared with each of the plurality of rotated reference images of the object.

20. A non-transitory computer readable storage medium storing a computer program executable by a processor based system, the computer program causing the processor based system to execute steps comprising:

receiving a captured live image of an object from an image capture device;

receiving information related to a tilt angle of the object from one or more sensors other than the image capture device;

using the information related to a tilt angle of the object to obtain at least one rotated reference image of the object;

comparing the live image of the object with the rotated reference image of the object; and generating an indication in response to the live image matching the rotated reference image.

21. A storage medium in accordance with claim 20, wherein the one or more sensors other than the image capture device comprises a gyro sensor *used* in the object.

22. A storage medium in accordance with claim 20, wherein the one or more sensors other than the image capture device comprises an accelerometer *used* in the object.

23. A storage medium in accordance with claim 20, wherein the rotated reference image of the object is obtained by retrieving it from storage.

24. A storage medium in accordance with claim 20, wherein the rotated reference image of the object is obtained by rotating a reference image of the object.

25. A storage medium in accordance with claim 20, wherein the computer program is further configured to cause the processor based system to execute a step comprising:

passing the live image of the object and the rotated reference image of the object through a normalizing filter.

26. A storage medium in accordance with claim 20, wherein the image capture device [comprises] *functions as* a camera.

27. A storage medium in accordance with claim 20, wherein the image capture device [comprises] *functions as* a Z-camera.

28. A storage medium in accordance with claim 20, wherein the object [comprises] *functions as* a hand-held controller.

29. A storage medium in accordance with claim 20, wherein the information relating to the tilt angle of the object is used to obtain a plurality of rotated reference images of the object, and the live image of the object is compared with each of the plurality of rotated reference images of the object.

*30. A method for tracking a device having a body to be worn by a user to produce input data, comprising:*

*capturing a plurality of images of the body with an image capture device, the body including infrared (IR) light emitting diodes (LEDs) and the images captured of the body including at least one or more of the IR LEDs for detecting changes in position or orientation of the body in three-dimensional space;*

*receiving information related to motion of the body from one or more sensors other than the image capture device while capturing said plurality of images of the body, the information related to motion of the body used to identify three-dimensional movements of the body and a tilt angle of the body;*

*using the images of the body that include the one or more IR LEDs to identify a first part of the tracking information of the body and using the information related to the motion of the body to identify a second part of the tracking information, the second part of the tracking information includes at least one rotated reference image; and*

*determining the input data based on a combination of both the first part of the tracking information and the second part of the tracking information, the combination includes comparing the at least one rotated reference image with one or more of said plurality of images of the body, wherein the input data is used to control virtual fields of view and virtual movements in a scene of a virtual world when presented on a screen.*

*31. The method of claim 30, wherein the one or more sensors other than the image capture device include one of a gyro sensor used in the body of the device, or an accelerometer used in the body of the device, or both a gyro sensor and an accelerometer used in the body of the device;*

*wherein the device is configured for communication with a computer system that processes instructions for the capturing, the receiving, and the using of the method.*

*32. The method of claim 31, wherein the communication used is wireless.*

*33. The method of claim 31, wherein the image capture device is functions to capture images that include a head of the user.*

*34. The method of claim 30, wherein the image capture device is an infrared (IR) capable camera positioned in a direction that faces in a direction of the body having the IR LEDs, the body used in a space viewable by the image capture device.*

*35. The method of claim 30, wherein the one or more sensors other than the image capture device function as one or more Micro-Electro-Mechanical Systems (MEMS) sensors.*

*36. The method of claim 30, wherein detecting changes in position and orientation of the body in three-dimensional space involves analyzing the plurality of images for a pattern of the one or more IR LEDs.*

*37. The method of claim 30, wherein the determining the input data includes mixing the first part of the tracking data with the second part of the tracking data to generate refined position and orientation information for the virtual movements.*

*38. The method of claim 30, wherein determining the input data based on a combination of both the first part of the tracking information and the second part of the tracking information includes mapping movements of the body to predefined input commands.*

*39. A method for tracking a device having a housing, the device is used to provide input data, comprising:*

*establishing communication between the device and a computer;*

*receiving, by the computer, inertial sensor data of the device from one or more sensors, the inertial sensor data producing information related to a tilt angle of the housing used to obtain at least one rotated reference image;*

*receiving a plurality of images of the housing of the device from an image capture device, the housing being disposed in space substantially in front of the image capture device, the housing includes infrared (IR) light emitting diodes (LEDs), wherein one or more of the plurality of images captured by the image capture device include at least one or more of the IR LEDs disposed on the housing; and*

*correcting, at least partially, drift in the inertial sensor data using one or more of the plurality of images captured by the image capture device;*

*tracking the housing using a combination of information obtained from the plurality of images and information obtained from the inertial sensor data, the combination includes comparing the at least one reference image with one or more of said plurality of images of the housing, the tracking of the device producing the input data that is used to control virtual movements and virtual views presented on a display screen.*

*40. The method of claim 39, wherein the one or more sensors other than the image capture device include one of a gyro sensor used in the housing of the device, or an accelerometer used in the housing of the device, or both a gyro sensor and an accelerometer used in the housing of the device.*

*41. The method of claim 39, wherein the housing functions to be worn or held by a user.*

*42. The method of claim 39, wherein tracking the device includes analyzing the plurality of images for a pattern of the one or more IR LEDs.*

*43. The method of claim 39, wherein producing the input data includes mapping movements of the housing to predefined input commands.*

* * * * *